US012723685B2

(12) United States Patent
Andon et al.

(10) Patent No.: US 12,723,685 B2
(45) Date of Patent: Sep. 1, 2026

(54) UNIVERSAL CONNECTOR

(71) Applicant: SYSTEMS IP PTY LTD, Wakerley (AU)

(72) Inventors: Joe Andon, Wakerley (AU); Akira Yamada, Wakerley (AU); Michael Williams, Wakerley (AU)

(73) Assignee: Systems IP Pty Ltd, Wakerley (AU)

( * ) Notice: Subject to any disclaimer, the term of this patent is extended or adjusted under 35 U.S.C. 154(b) by 0 days.

(21) Appl. No.: 18/723,320

(22) PCT Filed: Dec. 27, 2022

(86) PCT No.: PCT/AU2022/051598

§ 371 (c)(1),
(2) Date: Jun. 21, 2024

(87) PCT Pub. No.: WO2023/122816

PCT Pub. Date: Jul. 6, 2023

(65) Prior Publication Data

US 2025/0084935 A1 Mar. 13, 2025

(30) Foreign Application Priority Data

Dec. 29, 2021 (AU) ................................ 2021904293
Jul. 29, 2022 (AU) ................................ 2022902135
Oct. 7, 2022 (AU) ................................ 2022902938

(51) Int. Cl.
*F16L 19/00* (2006.01)
*A63B 5/11* (2006.01)
*A63B 9/00* (2006.01)

(52) U.S. Cl.
CPC .............. *F16L 19/005* (2013.01); *A63B 5/11* (2013.01); *A63B 2009/006* (2013.01)

(58) Field of Classification Search
CPC ..... A63B 5/11; A63B 17/04; A63B 2009/006; E04G 7/00; E04G 7/20; F16L 9/006;
(Continued)

(56) References Cited

U.S. PATENT DOCUMENTS 5,186,501 A * 2/1993 Mano .................... F16L 19/005 285/902
6,334,632 B1 * 1/2002 Nishio .................. F16L 47/041 285/342

(Continued)

FOREIGN PATENT DOCUMENTS

CN 206036441 3/2017

*Primary Examiner* — Joshua Lee
(74) *Attorney, Agent, or Firm* — Shaver Swanson; Scott D. Swanson

(57) ABSTRACT

A connector system is provided for an apparatus intended to be walked on, swung on or jumped on in use. The connector system comprising a plurality of frame elements, each comprising an insertion portion, at least one protrusion, and frame element rotation reducing portions. Also provided is a plurality of first connector members, each configured to receive the insertion portion of at least one frame element into a channel therein. There are also a plurality of second connector members, each configured to mate with one first connector member, whereupon insertion of the insertion portion of at least one frame element into one first connector member, and mating of the one first connector member with one second connector member, the frame element cannot be removed from the first connector member due to the at least one protrusion of the frame element engaging with the second connector member; and the frame element is substantially unable to rotate in the first connector member due to the rotation reducing portions engaging with the channel of the first connector member.

20 Claims, 36 Drawing Sheets

(58) Field of Classification Search
CPC ..... F16L 15/006; F16L 19/005; F16L 19/025; F16L 37/0841; F16L 37/123; F16L 41/021
See application file for complete search history.

(56) References Cited

U.S. PATENT DOCUMENTS

| | | | | |
|---|---|---|---|---|
| 9,993,677 | B2 * | 6/2018 | Todokoro | A63B 71/04 |
| 10,307,629 | B2 * | 6/2019 | Todokoro | F16B 12/40 |
| 11,300,234 | B2 * | 4/2022 | Cantrell | F16L 19/025 |
| 11,306,852 | B2 * | 4/2022 | Cantrell | F16L 33/223 |
| 11,371,502 | B2 * | 6/2022 | Muckley | F04C 2/1073 |
| 11,821,547 | B2 * | 11/2023 | Cantrell | F16L 19/0206 |
| 12,049,915 | B2 * | 7/2024 | Acosta | F16B 37/0892 |
| 2005/0087984 | A1 | 4/2005 | Weick et al. | |
| 2006/0039776 | A1 | 2/2006 | Schutz | |
| 2011/0180273 | A1 | 7/2011 | Hughes et al. | |
| 2011/0260450 | A1 | 10/2011 | Imanishi et al. | |
| 2016/0091126 | A1 * | 3/2016 | Gibson | F16L 19/10 29/458 |
| 2016/0215912 | A1 | 7/2016 | Fujii et al. | |
| 2018/0128058 | A1 | 5/2018 | Hatherall | |
| 2018/0361188 | A1 * | 12/2018 | Rexroad | F16B 7/185 |

* cited by examiner

UNIVERSAL CONNECTOR

The present document claims priority from AU2021904293 entitled Universal Connector filed on 29 Dec. 2021; AU2022902135 entitled Universal Connector filed on 29 Jul. 2022 and AU2022902938 entitled Universal Connector filed on 7 Oct. 2022 the contents of each of which are hereby incorporated by reference in their entirety.

TECHNICAL FIELD

The present invention relates to a connector for connecting frame elements such as rods, tubes or pipes. In an embodiment, the connector is used to connect frame elements of an apparatus that is intended to be walked on, swung on or jumped on in use. The apparatus could be a playground apparatus such as a climbing frame or a trampoline.

BACKGROUND

When building a large structure, it is sometimes necessary to connect multiple pieces together. In the building industry, for example, a large structure of scaffolding can be required to accommodate access to a structure being built. The scaffolding comprises multiple rods or tubes connected to one another to provide a frame around the building. Construction workers will stand, move and work on the scaffolding during the day. Therefore, it is important that the scaffolding frame once in place is strong, robust and that the points of connection are unlikely to fail in use.

Other large structures that take the weight of persons in use include climbing frames, bunk beds and trampolines. A climbing frame can be formed from multiple rods or tubes connected to one another to provide a frame around which a child can swing and play. The child may climb, swing and jump around the frame and sometimes multiple children put all their weight on the structure at once. It is important that the frame is structurally robust and does not break, sway or loosen especially at connection points.

To provide optimum structural integrity to a frame, the number of joints in the frame can be minimised. The joint parts of the frame structure can be welded or otherwise permanently joined to form a connection that is immovable and unlikely to fail in use. However, there are circumstances where permanent joints are not appropriate. For example, in scaffolding, a permanent joint is not appropriate because the scaffolding should be removed once it is has served its purpose. In domestic playground apparatus, permanent joints may not be appropriate because the user may wish to disassemble the apparatus and move it when they e.g., re-design their backyard area, dispose of the apparatus, or move house. If the domestic playground apparatus is permanently assembled, the user's ability to relocate/resell the product is reduced, because the owner is not able to disassemble it and transport it to another location.

With it in mind that some structures need to be readily transportable and easy to assemble and disassemble, a means of connecting frame parts together becomes essential. Long pieces permanently joined together is no longer an option. Instead, pieces of the frame that are required to be long in length can come in smaller parts, each of which smaller part can be connected to the other to form an overall longer piece. For example, in a trampoline, the elongate tubular frame parts of the steel frame are often modular. Smaller frame elements can be connected together to make the overall frame structure. In children's climbing equipment such as monkey bars, the frame can be made from smaller frame pieces connected together to make the overall frame structure. In scaffolding, the tube parts used to form the scaffold frame can be connected together to form an infinitely extendable scaffolding that can grow with the building as more scaffolding is required. The tubular frame parts can be connectable along the same longitudinal length to make long frame elements as described. Furthermore, the tubular frame parts are desirously connected at the corners and or at other locations within the structure, so that the frame can take shape.

Turning back to trampolines, providing stability in a trampoline frame is a challenge since it is intended to be jumped on. For many years recreational trampolines have typically included a tubular steel frame which is supported on spaced apart legs with a flexible jumping mat secured to the frame by a large number of spaced apart extension springs which extend and contract as a person jumps on the mat in order to give "bounce". The springs are usually connected to the tubular steel frame at one end via radial slots provided therein and to the mat via hooks or the like at the other end. Although trampolines can be made in many shapes, circular is probably the most popular in which case the frame is generally constructed of arcuate segments of round tube which are joined together in a spigot and socket arrangement with the end portion of one segment sliding into the end portion of the adjacent segment. Whilst a spigot and socket arrangement is generally useful, over time and following use, the spigot can tend to become wedged into the socket and the only means to remove it can be force. Sometimes tools are required to separate the spigot from the socket, which is not desirable. Furthermore, where the mat support frame joins to the vertical support frame elements such as the legs of the trampoline, the connection should be robust and strong. A connector that can securely join frame pieces and which does not require force to disassemble is preferred for the domestic market.

Accordingly, there exists a need for joining frame elements that allows for the building of robust structures that do not sway or loosen at connection points even under the application of intended user load. Furthermore, the means of joining the frame elements should allow for relatively easy disassembly even after a period of prolonged use. It would also be advantageous if the connector was a universal connector that allowed for the joining of multiple types of frame elements so that the user has improved choice when designing bespoke structures. It would also be advantageous if the connector was fun to use during construction.

The present invention is aimed at providing an improved connector which can ameliorate at least some of the problems of the prior art or which can provide a useful alternative.

SUMMARY OF INVENTION

According to a first aspect there is provided a connector system for an apparatus intended to be walked on, swung on or jumped on in use, the connector system comprising

- a plurality of frame elements, each frame element comprising an insertion portion comprising at least one protrusion; and frame element rotation reducing portions,
- a plurality of first connector members, each first connector member configured to receive the insertion portion of at least one frame element into a channel therein;

a plurality of second connector members, each second connector member configured to mate with one first connector member, whereupon insertion of the insertion portion of at least one frame element into one first connector member, and mating of the one first connector member with one second connector member, the frame element cannot be removed from the first connector member due to the at least one protrusion of the frame element engaging with the second connector member; and the frame element is substantially unable to rotate in the first connector member due to the rotation reducing portions engaging with the channel of the first connector member.

The connector system can therefore provide a structurally stable frame assembly that is substantially more rigid that other frame assemblies that do not make use of the connector system. It is thought that by substantially preventing rotation of each frame element, and by substantially preventing removal of each frame element from the connector (comprising the first connector and the second connector), the rigidity of the frame is increased compared to the same frame without the connector assembly described.

In another aspect there is provided a connector system for frame elements, the connector system comprising a frame element comprising an elongate body with a longitudinal axis, the elongate body having a first end and a second end, wherein at one or both of the first end and second end of the elongate body there is provided an insertion portion, the insertion portion comprising a protrusion or series of protrusions around the outside periphery of the frame element, the protrusion or series of protrusions around the outside periphery of the frame element having a first side and a second opposing side and providing a portion of increased diameter on the insertion portion;

a first connector member having an outside surface and an inside surface, the inside surface defining a channel therein, the channel having a rear wall and a front wall, the front wall defining an opening, wherein the insertion portion of the rod or tube can be inserted through the opening into the channel, wherein the frame element is insertable into the channel until either of the first end of the frame element contacts the rear wall which prevents further insertion movement of the frame element, or the first side of the protrusion or series of protrusions contacts the front wall of the first connector member and the frame element is thereby prevented from further insertion movement into the channel;

a second connector member that can be brought into contact with the first connector member inserted into the channel, the second connector member comprising a barrier wall that once in place can abut the second side of the protrusion or series of protrusions, the second connector member further comprising a connection assembly associated with the barrier wall and configured to engage the second connector member to the first connector member so that the protrusion or series of protrusions is/are sandwiched between the first connector member and the second connector member, wherein the frame element cannot be removed from the connection system until the second member is disengaged from the first connector member;

wherein the insertion portion of the frame element comprises a series of frame element rotation reducing portions which mate with an inside surface of the channel of the first connector to prevent or at least reduce rotation of the frame element once inserted into the first connector member.

In an embodiment, the frame element rotation reducing portions are longitudinal axially fixed indexed splines. There may also be first connector rotation reducing portions in the form of longitudinal ribs on the inside surface of the first connector, which provide grooves between them which mate with the axially fixed indexed longitudinal splines, to thereby substantially prevent rotation of the frame element.

The spline on the frame element is similar to that used in a drive shaft for example in a car or truck. Splines are essentially ridges or teeth on a drive shaft that match with grooves in a mating piece and transfer torque to it, maintaining the angular correspondence between them. In these well-known applications, the spline can resist or transmit rotational forces measured as torque. At the same time the spline in a drive shaft is designed to allow axial movement with little resistance. This is important so that as the shaft changes angular position through a coupling, the axial distance may change. The most common example of this is the drive shaft to the rear axle assembly of a car or truck. When moving up and down, there are changes in the angle of the drive shaft and it also moves the shaft forward and back a small amount axially. The sliding action removes conflict of the slightly changing length of the shaft. Also, a spline in a drive usually allows the same number of possible mating connections as the number of teeth used.

The present axially fixed indexed splines are a unique spline connection that while resisting rotational movement from the mating connections, also resist axial movement by using a barrier wall provided forward of the front wall of the longitudinal spline teeth. The barrier wall axially fixes the splines. This is a new and unique way of using a spline mating connection that makes the connection suitable for use in fixed joints. The connector is easy to assemble by being a close fit without resistance, yet the interlock feature prevents axial movement when locked in position.

Another unique feature of the present axially fixed indexed spline connection is indexing. Whereas splines have a number of teeth in the mating connections, these normally have no relevance with respect to which mating alignment is used. However, in the present connector, the mating is used for angular indexing. For example, in an eight-tooth spline there is provided for fixed connections to be connected at 45 degrees, 90 degrees, 135 degrees, 180 degrees, 225 degrees, 270 degrees and 315 degrees. This allows for frame structures to be created with instruction that are many and varied whilst remaining indexed.

In yet another aspect there is provided a connector system for frame elements, the connector system comprising a frame element comprising an elongate body with a longitudinal axis, the elongate body having a first end and a second end, wherein at one or both of the first end and second end of the elongate body there is provided an insertion portion, the insertion portion comprising a protrusion or series of protrusions around the outside periphery of the frame element, the protrusion or series of protrusions around the outside periphery of the frame element having a first side and a second opposing side and providing a portion of increased diameter on the insertion portion;

a first connector member having an outside surface and an inside surface, the inside surface defining a channel therein, the channel having a rear wall and a front wall, the front wall defining an opening, wherein the insertion portion of the rod or tube can be inserted through the opening into the channel, wherein the frame element is insertable into the channel until either of the first end of the frame element contacts the rear wall which prevents further insertion movement of the frame element, or the first side of the protrusion or series of protrusions contacts the front wall of the first connector member and the frame element is thereby prevented from further insertion movement into the channel;

a second connector member that can be brought into contact with the first connector member inserted into the channel, the second connector member comprising a barrier wall that once in place can abut the second side of the protrusion or series of protrusions, the second connector member further comprising a connection assembly associated with the barrier wall and configured to engage the second connector member to the first connector member so that the protrusion or series of protrusions is/are sandwiched between the first connector member and the second connector member, wherein the frame element cannot be removed from the connection system until the second member is disengaged from the first connector member;

wherein the first connector member comprises a series of teeth arranged around the periphery of the outside surface of the channel, and the second connector member comprises at least one ratchet arm, engageable with teeth during connection of the second connector member to the first connector member; wherein the connector system is thereby configured to generate an aural indicator as the second connector member is screwed onto the first connector member.

The connection system of the present invention can be used with any frame elements including rods, tube, pipes, poles and bars. The frame elements can be solid or hollow. Typically, the frame elements are hollow to minimise costs in manufacture and to provide a cost saving in weight. The frame elements to be connected can be those typically used in the scaffold or play equipment industry, and which are then modified by the connector system or connector assembly of the present invention. In an embodiment, the frame elements are themselves modified for use with the present connector system. The frame elements can be used to build any structure including but not limited to playground frames such as monkey bars, scaffolding, beds, tents, trampolines, swing sets, and so on.

Each frame element such as rod or tube, for exemplary purposes, can have an elongate body. The body can be straight or curved. The body of the frame element can have any cross-section. The most typical cross-section for frame elements is circular, although the invention is not limited to frame elements of this shape. In an embodiment, the cross section is at least about 40, 45, 48 mm in diameter. In an embodiment, the cross-sectional distance of the frame element is 44.5 mm. The frame elements can be made from any material. In an embodiment, the frame elements are made from metal. The elongate body can have a first end and a second end. The first end and the second end can be identical except in the case of frame elements where the thickness or shape of the frame element changes along its length. The first end of the frame element can be for joining with the second end of another, separate frame element. The second end of the frame element can be for joining with the first end of another, separate frame element. The first ends and the second ends can in principle be joined together in perpetuity. However, at some point, there may be a natural end of the structure, which will result in an end of a frame element that is not joined to another frame element. The ends of the frame elements which are not joined to other frame elements can be capped. There may be no free ends if the structure is such that all ends of the frame elements are connected, such as in a cuboidal shape.

The end of the frame element that will join with the connector can have an insertion portion. The insertion portion is intended for insertion into the body of the first connector. The insertion portion can be of any length. If the insertion portion is too short, there is a risk that the point of connection is not strong enough and the frame element may move too much in the first connector. It is preferred that the insertion portion is at least equal in distance along the frame element to the diameter of the frame element. For example, if the diameter of the frame element is N cm, then the insertion portion is at least equal to N cm. In some embodiments, the insertion portion is at least about twice, 5, 10 or 15% greater in length than the diameter of the frame element. If the frame element is not round (and therefore has no diameter) then instead of the diameter, the distance can be measure as the longest length from one side of the cross section to the other e.g. in a square, the diagonal distance from opposing corners.

In an embodiment, the insertion point can comprise one or more protrusions around the frame element body. The function of the protrusion(s) is to provide a part of the frame element that can be gripped between the first connector and second connector members in use. In an embodiment, the protrusion(s) on the frame element can be identified as the part which stops the insertion portion from being further inserted into the channel. Alternatively (or in addition), the protrusion(s) can be identified as the part that abuts the barrier wall of the second connector member and substantially prevents or at least reduces removal of the frame element from the first connector member.

In an embodiment, the insertion portion is different in diameter to the remainder of the elongate body of the frame element. This can be useful where the insertion portion slides into the first connector member and is secured into position by a second connector member where the outside surfaces of the elongate body of the frame element and second connector member can be substantially flush with one another. There can be some step in the change between surfaces. However, being as flush as possible can provide a more aesthetically pleasing join that is also functionally useful if, e.g. something needs to slide along connected frame elements.

In a frame element with a substantially circular or ovaloid cross section, where there is a single peripheral protrusion, the protrusion can be referred to as a circumferential protrusion. In frame elements with other shapes, such as triangular, the formation of a protrusion around the outside surface can be referred to as circumferential, even though it will be appreciated that it is not circular in shape.

Nevertheless, the protrusions can trace around the outside of the frame element body and provide an area of increased diameter or increased cross sectional width for the frame element. The increase in cross sectional area can be relative to the remainder of the body of the frame element that does not comprise the protrusion(s).

There can be one circumferential protrusion. In the case of a frame element with a circular cross-section, the protrusion can be an annular ring. The ring can be a solid shape with squared edges. The ring can have rounded edges. There can be a preference for solid edges as will become apparent from the description herein, since the protrusions will thus be sandwiched without air spaces between the first and second connector members if they have squared edges. Since the function of the protrusion is to provide an area of increased diameter on the frame element, the protrusion does not have to be a solid ring around the element body and instead it can be provided in parts. Where the protrusion is provided in parts it can be referred to as a series of protrusions around the outside periphery of the frame element. The series of protrusions can be of any shape such as knobs, squared, rectangular columns, other. Each protrusion can be formed into the material of the frame element e.g. by moulding, pressing or crimping. Each protrusion can be material added to the frame element e.g. by adhering a solid piece or adding a rivet. The protrusion(s) can be hollow. The protrusion(s) can be solid. There can be any number of protrusions around the outside periphery in a series including 2, 3, 4, 5, 6, 7, 8, 9 or 10. If there are too many protrusions, the risk is that they become a point of weakness since the surface area joining them to the underlying structure gets less and they could break off more easily. The protrusion(s) whether in single form or parts can be formed by or accompanied by longitudinal splines can be axially fixed and which allow for indexing of the frame element with the first connector. The axially fixed indexed splines extend along at least a part of the longitudinal length of the insertion portion. The protrusions can be the leading edges of the axially fixed indexed longitudinal splines. These splines can assist with decreasing rotation of the frame element once inserted into the first connector member if there are corresponding grooves between complementary ribs inside the channel of the first connector to reduce rotation.

In an embodiment there are a plurality of axially fixed longitudinal splines around the outside periphery of the insertion portion. Each spline can be in one single piece. Each spline can be formed in multiple pieces with lands between elongate spline parts. Each spline can be at least or at most 2, 3, 4, 5, 6, 7 or 8 mm (or larger) in thickness from one side of the spline to the other. The spline can be formed in two or more longitudinal spline parts to reduce the amount of material used to form it. The spline can be across 75, 80, 85, 90, 95 or 100% the distance of the insertion portion. Although there should be at least some part of the insertion portion free from the location of the barrier wall of the second connector member. Each spline can have an elongate axis substantially aligned with the longitudinal axis of the frame element; this is the most straightforward arrangement since the frame element is most easy to insert into the first connector member. In an alternative embodiment, each spline is offset with respect to the longitudinal axis of the frame element. In this embodiment, the arrangement is slightly more complicated because the receiving channels for the offset splines still need to be able to receive and mate with them to prevent or reduce rotation. In an embodiment with angled offset splines, the channels for receiving them will need to be wider, which results in less overall contact between frame element and first connector. There is still likely to be an overall reduction in rotation, but the optimum reduction is where straight splines contact with straight ribs in the channel of the first connector. In an embodiment, the splines could be curved so that they mate with the corresponding parts of the first connector member upon rotational insertion into the first connector member.

In order that the splines are repeatedly matingly received into a first connector member it is preferably that each spline is the same. The splines can be the same across multiple frame elements, so any frame element can be mated into any first connector. In an embodiment, the splines can be different around a single frame element so that there is only one way in which they can possibly be inserted into a correspondingly shaped first connector member. This would increase complexity during construction but may provide some advantages such as forcing a particular orientation of respective frame elements relative to one another.

There can be any number of splines around the outside periphery of the insertion portion. There could in principle be a single spline with a corresponding channel on the inside surface of the first connector member; however, to optimise a reduction in rotation of the frame element in the first connector member, preferably there are splines all the way around the outside of the insertion portion. The splines can be equidistant from one another. There can be at least or at most 3, 4, 5, 6, 7, 8, 9, 10 or more splines. It is noted that with frame elements in which there is a bend or an elbow, the insertion of the insertion portion of the frame element into the first connector member needs to be in a particular way in order that the frame element lines up with other connectors. This indexing of the splines as they are mated into the first connector means that sometimes the frame element has to be inserted in a particular way for a frame to be formed. If there are too many splines, a chance that the frame element with an elbow is not oriented in the correct way are increased and the user has to keep removing the insertion portion and trying again to achieve the correct assembly. With this in mind, it is considered that about eight splines is optimal for reducing rotational movement between the frame element and the first connector member and for ease of construction.

Each spline has a first longitudinal side and a second longitudinal side. When the insertion member of the frame element is inserted into the first connector member the spline can slide into a channel or groove formed in the inside wall surface of the first connector member. Each elongate spline receiving groove in the channel in the first connector member can be formed between longitudinal ribs. Each rib of the first connector member can have a first side and a second side. The first side of the rib can abut with the first longitudinal side of a spline once the spline has slid into the groove and the two are unable to pass over one another. This means that rotational forces applied to the frame element are absorbed by the splines and ribs and the frame element is prevented or substantially reduced from rotating inside the first connector member.

In an embodiment there can be a single protrusion that does not cover the entire circumference (or periphery) of the frame element. Nevertheless, the protrusion can act to provide a part of the frame element that can be gripped by the first connector and second connector members in use. It should be understood that such a single protrusion is in scope but may not be preferred due to the decreased amount of surface area for gripping for the first and second connector members.

The amount that the protrusions extend from the frame element surface can vary. However, the protrusion or protrusions should not be so short that they are unable to provide a good functional surface for gripping by the connector members; or so that there is a risk that the insertion portion could be pushed too far into the first connector and get stuck. On the other hand, the protrusion or protrusions should not extend out so far that they are unsightly, difficult to manufacture, hamper handling and generally cause a nuisance. In a preferred embodiment, the protrusion(s) increase the diameter of the frame element by about 10 to about 20%, more preferably about 15 to about 18% from the original diameter of the frame element. For example, if the diameter of the frame element is 5 cm, the protrusion(s) can extend about 0.5 cm to thereby increase the overall diameter by 1 cm (about 20%). If the diameter of the frame element is 3.5 cm (measured from outside wall) then the diameter of the frame element can be increased to about 3.9 cm by the protrusions (about 10%).

While there may be multiple protrusions referred to, it should be understood that one protrusion is in scope so that section can be read as a singular protrusion unless the context makes clear otherwise.

The protrusions can be provided on the frame element. In this embodiment, the frame element is manufactured with the protrusion(s). Thus, the protrusions are integral with the frame element and cannot be removed from the frame element. Alternatively, the protrusions are provided on an element that is attachable to the frame element. For example, the end of the frame element could be capped with a sleeve that has a part of it comprising one or more protrusions around its outside periphery. Where the insertion portion is a cap, it can be made from a different material to the rest of the frame element. The cap can slide over the end of the frame portion and be secured around the outside wall. The cap can slide into the frame portion and be secured to the inside wall. The cap can be secured to the frame element by any means. The cap could be secured to the frame element by tight interference fit. To increase structural integrity, the cap could be secured to the frame element by crimping and or by fasteners. In a preferred embodiment, however, the insertion portion is moulded on the end of the frame element during manufacture, since this increases structural integrity by providing a single unitary piece and reduces overall unit cost.

The end of the insertion portion can be open. The end of the insertion portion can be closed. If the insertion portion is formed from a cap, the end can be closed during manufacture. Where the end of the insertion portion is a moulded tube, the end will necessarily be open. To close the open end for aesthetic purposes, or for safety to ensure that rough edges are protected, there can be provided a capping button. The capping button can be secured by any means including a tight interference fit. The capping button could be marked with words, logo, or other information as desired.

Whether there is one or more protrusions, whether they are integral with the frame element or provided in a separate piece, the protrusions comprise a first side and a second opposing side. Upon insertion of the insertion portion of the frame element into the connector, the first side of the protrusions is facing forward towards the first connector. The second side of the protrusions is thus facing outwardly once the frame element is engaged with the first connector.

In a second aspect of the invention there is provided a connection system for rod and or tube-like frame elements, the connection system comprising a frame element such as a rod or tube comprising an elongate body having a first end and a second end, wherein at one or both of the first end and second end of the elongate body there is provided an insertion portion comprising an indentation or series of indentations located around the outside periphery of the rod or tube, the indentation or series of indentations around the outside periphery of the rod or tube providing a portion of decreased diameter when compared to the insertion portion and the remainder of the elongate body of the rod or tube, a first connector member having an outside surface and an inside surface, the inside surface defining a channel therein, the channel having a rear wall and a front wall, the front wall defining an opening, wherein the insertion portion of the rod or tube can be inserted through the opening into the channel, wherein the channel further comprises a protrusion or series of movable protrusions, the movable protrusion or series of movable protrusions being movable between a retracted position in which the rod or tube can be inserted into the channel, and an engaged position in which the protrusion or series of protrusion are located in the indentation or series of indentations provided in the rod or tube, the protrusion or series of protrusions thereby preventing removal of the rod or tube from the channel. Optionally, a second connector member is provided that can be brought into contact with the first connector member once the rod or tube has been inserted and engaged with the channel, the second connector member may comprise a connection assembly configured to engage the second connector member to the first connector member.

Description relating to the first aspect of the present invention also applies to the second aspect of the invention unless the context makes clear otherwise. For example, the connection system of both the first and second aspects of the present invention can be used with any frame elements including rods, tube, pipes, poles and bars. The frame elements of both the first and second aspects can be used to build any structure including but not limited to playground frames such as monkey bars, scaffolding, beds, tents, trampolines, swing sets, and so on.

In this embodiment, the insertion portion comprises one or more indentations around the frame element body. The function of the indentation(s) is to provide a part of the frame element that can be gripped by the first connector in use. In a frame element with a substantially circular or ovaloid cross section, where there can be a single peripheral indentation, the indentation can be referred to as circumferential indentation. In frame elements with other shapes, such as triangular, the formation of an indentation around the outside surface can be referred to as circumferential, even though it will be appreciated that it is not circular in shape. Nevertheless, the indentation can trace like a channel around the outside of the frame element body and provide an area of decreased diameter or decreased cross sectional width for the frame element. There can also be indentations arranged longitudinally along the insertion portion of the frame elements body.

There can be one circumferential indentation. In the case of a frame element with a circular cross-section, the indentation can be an annular ring. The ring can be a solid channel with squared edges. Since the function of the indentation is to provide an area of decreased diameter on the frame element, the indentation does not have to be a solid ring around the element body and instead it can be provided in parts. Where the indentation is provided in parts it can be referred to as a series of indentations around the outside periphery of the frame element. The series of indentations can be of any shape such as inverted knobs, squared, rectangular column channels, other. There can be any number of indentations in a series including 2, 3, 4, 5, 6, 7, 8, 9 or 10.

In an embodiment there can be a single indentation that does not cover the entire circumference (or periphery) of the frame element. Nevertheless, the indentation can act to provide a part of the frame element that can be gripped by the first connector in use.

The amount that the indentation(s) extend into the body of the frame element surface can vary. However, the indentation(s) should not be so short that they are unable to provide a good functional surface for gripping by the protrusion provided on the first connector member. In a preferred embodiment, the indentation(s) decrease the diameter of the frame element by about 10-20% from the original diameter of the frame element. For example, if the diameter of the frame element is 5 cm, the protrusion(s) can extend about 0.5 cm into the frame element thereby decreasing the overall diameter by 1 cm (about 20%). In the alternative, the indentations are provided as openings in the frame element wall with no closed bottom wall.

While there may be multiple indentations referred to, it should be understood that one indentation is in scope so that section can be read as a singular indentation unless the context makes clear otherwise.

The indentations can be provided on the frame element. In this embodiment, the frame element is manufactured with the indentation(s). Thus, the indentations are integral with the frame element and cannot be removed from the frame element. Alternatively, the indentations are provided on an element that is attachable to the frame element. For example, the end of the frame element could be capped with a sleeve that has a part of it comprising one or more indentations around its outside periphery.

Whether there is one or more indentation, whether they are integral with the frame element or provided in a separate piece, the indentations are configured to receive protrusions from the inside of the first connector member. Advantageously, the protrusions from the inside of the first connector member have a complementary shape, to provide a tight fit once engaged. However, provided there is some protrusion located into the indention, the unwanted removal of the frame element can be avoided. In an embodiment, there is a single indentation on the frame element, and the first connector member comprises a single protrusion that is movable into and out of the indentation. In an embodiment, there is an annular indentation on the frame element, and an annular protrusion located in the first connector element that is movable into and out of the annular indentation. The or each protrusion can be manually moved from the unlocked (retracted) to the locked (engaged) position with respect to the respective indentation. In an embodiment, the protrusion is spring biased into the channel and must be manually removed from the channel of the first connector member using a protrusion mover in order to locate the frame element. In an embodiment, the protrusion is spring biased out of the channel of the first connector member and must be manually forced into the channel using a protrusion mover in order to locate the frame element. The insertion portion so described in this embodiment can be equipped with the splines described above.

The connector of the present invention comprises a first connector member (sometimes referred to as a first connector) operable with a second connector member (sometimes referred to as a second connector). The first connector member comprises an outside surface which is accessible and manipulatable. The first connector member has an inside surface which is the wall defining the interior of a channel. The inside surface wall can be smooth. The channel inside the first connector can be integrally formed with the wall of the first connector. The first connector member can be provided by an insert that slides into a tube to form the first connector. To join the insert with the tube and prevent unwanted movement of it out of the tube during use, the tube and connector can be crimped together or otherwise fastened.

In an embodiment, the first connector member is a separate handleable piece into which a frame element can be inserted. Where a connector has two (or three) first connector members the piece can be made and stored separately to the frame element. The frame elements for use with such connectors can have an insertion portion at each end of the frame element. In other embodiments, where a frame element to frame element join is required, the frame element can have an insertion portion at one end, and a first connector member at the other end. The first connector member can be held into the end of the frame element by tight interference fit. However, to further ensure absolutely no removal of it in use, there can be other securing means of the first connector into the end of the frame element such as by using glue and or taper. Furthermore, the first connector member can comprise a sleeve which slides into the frame element. The sleeve can comprise an indentation. A complementary protrusion can be formed into the frame element to conform to the indentation in the frame element. The protrusion/indentation can be circumferential. The pieces can be crimped together to ensure that one is not readily removable from the other in use.

The channel in the first connector is configured to allow insertion of the insertion portion of the frame element. The channel can be slightly wider than the insertion portion of the frame element to ensure that it can fit therein. In a preferred embodiment, the channel is about the same diameter as the frame element so as to allow a tight interference fit. Once inserted into the channel, the frame element, subject to what shape it is, may be able to rotate in the channel unless there are means which prevent that rotation. As noted above, in order to prevent or at least reduce any unwanted rotation, the inside surface of the channel can be modified with rotation reducing portions to engage the frame element. The first member rotation reducing portions can be ribs forming channels in the channel wall. The ribs can be received into complementary recesses between splines, as described, provided on the frame element. The frame element would thus be substantially prevented from rotating in the channel since the ribs and splines would not allow for rotational movement. The frame element itself is thus also modified with frame element rotation reducing portions. In an embodiment the frame element rotation reducing portions are provided on a frame element that is modified with a cap that provides the protrusion or series of protrusions. In an alternative embodiment, the frame element rotation reducing portions are formed into the frame element during manufacture.

The first member rotation reducing portions on the inside wall of the channel of the first connector can extend along a part of the inside surface of the channel of the first connector. The first member rotation reducing portions can each have a top surface, a rear end wall near the back of the channel, and a forward end wall near the opening of the channel. The top surface of the first member rotation reducing portion can be wide. The top surface of the first member rotation reducing portion can be narrow. There can be as few as 6 first member rotation reducing portions, there can be up to 20 first member rotation reducing portions, depending on the width of the top surface of each portion and the number of splines provided on the frame element. Once mated the frame element rotation reducing portions and the first member rotation reducing portions abut one another and substantially prevent rotational movement. There can be one or two (or more) first member rotation reducing portions between each pair of frame element rotation reducing portions.

The channel has an opening through which the insertion portion of the frame element is received. The opening can be defined by a front wall of the channel which can be a rim around the front of the first connector member. The front wall at the forward part of the first connector can have a smooth flat surface which in some embodiments can be for engagement with the first surface of the protrusion or series of protrusions. In some embodiments, the front wall of the first connector comprises the forward end walls of any rotation reducing portions provided in the channel. Therefore, the front wall can be the rim around the front of the first connector; the forward end walls of any rotation reducing portions provided in the channel; or both provided together. Upon insertion of the frame element into the opening, the protrusion or series of protrusions can abut against the front wall and or the forward wall of the rotation reducing portions which thereby provide a natural stop for further insertion movement of the frame element into the channel. In embodiments, the front wall and or the forward walls of the rotation reducing portions can be modified so as to dovetail with the protrusion(s), so as to further prevent any rotational movement of the frame element once inserted. The front wall of first connector can also dovetail with the second connector in some embodiments.

In some embodiments, the front wall can be modified with at least one gripper. Each of the grippers can be configured to engage with the protrusion(s). When sliding into the channel, the protrusion(s) can slide under finger like grippers extending from the front wall which engage over the protrusion(s) and grip by them. The grippers prevent the frame element from being unwantedly withdrawn from the first connector in use. In embodiments in which there is a gripper, the first side of the protrusion or series of protrusions contacts the front wall of the first connector member by engagement of the grippers with the protrusion(s). The rod or tube is thereby prevented from further insertion movement into the channel.

The channel also has a rear wall, and in this embodiment, the first end of the frame element may or may not abut the rear wall prior to the direct contact between the first surface of the protrusion or series of protrusions, and the front wall of the first connector member. The rear wall can be a solid wall at the rear of the channel. The rear wall can be a partial wall or barrier at the rear of the channel. In some embodiments, upon insertion of the insertion portion of the frame element into the channel, the first end of the frame element abuts the rear wall of the channel before the protrusion or series of protrusions contact with the front wall. In some embodiments, the protrusion or protrusions will never contact the front wall and the only stop is the barrier at the rear wall. In embodiments, therefore, the rear wall provides a natural stop for further insertion movement of the frame element. In this embodiment, if there are protrusions, there may be a gap between the front wall and the protrusion or series of protrusions. In embodiments, the rear wall can be modified so as to interlock with the first end of the insertion portion of the frame element, so as to further prevent any rotational movement of the frame element once inserted. The interlocking can be by a lock and key type of complementary shaping applied to the respective contacting surfaces.

In order to complete the connector, the second connector member is brought into contact with the first connector member. The act of bringing the two members (first connector member and second connector member) into contact can comprise bringing either one of them towards the other. However, in practice, since the frame element is typically already inserted into the first connector member, the act of bringing the second connector member into contact with the first connector member comprises brining the second connector member to the first connector member.

In an embodiment, the second connector member is in two or more parts and it is assembled around the first connector member. The second connector member can be in parts that are hingedly (or otherwise) connected to one another and which can be clamped around the first connector member and then locked into position. The second connector member can have an open position which can receive the first connector member and a closed, locked position in which the second connector member is locked around the first connector member. To lock the second connector member that comes in a plurality of parts into place around the first connector member, there can be a locking mechanism that comprises screws, hook and tab or other.

In an embodiment, the second connector comprises two half-parts a first half-part and a second half-part which can be different from one another or identical to one another. If the two half-parts are identical, once the second half-part is inverted with respect to the first half part, the two half-parts together provide a collar. Each half part can have first joining side and a second joining side. A catch can be provided at the first joining side, the catch can provide a recess. A boss can be provided at the second joining side, the boss can be locatable into the recess of the catch. When the two half-parts are brought together, the respective catches can locate the respective bosses and the two half parts are held securely together around the first connector member. A tool may be required to separate the parts once connected. In an alternative embodiment, the two half parts are not identical. This can be advantageous for making sure that the two half parts are connected in the correct way. Where the two half-parts are identical, there is a chance that one is connected to the other upside down. With two different parts, manufacturing costs might increase but ease of assembly is decreased.

Once in place, in an embodiment, the second connector member can provide a barrier wall that abuts the second side of the protrusion or series of protrusions. The barrier wall thereby prevents any removing movement of the frame element from the channel of the first connector member. The barrier wall can be provided as one continuous wall covering the second side of the protrusion or series of protrusions. The barrier wall could also be provided in separate wall parts provided that the protrusion or series of protrusions abut against it and their movement is barred. In another embodiment, protrusion(s) inside the channel locate into indentation (s) on the frame element and prevent the removal of the frame element from the first connector. In this embodiment, the second connector member provides additional structural integrity to the connector member, reducing any tendency for the frame element to move when pressure it applied in use.

In an embodiment, the second connector member is in one part. When the second connector member is in one part, it is necessary that it has a passageway therethrough to receive the frame element. The second connector member can be passed over the frame element and brought towards the insertion portion inside the channel of the first connector member. Once in place around the first connector member, the second connector member may provide a barrier wall that abuts the second side of the protrusion or series of protrusions. The protrusion(s) may be as described herein integral with the insertion portion. Alternatively, the protrusion(s) may be provided by a washer that slides over the insertion portion. The barrier wall thereby prevents any removing movement of the frame element from the channel of the first connector member.

In an embodiment, the second connector member is in two parts. A barrier wall can be provided on each of the second connector member parts e.g. first and second half-parts. An advantage of the second connector member being in parts which are assembled around the first connector member is that the second connector member can be narrower in diameter. Without the need to slide over the frame element, the second connector member can be made thinner and more streamlined with the first connector member. This can be more aesthetically pleasing and improves functionality under circumstances where the bulkiness of the connector would be disadvantageous. In some embodiments, in which the frame elements are for playground equipment, having a narrow connection point with flush connectors can be useful where there are parts of the equipment that slide over each other (e.g. in a flying fox). Furthermore, any locking latches and bosses as described are preferably as streamlined as possible for aesthetics and safety in use.

The second connector member comprises a connection assembly. The connection assembly can be associated with the barrier wall. The connection assembly is configured to engage the second connector member to the first connector member. The function of the connection assembly is to prevent unintentional disengagement of the second connection member from the first connection member. This can prevent unintentional disengagement of the barrier wall from the second side of the protrusion or series of protrusions, which would be disadvantageous in embodiments in which the barrier wall is holding the whole system together. The connection assembly can be any means that reversibly connects the second connection member to the first connection member.

In an embodiment, the connection assembly is a series of complementary ribs and recess (or protrusions and apertures; or like) on the outside wall of the first connector member and the inside wall of the second connector member that are complementary shapes and which upon engagement cause the first connector member and the second connector member to be interlocked together to prevent disengagement of the second connector member. The connection assembly can also prevent any rotational movement of the second connector member relative to the first connection member when locked into position. The connection assembly can operate together with the locking mechanism on the second connector member to reversibly engage the two members (first connector member and second connector member) to one another.

In an embodiment of the connection assembly, the complementary ribs and recesses on the outside wall of the first connector member and the inside wall of the second connector member come in the form of screw threads. In this embodiment, the second connector member can be screwed onto the first connector member to be interlocked. In an embodiment in which the second connector member is forms in parts, the parts can be assembled and then the assembled second connector member can be screwed onto the first connector member.

As the second connector member is screwed onto the first connector member in a first direction, the barrier wall moves closer to the protrusion or series of protrusions. When the barrier wall abuts the second side of the protrusion or series of protrusions, the second connector member can be given one last tightening turn and then it substantially remains in position. The second connector member can be turned in a second direction that is opposite to the first direction to remove or disengage it from the first connector member. When the second connector member is required to be removed from the first connector member, it can be turned in the second direction until the barrier wall is moved away from the protrusion or series of protrusions and the threads disengage.

In an embodiment, the second connector member is a collar that passes over one or more grippers that have engaged with the protrusion(s). Where each gripper is required to be pulled away from the protrusion(s) to remove the connection, the second connector member can hold them into position and ensure that they are unable to release their gripping forces. In this embodiment, the second connector member comprises a barrier wall itself that once in place causes engagement of the protrusion or series of protrusions by the grippers of the first connector member to remain engaged. In this embodiment, the second connector member can further comprise a connection assembly associated with the barrier wall, i.e. a screw thread or interference fit, that is configured to engage the second connector member to the first connector member. When viewed in cross section, it would be seen that the first connector member (i.e. the grippers thereof) is sandwiched between the protrusion or series of protrusions and the second connector member. The rod or tube thereby cannot be removed from the connection system until the second member is disengaged from the first connector member.

To assist in applying the second connector member to the first connector member in embodiments, the outside wall of the second connector member can be modified with a gripping surface. The gripping surface can include one or more gripping ridges that allow for purchase to be applied to the second connector member to force it into position.

To indicate to the user when the second connector member is in location such that the protrusion or series of protrusions is/are located or sandwiched between the first connector member and the second connector member there can be provided an indicator. The indicator can be a visual indicator. The indicator can be an aural indicator. In an embodiment, the indicator is a click sound that is made when the barrier wall of the second connector member engages with the front wall of the first connector member.

In an embodiment, as the connection assembly is formed by screwing the complementary screw threads to one another, there is an aural indicator of the joining process. This can be provided by at least one ratchet arm provided in the second connector body. The flexible ratchet arm can be biased to a position flush with the second connector body wall, but the ratchet arm can be lifted if a head part of the ratchet arm is forced outwardly from the wall of the second connector. The ratchet arm engages with teeth arranged in formation around the forward peripheral edge of the outside wall of the first connector member. The ratchet arm can be located on the second connector body such that it engages with a tooth of the first connector just prior to the threading process. As the second connector is screwed onto the first connector, the ratchet arm rises over the tooth body and then falls onto the next tooth in series. Advantageously, in embodiments in which there is one row of teeth, the ratchet arm is sized relative to the teeth so that it engages with them over more than one turn. Alternatively, there can be more than one row of teeth in a spiral formation that complements the turning circle of the ratchet arm. Nevertheless, the sequential connection of the ratchet arm with the teeth in the series makes a sound each time the head part of the ratchet arm falls to another tooth. Over a few turns of the second connector relative to the first connector there can be a loud and pleasing mechanical sound that allows the user to at once know that the first and second connectors are bring securely joined, and that the join is as tight as possible since the noise stops. An additional advantage of the ratchet arm, in embodiments, is that once the first connector and the second connector are joined, they are unable to come loose relative to one another because the head part of the ratchet arm may prevent an unscrewing motion. The head part of the ratchet arm can abut the preceding tooth and the bias in the material will not allow rotational movement in the opposite direction. There can be one ratchet arm per half part of the second connector.

In alternative embodiments, the ratchet arm comprises only the head part in the form of a thin fin which depends inwardly from the wall of the first half part or second half part. The thin fin flicks over each of the teeth in the series as the second connector is turned. This sort of ratchet arm will not prevent an undoing movement, but will still provide the aural indicator during tightening.

The number of the teeth and the size of the head part of the ratchet arm will contribute to the loudness and frequency of the aural indicator. In an embodiment in which the diameter of the first connector is about 3.5 cm there are about 32 teeth around the outside periphery of the opening. However, there can be at least about or at most about 10, 20, 30, 40 or 50 or more teeth depending on the size of the first connector. Each tooth can have a slope portion over which the ratchet arm moves in a forward screwing direction and a stop portion. As the head of the ratchet arm falls off the end of the slope portion of a first tooth, the head part of the ratchet arm can fit into the gap defined by the slope portion of a second tooth and the stop portion of the adjacent first tooth. The stop portion of any one tooth prevents rotational movement in the unscrewing direction, since the head of the ratchet arm cannot move past the stop portion in the unscrewing direction. In an embodiment, the slope portion of each tooth and the stop portion of each tooth is the same dimension. This means that each tooth provides for the same tone or pitch of sound as an aural indicator. In an alternative embodiment, the slope portion and the stop portions of each tooth are different angles, lengths and or heights, which makes a different sound (pitch or tone) for each tooth as the ratchet head moves over each different tooth. By varying the teeth and therefore by changing the corresponding sound emitted a tune could be created. The tune could have a simple melody such as Twinkle Twinkle Little Star. This could be extremely pleasing to children helping their parents to assemble play equipment. It is also fun for parents to guess what tune will come next. The sounds could act as a motivator to keep assembling.

BRIEF DESCRIPTION OF THE FIGURES

Embodiments of the invention and other embodiments will now be described with reference to the accompanying drawings which are not drawn to scale and which are exemplary only and in which.

DETAILED DESCRIPTION OF EMBODIMENTS OF THE INVENTION

Figure 1:
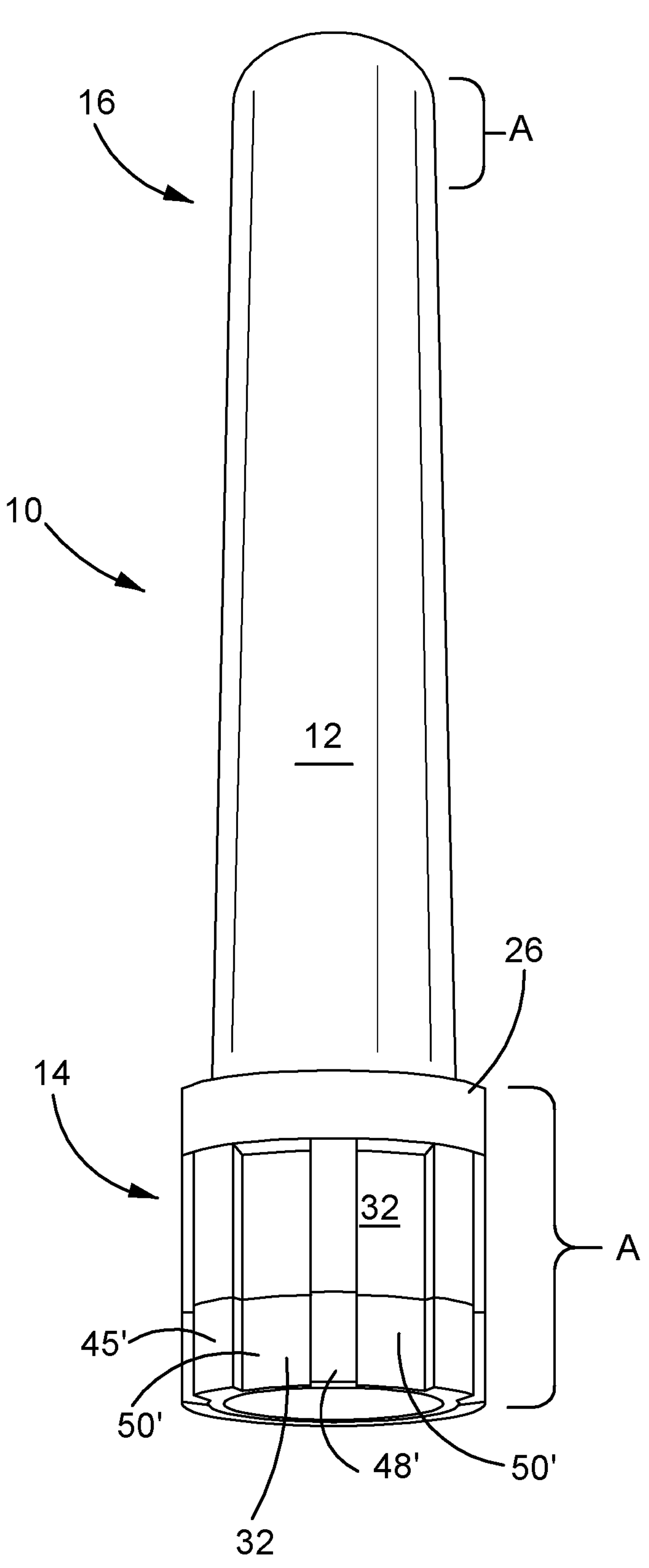
FIG. 1 is an embodiment of a frame element.

As can be seen in FIG. 1, an exemplary frame element 10 has an elongate body 12. The body 12 in this embodiment is straight. The body of the frame element 12 has a circular cross section. The elongate body 12 has a first end 14 and a second end 16. The first end 14 and the second end 16 are identical. The first end 14 of the frame element 12 can be for joining with the second end 16 of another, separate frame element 10 (see FIG. 5). The second end 16 of the frame element 10 can be for joining with the first end 14 of another, separate frame element 10 (not shown). In some embodiments, each end 14, 16 comprises an insertion portion A as described below. In other embodiments, one end 14 of the frame element 10 comprises a first connector member 24 and the other end 16 of the frame element 16 connector comprise an insertion portion A.

The end of the frame element 10 that will join with the connector 20 can have an insertion portion A. The insertion portion A is intended for insertion into the body 22 of the first connector 24.

In an embodiment, the insertion portion A can be delimited by one or more protrusions 26 around the frame element body 12. The function of the protrusion(s) 26 is to provide a part of the frame element 10 that can be gripped by the first connector 24 and second connector 30 members in use. The protrusion(s) around the outside of the frame element body 12 provide an area of increased diameter or increased cross sectional width for the frame element 10.

Figure 2A:
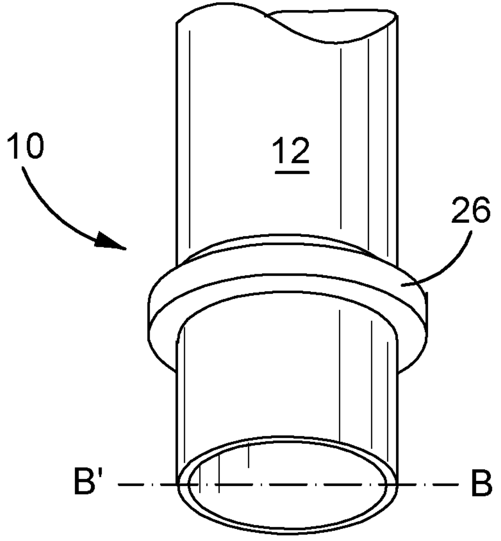
FIG. 2A and FIG. 2B are alternative embodiments of a frame element.
Figure 2A:
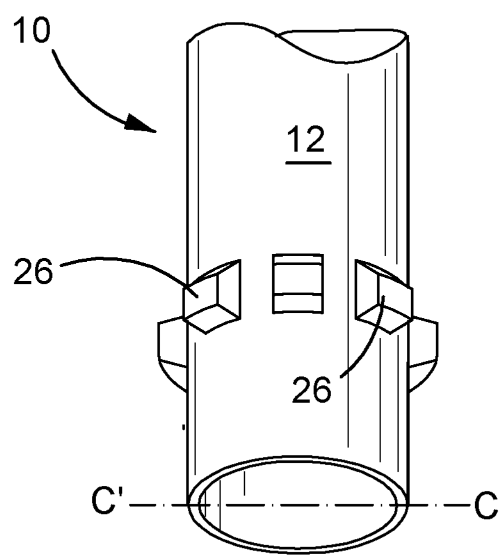
Figure 2A:
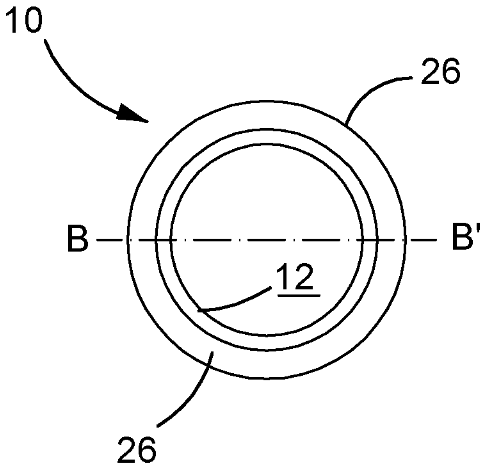
Figure 2B:
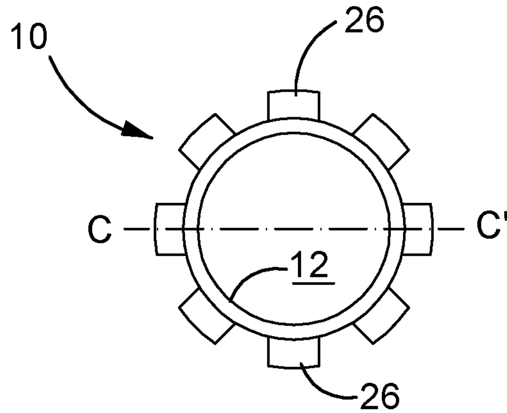
Figure 39:
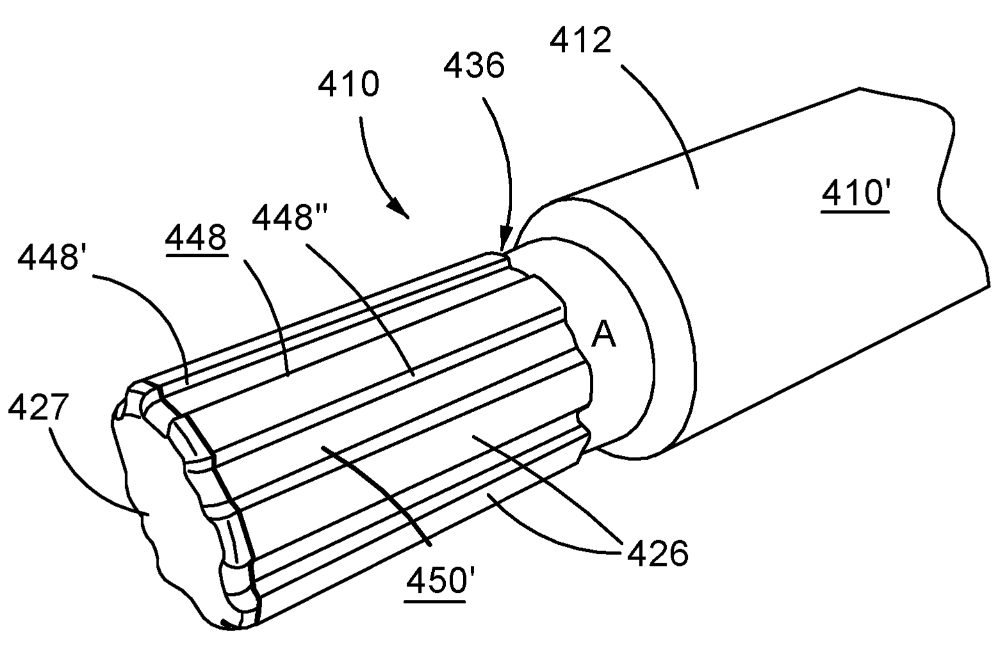
FIG. 39 is an alternative embodiment of an insertion portion of a frame element.

There can be one circumferential protrusion 26 as shown in FIG. 2A. In the case of a frame element 10 with a circular cross-section, the protrusion can be an annular ring 26. The ring is shown as a solid shape with squared edges. There can be a preference for solid edges to the protrusion 26, since the protrusion 26 will be properly sandwiched between the first connector member 24 and the second connector member 30 with all surfaces in contact with other surfaces. Since the function of the protrusion 26 is to provide an area of increased diameter on the body 12 of the frame element 10, the protrusion 26 does not have to be a solid ring as shown in FIG. 2A around the element body 12 and instead it can be provided in one or more parts as shown in FIG. 2B. Where the protrusions 26 are provided in parts, it can be referred to as a series of protrusions 26 around the outside periphery of the frame element 10. The series of protrusions 26 can be of any shape such as knobs, squared, rectangular columns, other. In FIG. 2B there are shown eight protrusions. In FIG. 39, each protrusion is the front end of a longitudinal spline.

Figure 9:
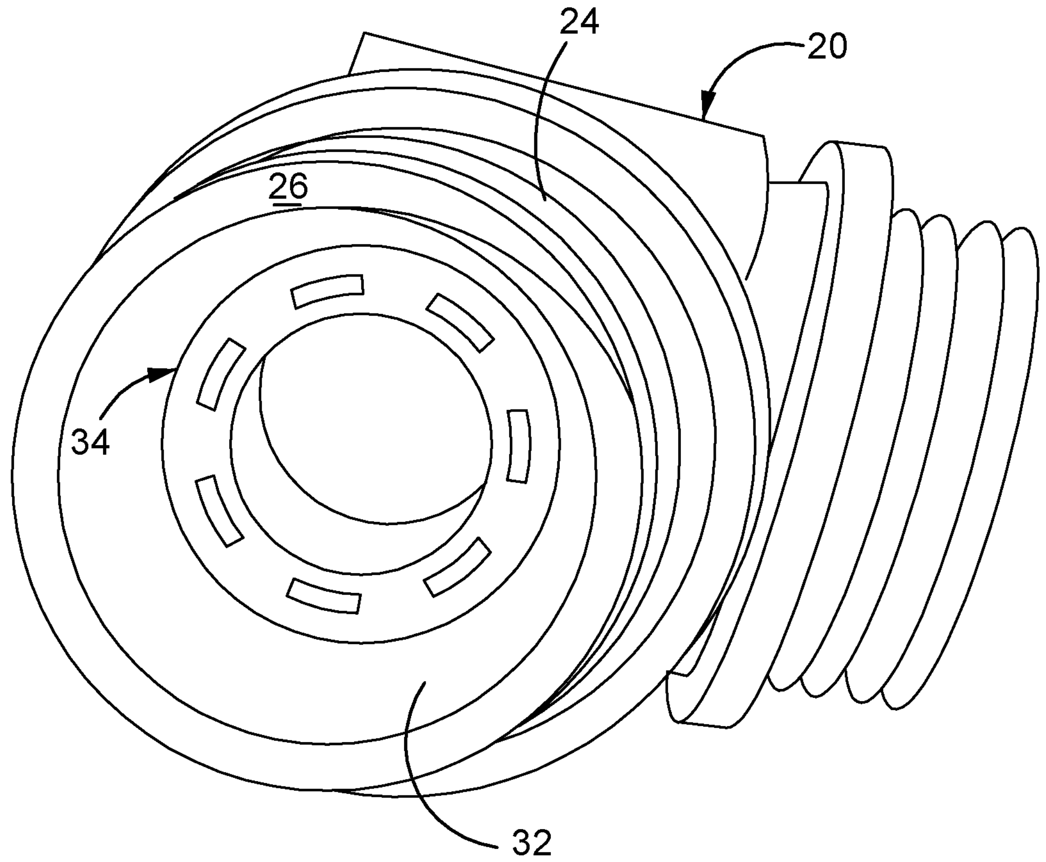
FIG. 9 shows a sleeve (without frame element) inside of the first connector member.

The protrusions 26 can be provided on the frame element 10. In this embodiment, the frame element 10 is manufactured with the protrusion(s) 26 as shown in FIG. 2. Thus, the protrusions 26 are integral with the frame element 10 and cannot be removed from the frame element 10. Alternatively, the protrusions 26 are provided on an element that is attachable to the frame element 10. For example, the end 14, 16 of the frame element 10 could be capped with a sleeve 32 that has a part of it comprising one or more protrusions 26 around its outside periphery. The frame element 10 can be slid into the sleeve 32 and can be held by tight interference fit. To assist in gripping the frame element 10 into the sleeve 32 there can be a complementary shaped annular recess 34 for receiving the annular end wall 14, 16 of the frame element 10 therein (FIG. 9). In FIG. 9, the sleeve 32 is shown inserted into the first connector member 24, but the frame element 10 has been removed to show what the sleeve 32 looks like on the inside. In use, there would be a frame element in the sleeve 32. In some embodiments, sleeve 32 is screwed or otherwise affixed to frame element 10 as shown in e.g. FIG. 13.

Upon insertion of the insertion portion A of the frame element 10 into the connector 20, the first side 36 the protrusion 26 is facing forward towards the first connector 24. The second side 38 of the protrusion 26 is thus facing outwardly once the frame element 10 is engaged with the first connector 24.

Figure 3:
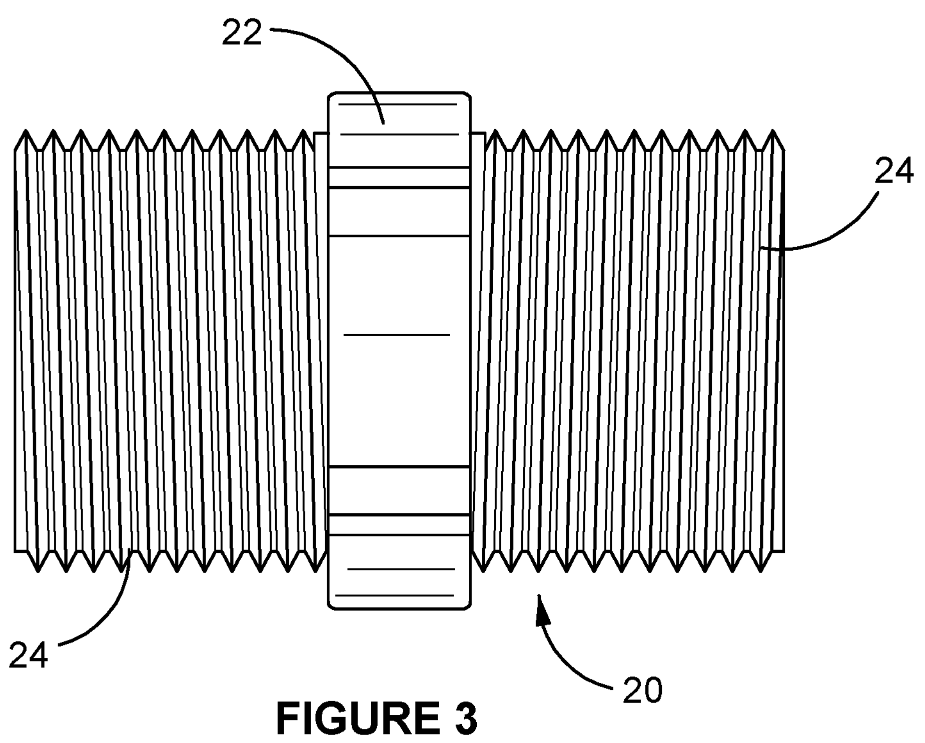
FIG. 3 is an embodiment of a connector part comprising two first connector members.
Figure 4:
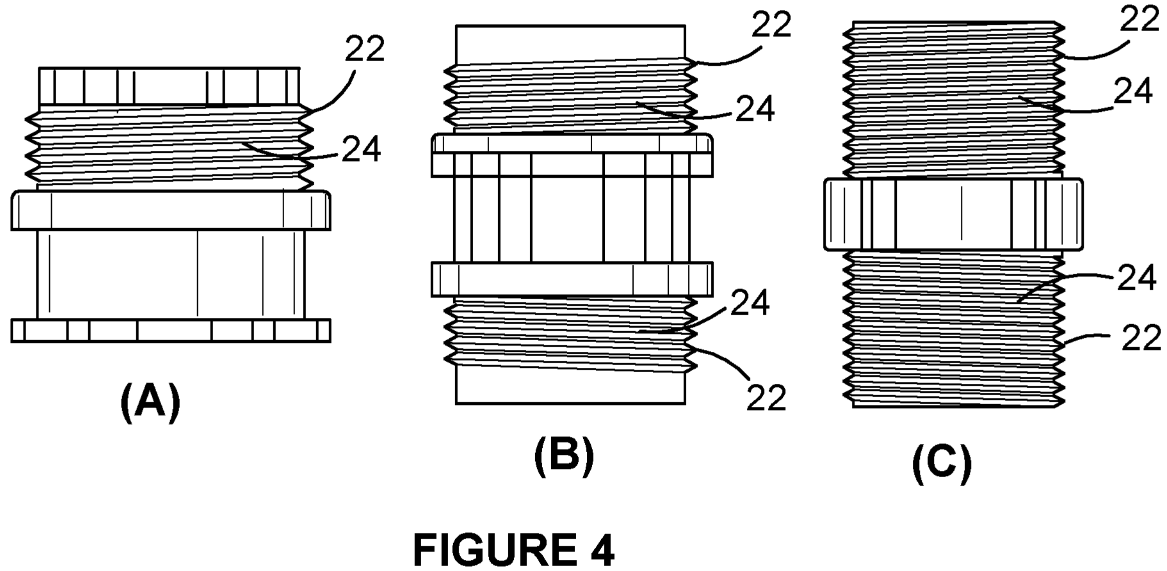
FIG. 4 shows alternative embodiments of connector parts.

The connector 20 comprises a first connector member 24 operable with a second connector member 30. Embodiments of a part of the connector 20 are shown in FIG. 3 and FIG. 4. In FIG. 3, the connector part has a body 22 with a first connector member 24 at one side and a first connector part 24 at the other side for joining two frame elements 10.

Each first connector member 24 comprises an outside surface 40 which is accessible and manipulatable. The first connector member has an inside surface 42 which is the wall defining the interior of a channel 44. The channel 44 in the first connector 24 is configured to allow insertion of the insertion portion A of the frame element 10. The channel 44 can be slightly wider than the insertion portion A of the frame element 10 to ensure that it can fit therein. In a preferred embodiment, the channel 44 is about the same diameter as the frame element 10 so as to allow a tight interference fit.

Figure 8:
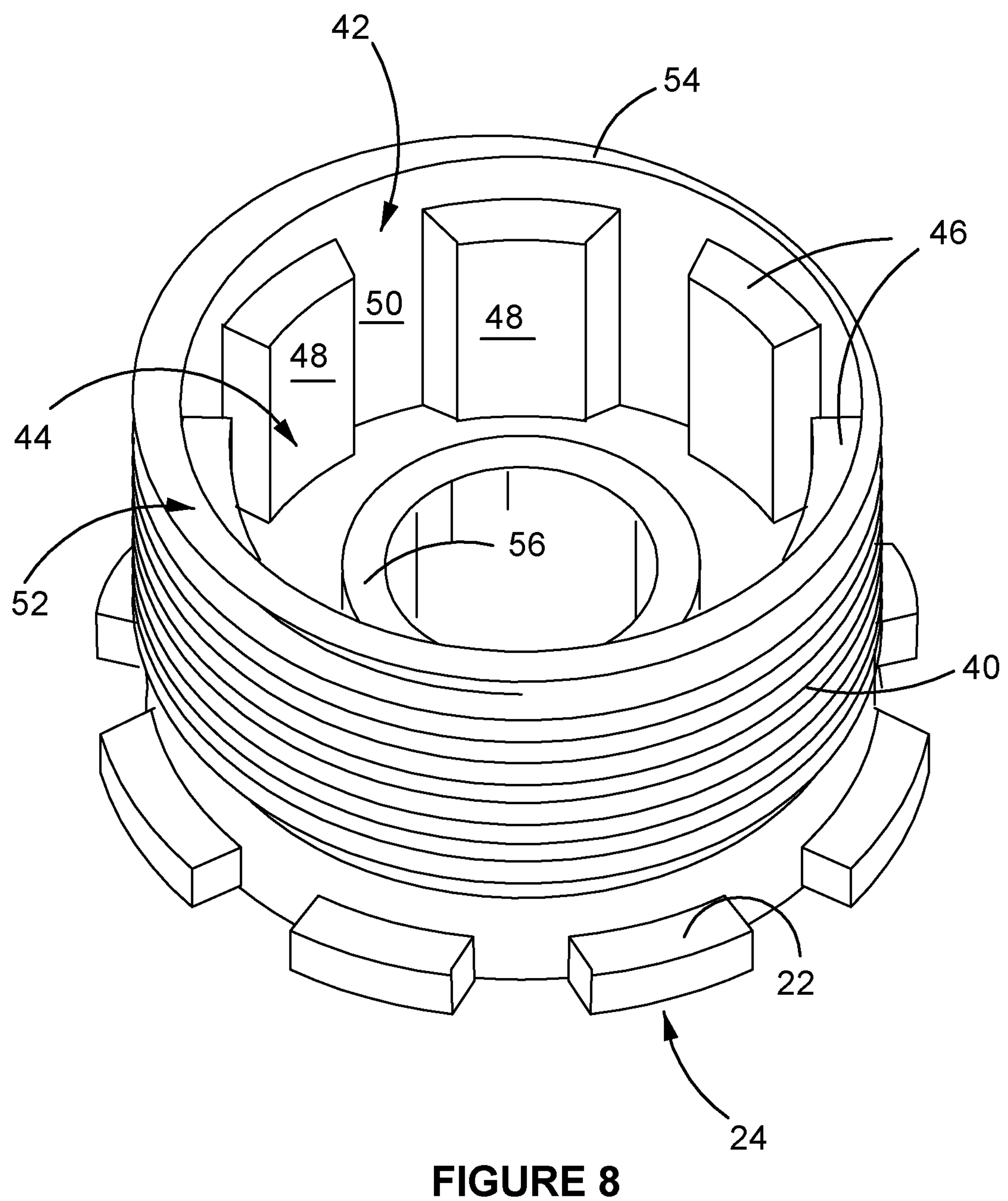
FIG. 8 is a close up of the inside of the channel of the first connector member of the connector part of FIG. 3.

Once inserted into the channel 44, the frame element 10 may be able to rotate in the channel. In order to prevent or at least reduce any unwanted rotation, the inside surface wall 42 of the channel 44 can be modified with rotation reducing portions 46 to engage the frame element 10. The rotation reducing portions 46 can be ribs 48 in the channel wall 42 that are received into complementary recesses 50' provided on the frame element 10. As can be seen in FIG. 8, the ribs 48 and recesses 50 are arranged circumferentially around inside wall 42 of the channel 44 of the first connector member 24. The frame element 10 would thus be prevented from rotating in the channel 44 since the ribs would not allow for rotational movement. FIG. 1 shows the complementary shaped rotation reducing portions 46 provided on a sleeve 32. The complementary shaped ribs 48' and recesses 50' slide over one another to prevent rotation. It should be understood that any shaping of the inside wall 42 of the channel and the frame element 10 (or associated sleeve 32) could be provided.

The channel 44 has an opening 52 through which the insertion portion A of the frame element 10 is received. The opening 52 can be defined by a front wall 54 of the channel 44 which can be a rim around the front of the first connector member 24. The front wall 54 at the forward part of the first connector member 24 can have a smooth flat surface which in some embodiments can be for engagement with the first surface 36 of the protrusion 26 or series of protrusions 26.

Figure 5A:
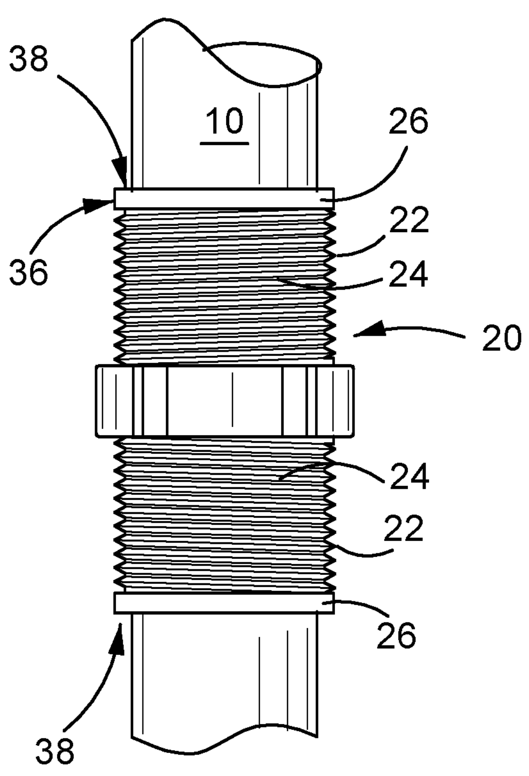
FIG. 5A and FIG. 5B shows frame elements in the first connector members.
Figure 5B:
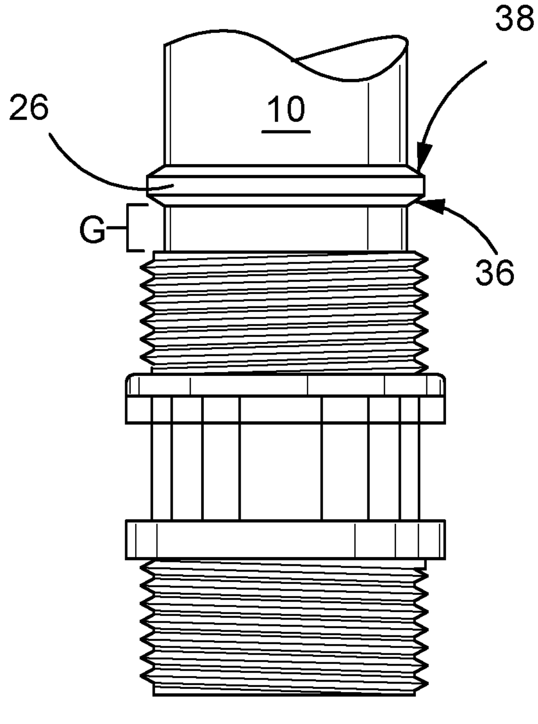
Figure 13:
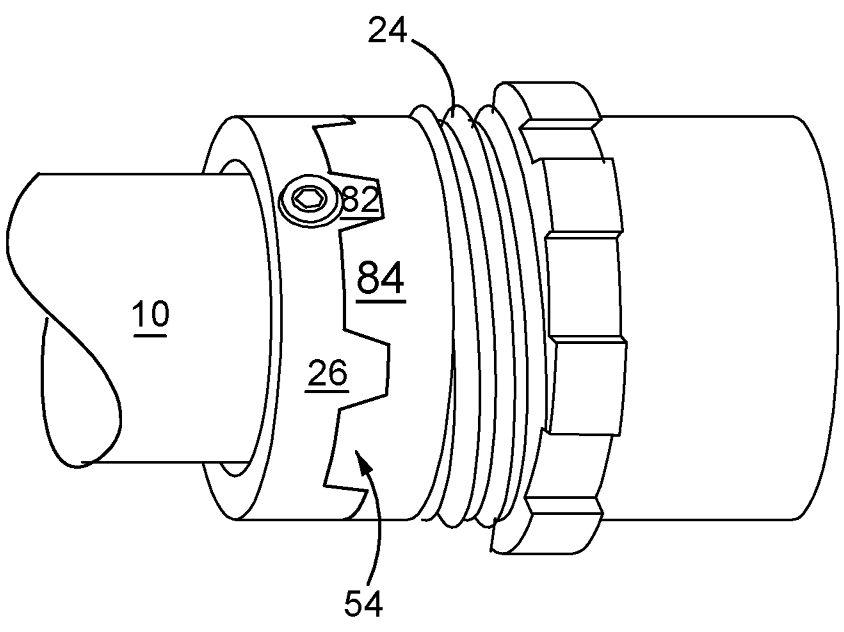
FIG. 13 is an embodiment in which the protrusions of the frame element interlock with the front wall of the first connector member.
Figure 14:
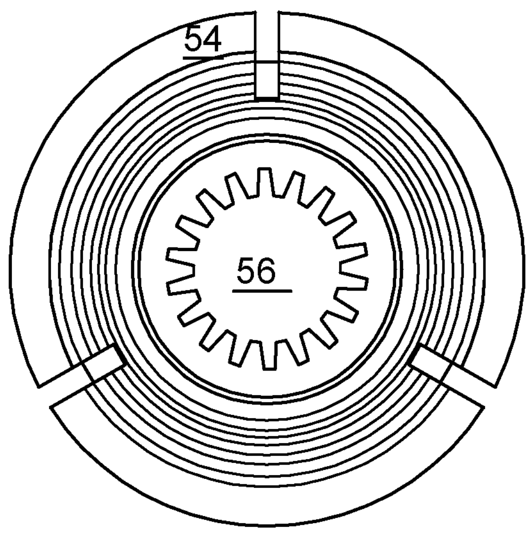
FIG. 14 is an embodiment in which the rear wall is modified to interlock with the first end of the frame element.

Upon insertion of the frame element 10 into the channel 44, the protrusion 26 or series of protrusions 26 can abut against the front wall 54 as shown in e.g. FIG. 5A providing a natural stop for further insertion movement of the frame element 10 into the channel 44. In embodiments, the front wall 54 can be modified so as to dovetail with the protrusion 26 which has a complementary shape to interlock with the front wall 54 (e.g. FIG. 13). This interlocking of the protrusion 26 and front wall 54 can prevent any rotational movement of the frame element 10 once inserted into channel 44 of the first connector 24. The channel 44 also have a rear wall 56. The first end 14 of the frame element 10 may or may not abut the rear wall 56 prior to the direct contact between the first 36 surface of the protrusions 26 or series of protrusions 26, and the front wall 54 of the first connector member 24. In embodiments, the rear wall 56 can be modified so as to interlock with the first end 14 of the insertion portion of the frame element 10, so as to further prevent any rotational movement of the frame element 10 once inserted. The interlocking can be by a lock and key type of complementary shaping which in FIG. 14 is shown as a star-shaped key 56 which sits into a complementary shaped lock on the first end 14 of frame element 10 (not shown). The lock and key can be reversed such that the lock part is on the rear wall while the key is provided on the frame element. The contact of the complementary shapes being received in lock and key arrangement can prevent rotation of the frame element 10 in channel 44.

Figure 41:
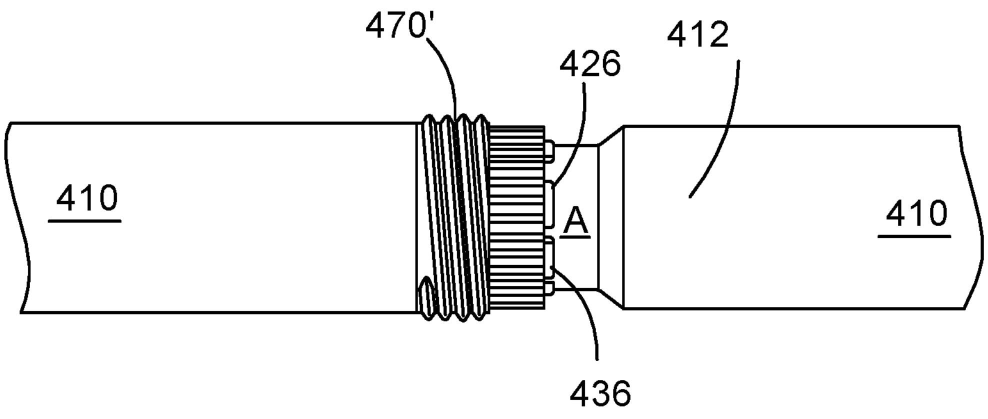
FIG. 41 shows the frame element of FIG. 39 in the first connector member of FIG. 40.
Figure 42:
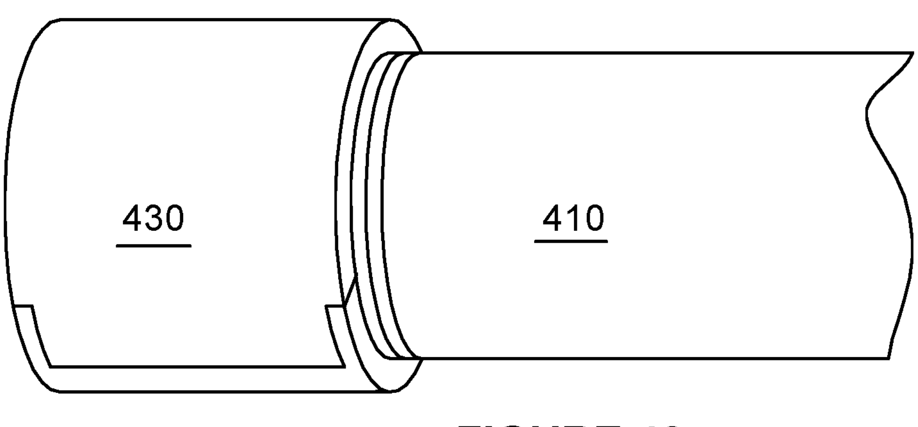
FIGS. 42 and 43 show an alternative embodiment of a second connector provided in two half parts.

The rear wall 56 can be a solid wall at the rear of the channel 44. The rear wall can be an annular wall 56. The rear wall 56 need only be sufficient to stop advancement of the frame element 10 through the channel 44 of the first connector 24. The rear wall 56 is shown in FIG. 8 as a barrier at the rear of the channel 44. In some embodiments, upon insertion of the insertion portion A of the frame element 10 into the channel 44, the first end 14 of the frame element 10 abuts the rear wall 56 of the channel 44 before the protrusion 26 or series of protrusions 26 contact with the front wall 54. In this embodiment, the rear wall 56 provides a natural stop for further insertion movement of the frame element 10. This is shown in e.g. FIG. 5B. In this embodiment, there will be a gap G between the front wall 54 and the protrusion 26 or series of protrusions 26. The gap G will eventually be covered by the second connector member 30 and should not affect the overall structural integrity of the connector system. FIG. 41 also shows that an embodiment in which the rear wall 456 provides a stop for the advancing frame element 410. In this embodiment, the protrusion will never prevent advancing movement into the channel 444 and instead the rear wall 456 is required as the stop.

Figure 7B:
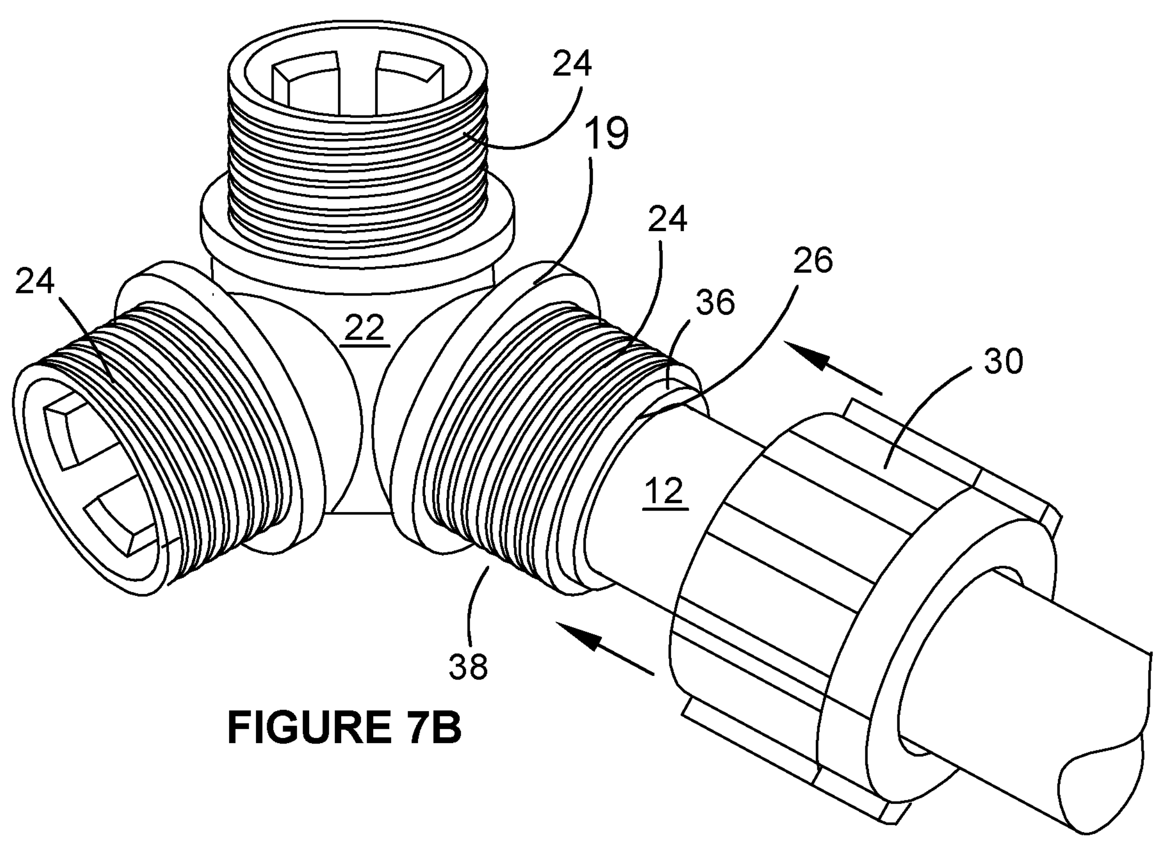
FIG. 7B shows a frame element being inserted into the channel of a first connector member.
Figure 7C:
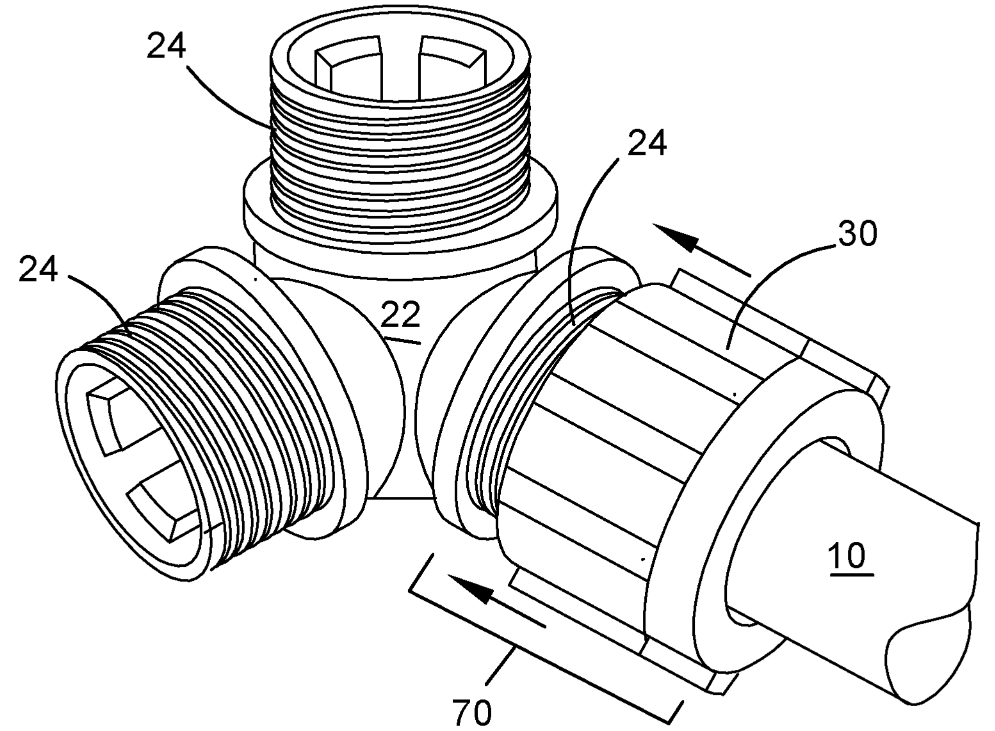
FIG. 7C shows the second connector member being applied to from the connector.
Figure 46:
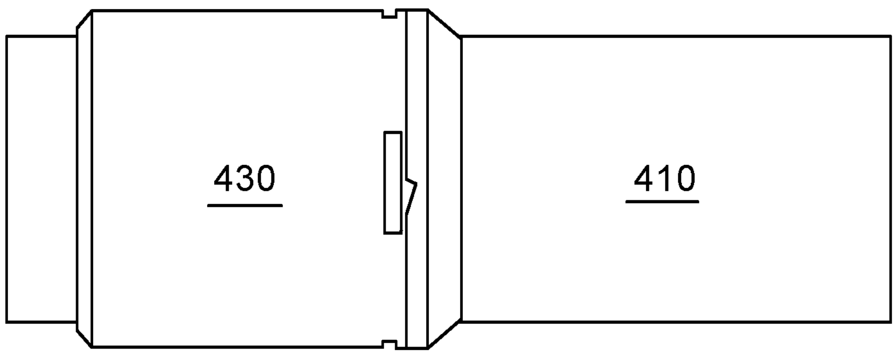
FIGS. 46 to 46 show a proposed experimental set up for testing rigidity.
Figure 47:
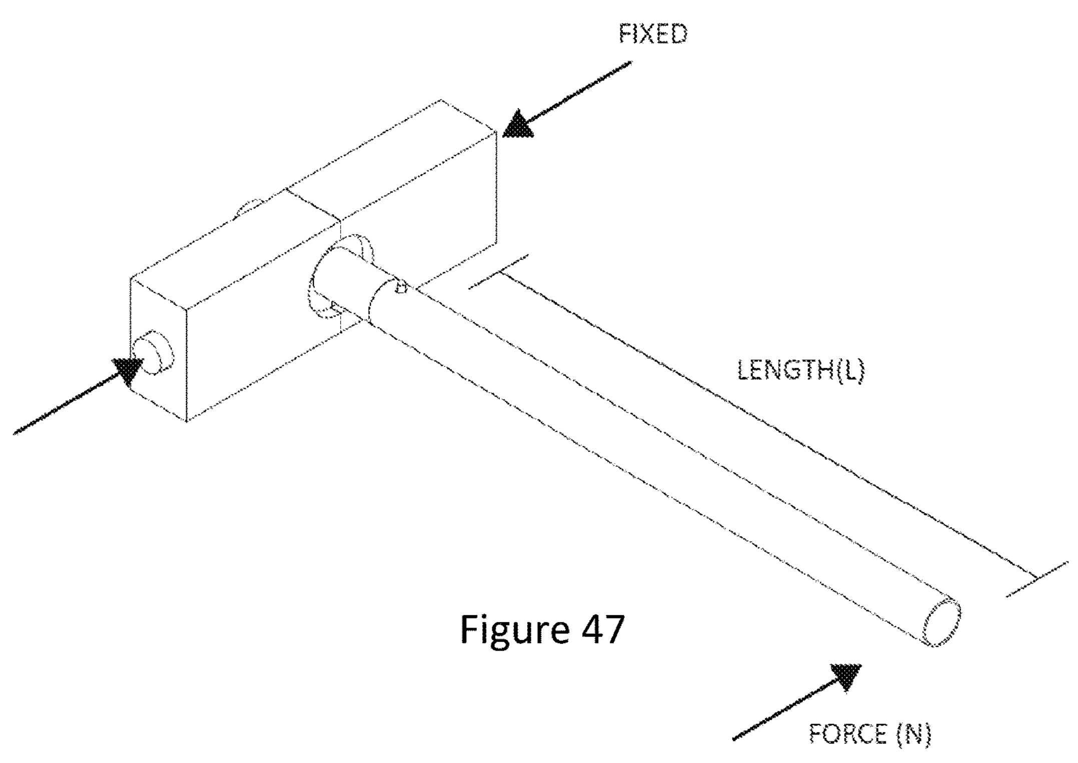
Figure 48:
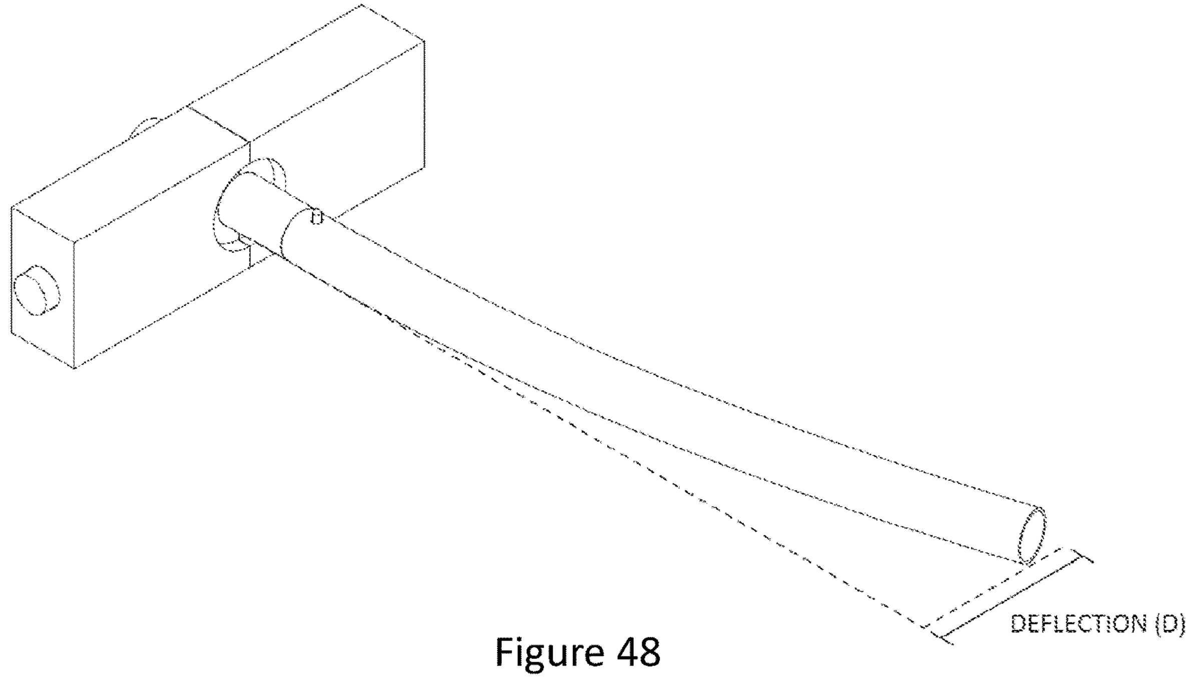
Figure 49:
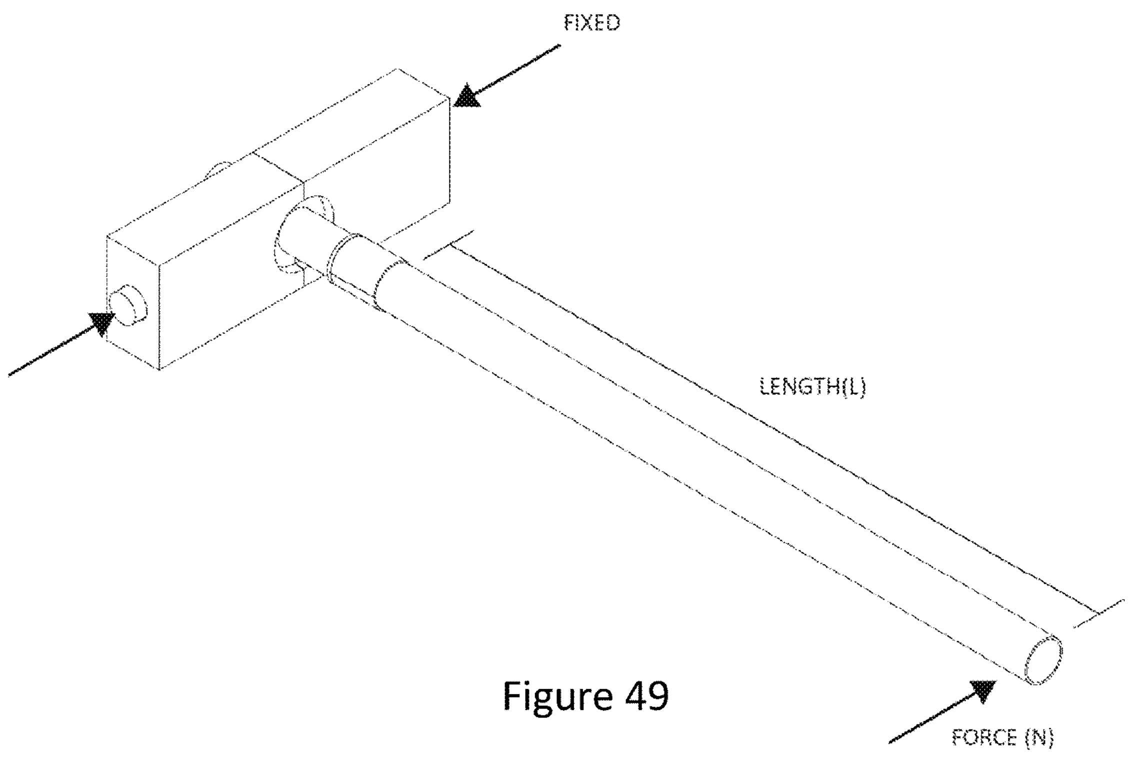
Figure 50:
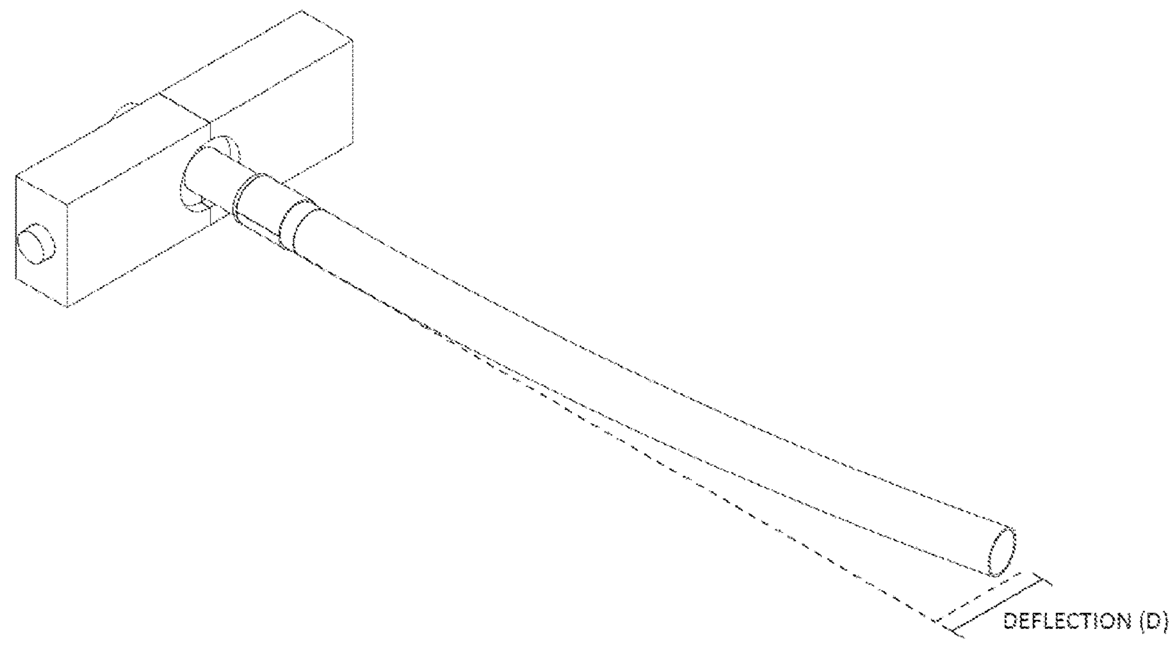

In order to complete the connector 20, the second connector member 30 is brought into contact with the first connector member 24. In FIG. 7B and FIG. 7C the direction of the movement of the second connector member 30 is shown by arrows. In an embodiment, the forward wall of the second connector member 30 can interlock with wall 19 of the first connector member 24. This is also shown in FIG. 46.

Figure 10:
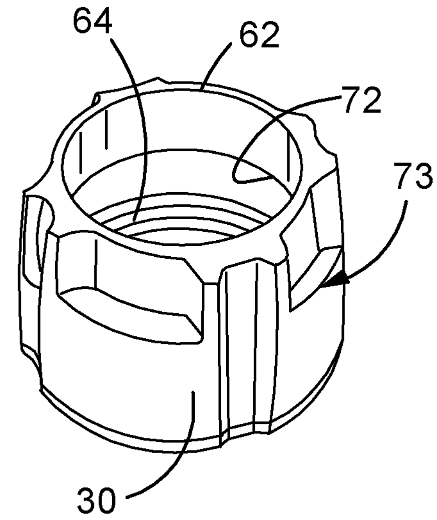
FIG. 10 shows four embodiments of second connector members.
Figure 10:
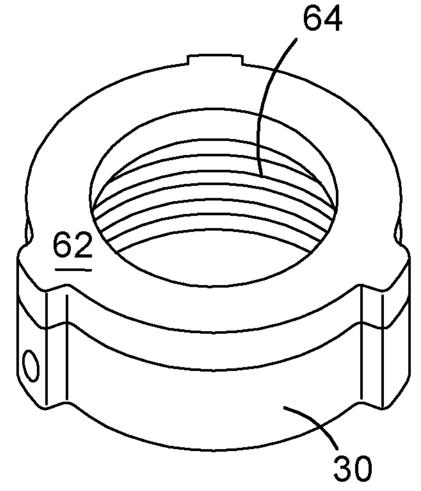
Figure 10:
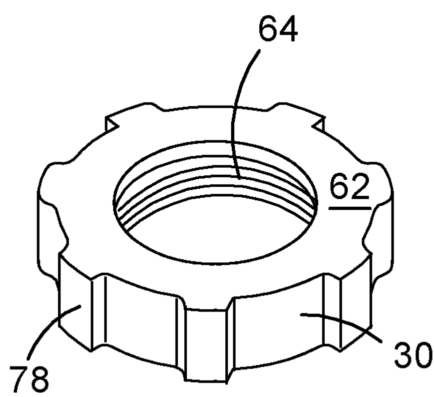
Figure 10:
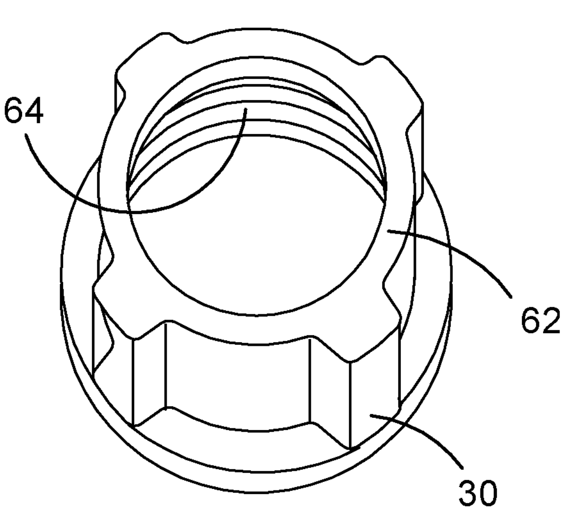
Figure 11A:
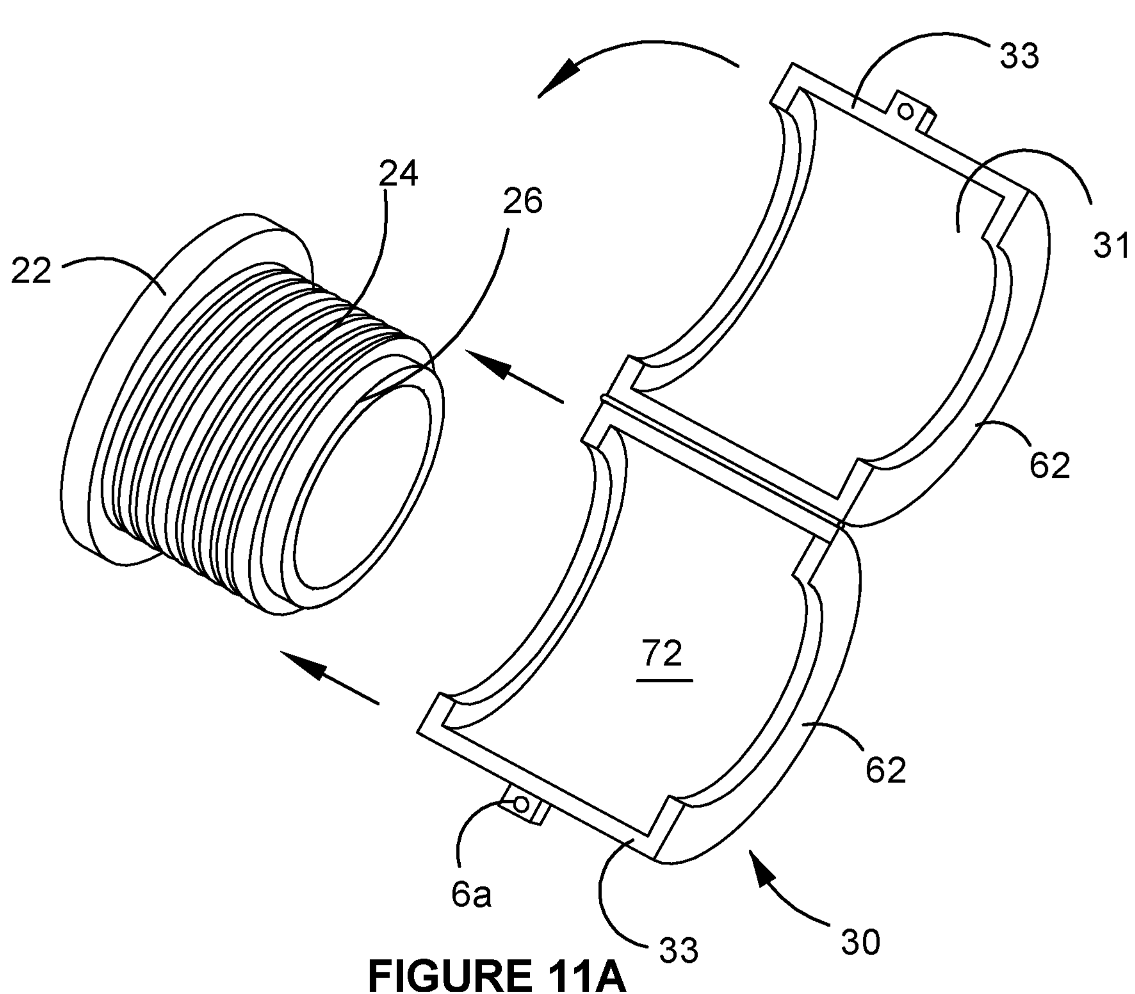
FIG. 11A is an alternative embodiment of a second connector member.
Figure 11B:
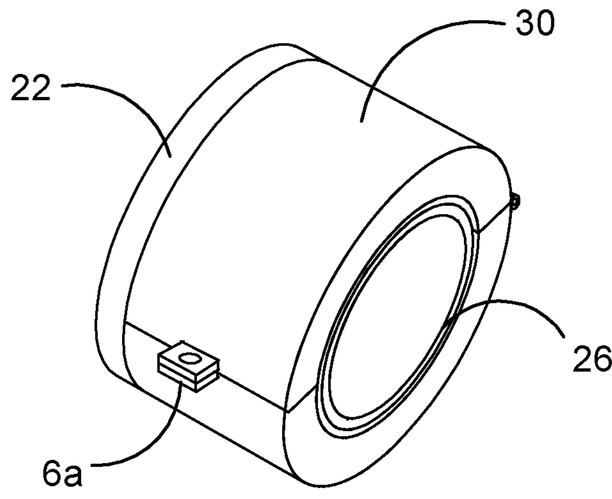
FIG. 11B is the second connector member of FIG. 11A when locked in position.

FIG. 10 shows a variety of second connector members 30. In an embodiment, as shown in FIG. 11, the second connector member 30 is in two or more parts 31 and 33 and it is assembled around the first connector member 24. The second connector member 30 can be in parts that are hingedly (or otherwise) connected to one another and which can be clamped around the first connector member 24 and then locked into position. The second connector member 30 can have an open position as shown in FIG. 11A which can receive the first connector member 24; and a closed, locked position as shown in FIG. 11B in which the second connector member 30 is locked around the first connector member 24.

To lock the second connector member 30 that comes in a plurality of parts into place around the first connector member 24, there can be a locking mechanism 6*a*. The locking mechanism can comprise screws, hook and tab or other. Once in place, the second connector member 30 provides a barrier wall 62 that abuts the second side 38 of the circumferential protrusion 26 or series of protrusions 26. The barrier wall 62 thereby prevents any removing movement of the frame element 10 from the channel 44 of the first connector member 24. The barrier wall 62 can be provided as one continuous wall covering the second side 38 of the circumferential protrusion 26 or series of protrusions 26. The barrier wall could also be provided in separate wall parts. provided that the circumferential protrusion 26 or series of protrusions 26 abut against it and their movement is barred.

In an embodiment, the second connector member 30 is in one part as shown in FIG. 10. When the second connector member 30 is in one part, it is necessary that it has a passageway 64 therethrough to receive the frame element 10. The second connector member 30 can be slid over the frame element 10 and brought towards the insertion portion A inside the channel 44 of the first connector member 24. Once in place around the first connector member 24, the second connector member 30 provides a barrier wall 62 that abuts the second side 38 of the circumferential protrusion 26 or series of protrusions 26. The barrier wall 62 thereby prevents any removing movement of the frame element 10 from the channel 44 of the first connector member 24.

Figure 12:
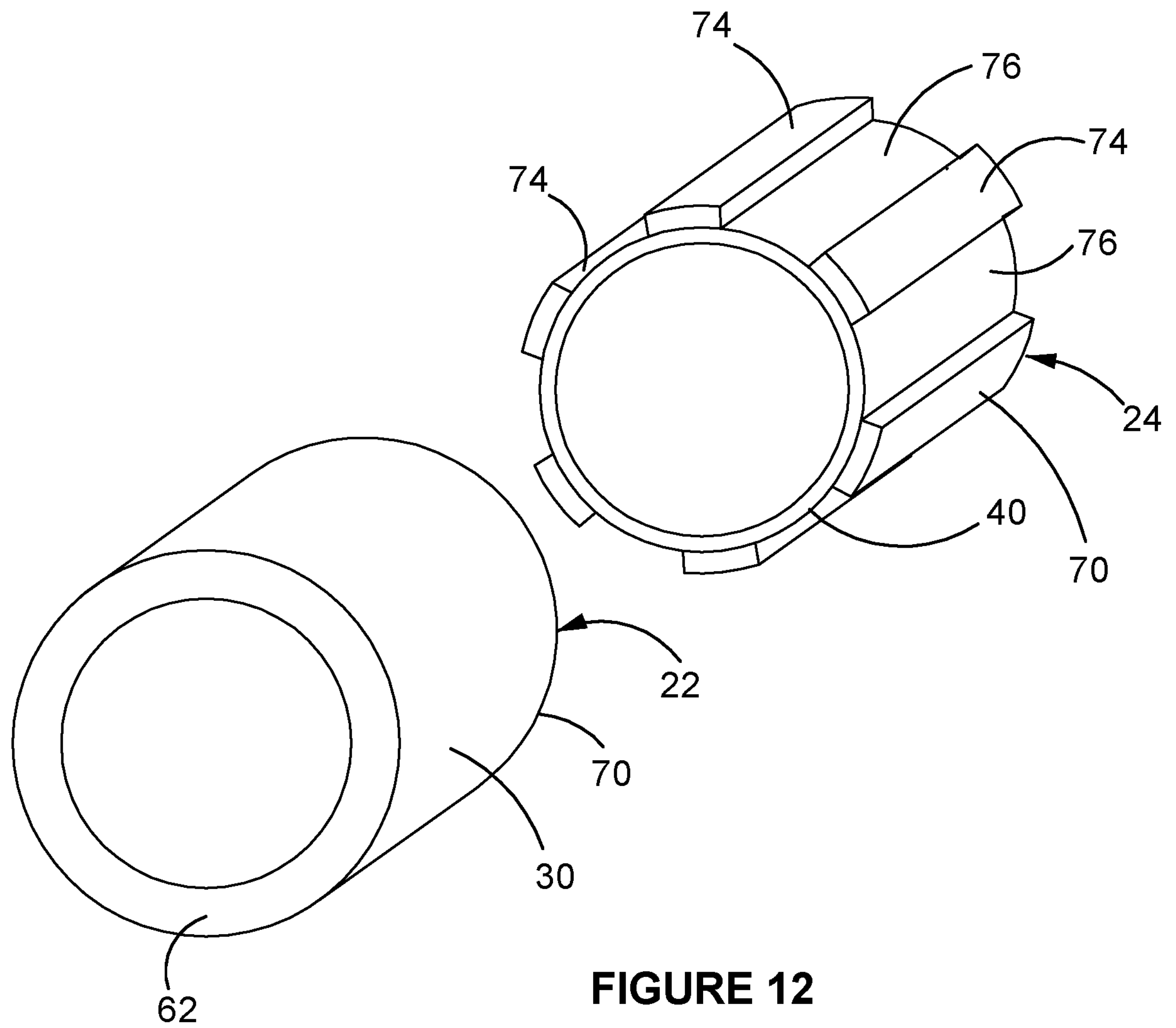
FIG. 12 is an embodiment of the first connector member and second connector member in which an alternative to screw threads is employed.

The second connection member 30 comprises a connection assembly 70 associated with the barrier wall 62 that is configured to engage the second connector member 30 to the first connector 24 member so that the barrier wall 62 is able to act as a barrier. The function of the connection assembly 70 is to prevent unintentional disengagement of the barrier wall 62 from the first connector 24. The connection assembly 70 can be any means that reversibly connects the second connection member 30 to the first connection member 24. In an embodiment, the connection assembly 70 is a series of complementary ribs and recess (or protrusions and apertures; or like) on the outside wall 40 of the first connector member 24 and the inside wall 72 of the second connector member 30 that are complementary shapes and which upon engagement cause the first connector member 24 and the second connector member 30 to be interlocked together to prevent disengagement of the second connector member 30. FIG. 12 shows the arrangement with ribs 74 and recesses 76 on outside wall 40. The complementary shaped ribs 74' and recesses 76' on inside wall 72 of the second connector member 30 cannot be seen.

The connection assembly 70 as shown can also prevent any rotational movement of the second connector member 30 relative to the first connection member 24 when locked into position. The connection assembly 70 can operate together with the locking mechanism 6*a* on the second connector member 30 to reversibly engage the first connector member 24 and second connector member 30 to one another.

In an embodiment, complementary ribs 74 and recesses 76 on the outside wall of 40 the first connector member 24 and the inside wall 72 of the second connector member 30 forming the connection assembly 70 come in the form of screw threads. In this embodiment, as shown in the Figures the second connector member 30 can be screwed onto the first connector member 24 to be interlocked.

As the second connector member is screwed onto the first connector member 24 in a first direction (see FIG. 7), the barrier wall 62 moves closer to the circumferential protrusion 26 or series of protrusions 26. When the barrier wall 62 abuts the second side 38 of the protrusion 26 or series of protrusions 26 (or the first end 14 of the frame element 10 hits rear wall 56 of channel 44), the second connector member 30 can be given one last tightening turn and then it substantially remains in position. The second connector member 30 can be turned in a second direction that is opposite to the first direction to remove or disengage it from the first connector member 24. When the second connector member 30 is required to be removed from the first connector member 24, it can be turned in the second direction until the barrier wall 62 is moved away from the circumferential protrusion 26 or series of protrusions and the threads disengage 26.

To assist in applying the second connector member 30 to the first connector member 24 in embodiments, the outside wall 73 of the second connector member can be modified with a gripping surface 78 (FIG. 10). The gripping surface can include one or more gripping ridges 78 that allow for purchase to be applied to the second connector member 30 to force it into position.

To indicate to the user when the second connector member 30 is in location such that the protrusion 26 or series of protrusions 26 is/are sandwiched between the first connector member 24 and the second connector member 30 there can be provided an indicator 80. In an embodiment, the indicator 80 is a click sound that is made when the barrier wall 62 of the second connector member 30 engages with the front wall 54 of the first connector member 24. In FIG. 13, the indicator 80 is shown as protrusions 82 which click with recesses 84 on the protrusion 26. FIG. 46 shows lower profile protrusions that connect with complementary shaped indentations.

Figures 6A, 6B, 7A:
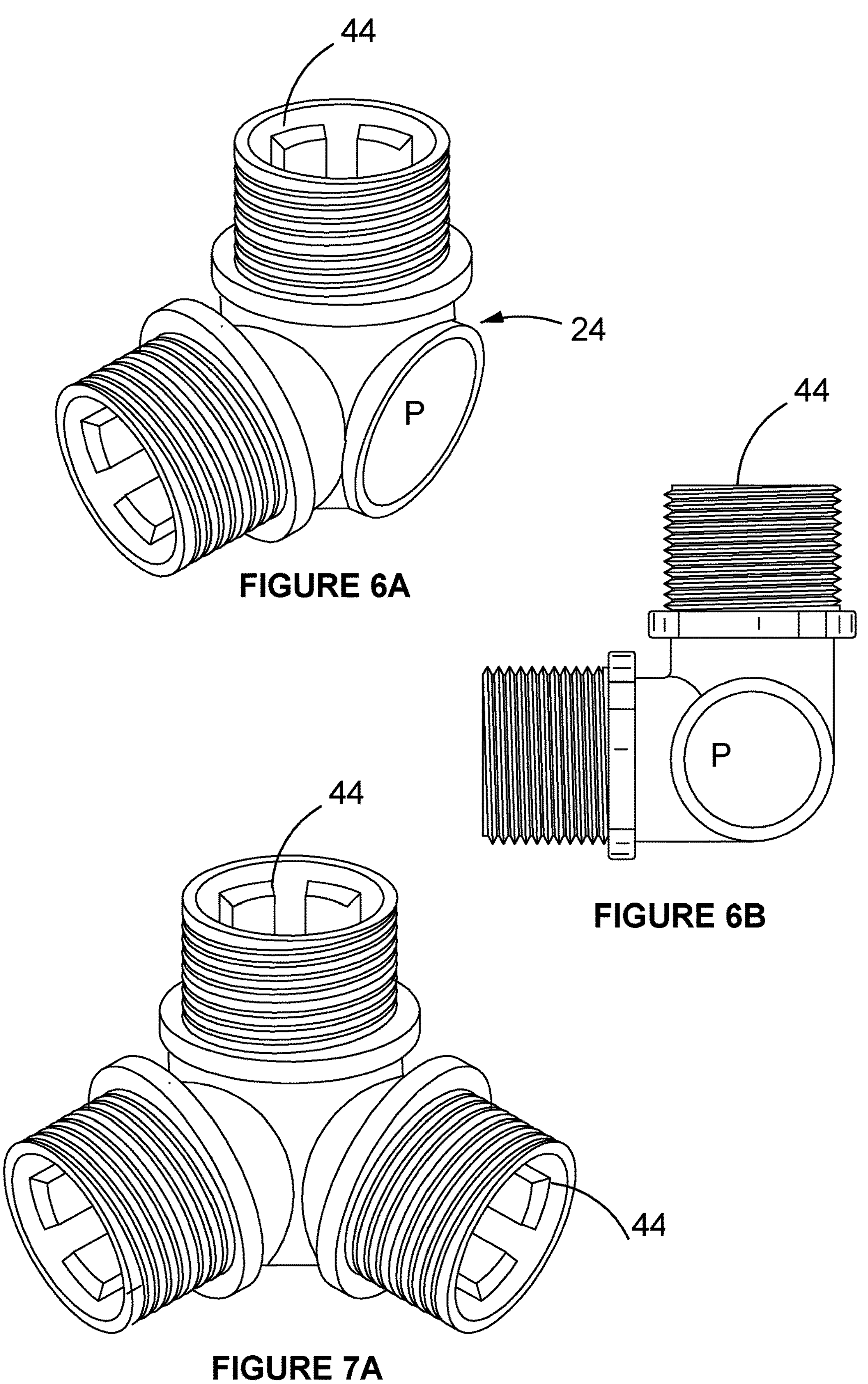
FIGS. 6A and 6B are connector parts for joining frame elements at right angles to one another.
FIG. 7A is a connector part for joining three frame elements.
Figure 21:
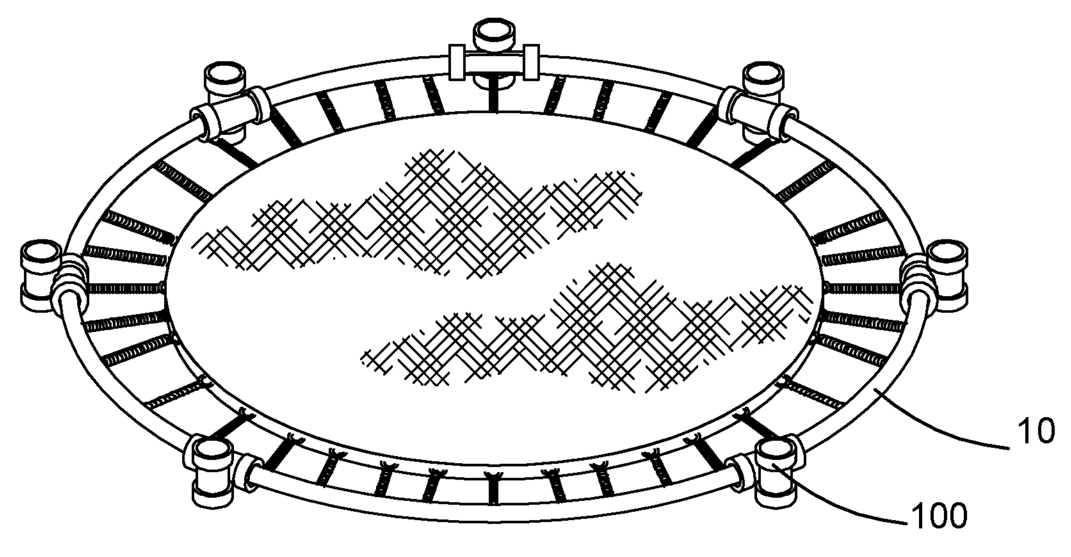
FIG. 21 shows the connector in place in a trampoline frame.

FIG. 6 is a right-angled connector which allows the connection of frame elements at right angles to one another. Any variation of angle can be accommodated by modification of the connector. A passageway P is also provided through the connector which allows for a further frame element to be joined to the connected frame elements. FIG. 7 is a three-way connector which allows for the joining of three frame elements into each of the channels 44 of the connector. FIG. 21 shows the connector 100 in place joining the frame elements 10 of a trampoline.

Figure 15:
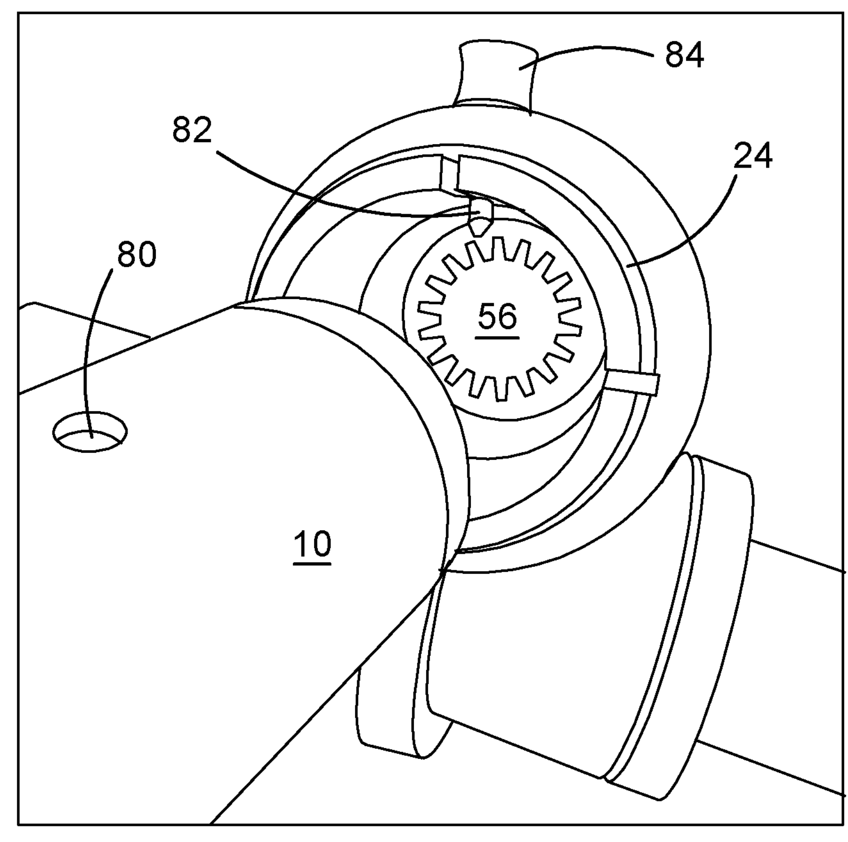
FIG. 15 is an embodiment in which the frame element comprises an indentation, and a movable protrusion is provided in the channel of the first connector element.
Figure 16:
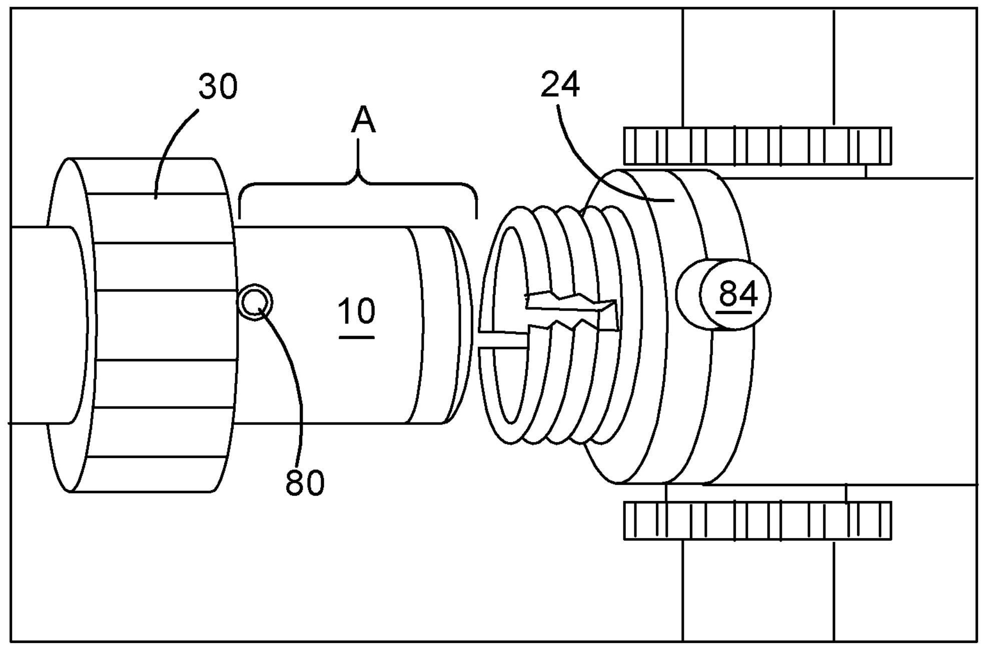
FIG. 16 is an alternative view of the connector of FIG. 15.

In an embodiment, the insertion portion A of the frame element 10 has an indentation 80 on the frame element body 12. The function of the indentation 80 is to provide a part of the frame element that can be gripped by the first connector 24 in use. As insertion portion A slides into the channel 44 of first connector 24 (as shown in FIGS. 15 and 16), protrusion 82 provided on the side wall of channel 44. The user grips protrusion mover 84 which comprises a spring-loaded pin biased towards the protracted or engaged position as shown in FIG. 15. Upon pulling the pin upwards against the bias pressure, the protrusion 82 is removable from the channel space and into the wall of the first connector 24. In this retracted position, there is room for the frame element 10 to be inserted. When the user relieves the pressure on protrusion mover 84, and the protrusion 82 is released back into the channel, the protrusion 82 is aligned with indentation 80. The protrusion 82 engages with the indentation 80 and thereby prevents unwanted removal of the frame element 10 from the channel 44. For additional structural stability in use, a second connector 30 can then be located over the first connector element 24 in the same way as described above. As can be seen in FIG. 16, the connection assembly 70 allowing the first connection element 24 and second connection element 30 to mate can be screw threads.

Figure 17A:
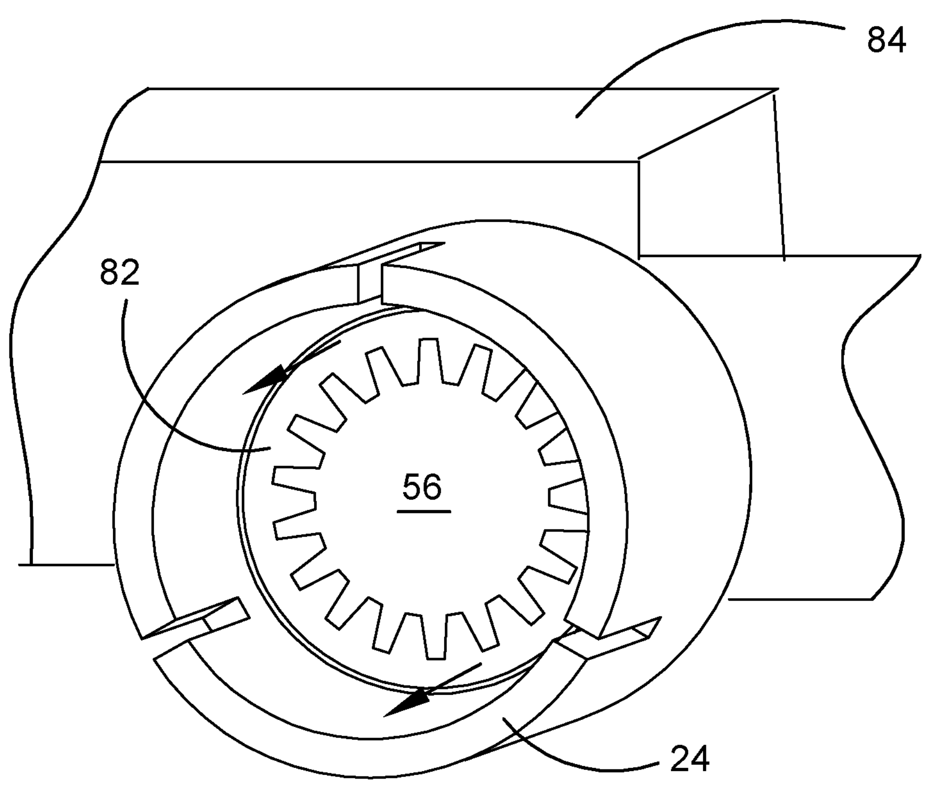
FIG. 17 is an alternative embodiment in which the frame element comprises an indentation, and a movable protrusion is provided in the channel of the first connector element.
Figure 17B:
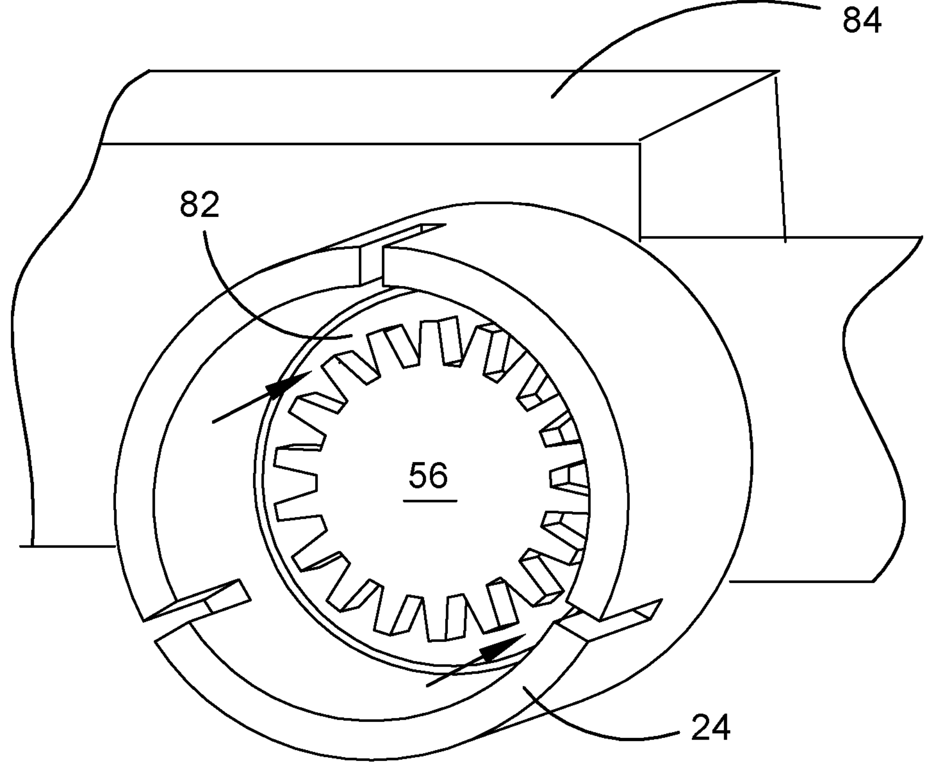
Figure 18:
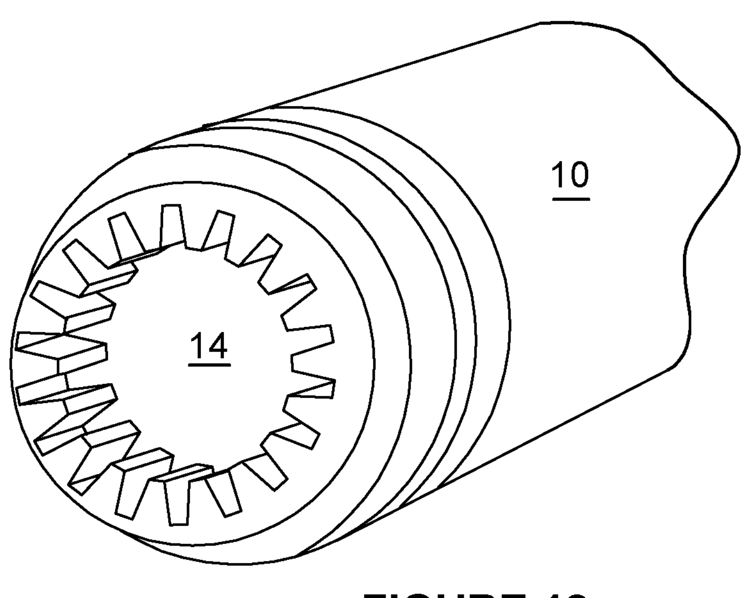
FIG. 18 is a perspective view of a frame element for insertion into the first connector member of FIG. 17.
Figure 19:
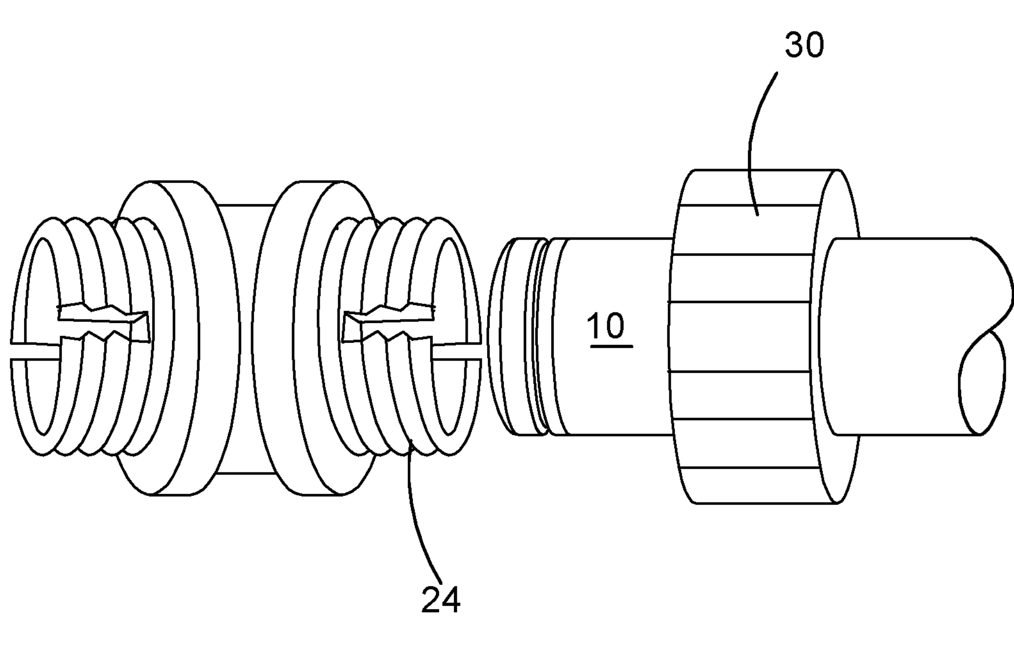
FIG. 19 shows the first and second connector members relative to the frame element of FIG. 18.

FIGS. 17A and 17B show an alternative embodiment in which the protrusion 80 is an annulus 82 movable out from the channel 44 of the first connector by application of pressure onto protrusion mover 84. When the user applies pressure to protrusion mover 84 as shown in FIG. 17A, the insertion portion A of frame element 10 can be pushed all the way into the channel 44 until the first end 14 of the frame element 10 engages with the rear wall 56. As can be seen in FIG. 17A, the rear wall is modified with a star-shaped key 56 which sits into a complementary shaped lock 56' on the first end 14 of frame element 10 (see FIG. 18). As can be seen in FIG. 19, as the frame element 10 is inserted into the first connector 24, second connector 30 can be moved into position.

Figure 20:
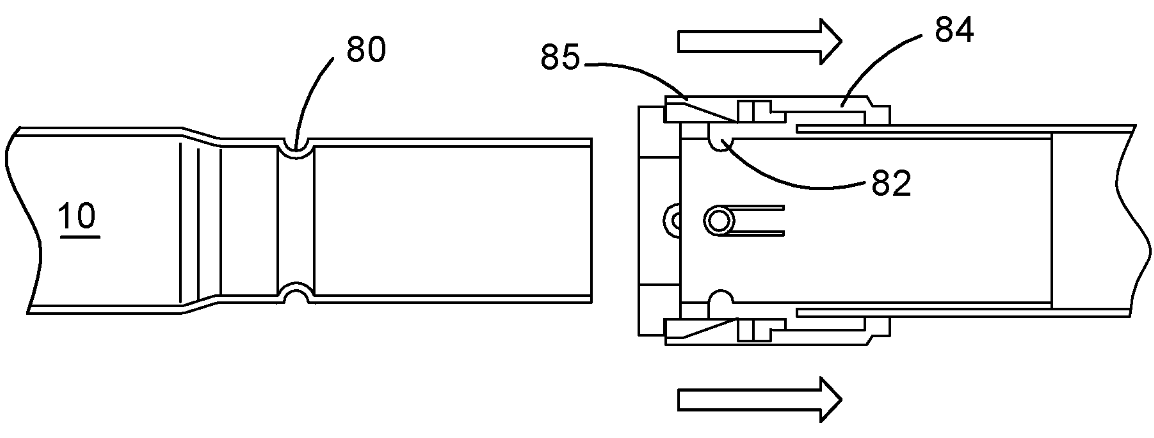
FIG. 20 is an alternative embodiment in which the frame element comprises an indentation, and a movable protrusion is provided in the channel of the first connector element.

In the embodiment shown in FIG. 20, there is shown an embodiment in which the protrusion 82 is also spring biased; however, in this embodiment, rather than the protrusion 82 being spring biased into the channel 44 of the first connector member, the protrusion 82 is spring biased out of the channel 44. As sleeve 84 is manually moved in the direction of the arrow shown in FIG. 20, the protrusion 82 is able to relax and extend into the wider aperture 85 of the sleeve 84. In this retracted position, the frame element 10 can be inserted. Once inserted, the sleeve 84 retraction can be released, and the sleeve 84 forces protrusion 82 into the indention 80 which aligns with it in the channel. There is no second connector 30 in this embodiment, although one could be used if desired.

Figures 22, 23:
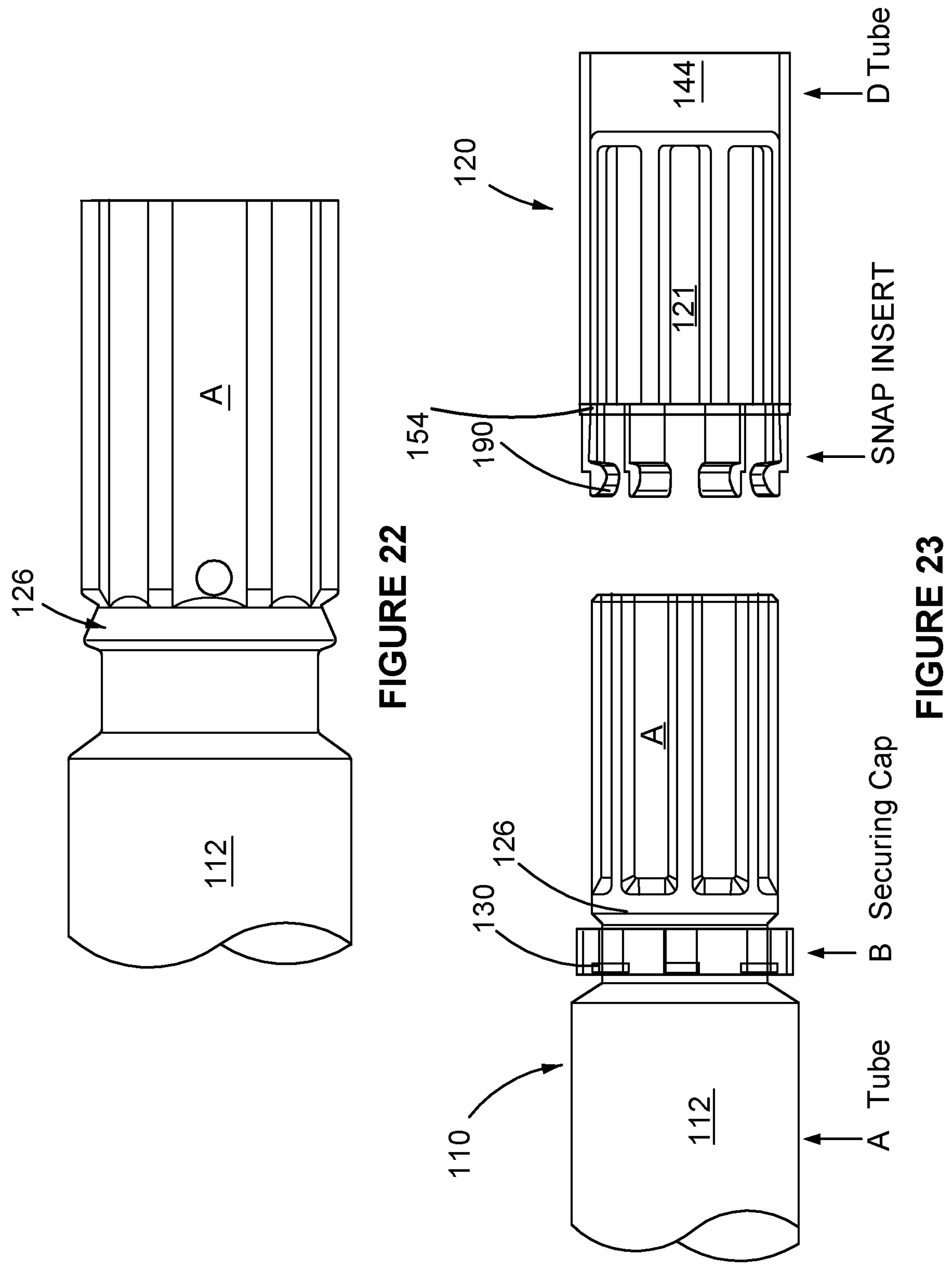
FIG. 22 is an alternative embodiment of the frame element for the connection system.
FIG. 23 is a side view of the frame element of FIG. 22 moving towards an movement of a first connector.

In an embodiment, frame element 110 has an elongate body 112. The end of the frame element 110 that will join with the connector 120 can have an insertion portion A. The insertion portion A is intended for insertion into the body 120 of the first connector 144. As shown in FIG. 23, the channel 144 inside the first connector 120 can be provided by an insert 121 that slides into a tube D to form the first connector 120. To join the insert 121 with the tube D and prevent unwanted movement of it out of the tube D during use, the tube D and connector insert 121 can be crimped together or otherwise fastened (not shown).

In some embodiments, where the connector is for a tube to tube in a longitudinal line, the front wall 154 of the connector 120 can be modified with at least one gripper 190. There can be any number of grippers 190 arranged around the circumference of the front wall 154. In an embodiment there are eight grippers 190 (only four can be seen in FIG. 23). A plurality of narrow grippers 190 can provide improved flexibility over fewer wider grippers 190. Each of the grippers 190 can be configured to engage with the protrusion 126 provided on the frame element 110. When sliding into the channel 144, the protrusions 126 can slide under the finger like grippers 190 which will engage and grip the protrusion. Once grippers 190 are locked over the protrusion 126, it should be understood that removal of the frame element 110 from the channel 144 of the first connector 120 would be difficult unless each of the gripper 190 fingers is lifted off the protrusion 136 to release it. Effectively, the grippers 190 prevent the frame element 110 from being unwantedly withdrawn from the first connector 120.

In this embodiment of FIG. 23, the second connector member 130 is a collar that can be passed over the grippers that have engaged with the protrusion 126. The second connector member 130 thereby ensures that the grippers 190 are held into the gripped position and ensure that the grippers 190 are unable to release their gripping forces. The collar 130 can be held in place by frictional forces or other locking mechanism. To release the connector system, the collar 130 can be disengaged, the grippers 190 can be released from protrusions 126 (manually or using tools) and then the frame element 110 can be withdrawn from connector 120.

Figure 24:
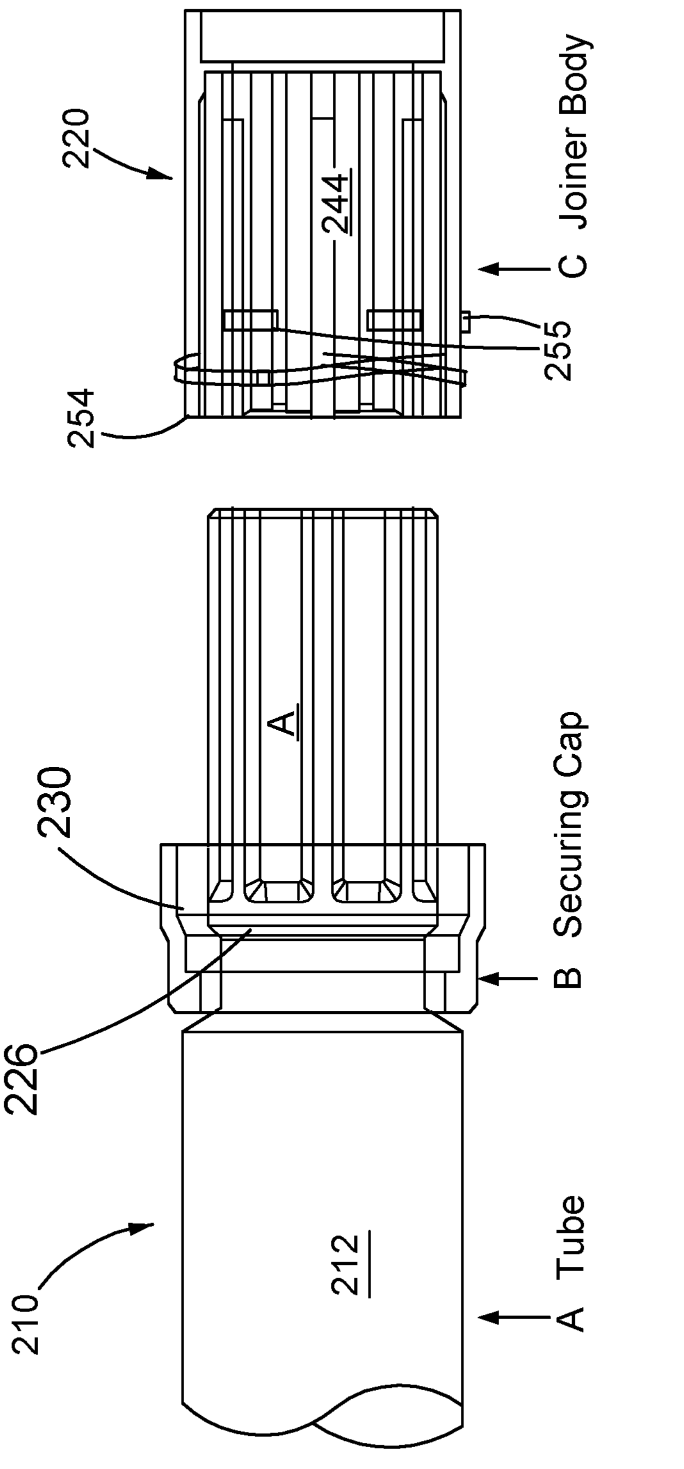
FIG. 24 is an alternative embodiment of a connection system.

FIG. 24 shows an embodiment in which the frame element 210 that will join with the connector 220 has an insertion portion A. The insertion portion A is intended for insertion into the body 220 of the first connector 244. Once inserted, the second connector member 230 can be locked into position by engagement of the connection assembly being a quarter turn screw thread 253 with complementary features on the inside surface of second connector member 230 and outside wall of connector 244. In order to further prevent unintended removal of the second connector member 230 once in position, there can be tabs 255 which snap into the second connector member 230. These tabs can function as protrusions 226. The tabs 255 can be sandwiched between the first connector member and the second connector member, wherein the rod or tube 210 cannot be removed from the connection system until the second member 230 is disengaged from the first connector member 220.

Figure 37:
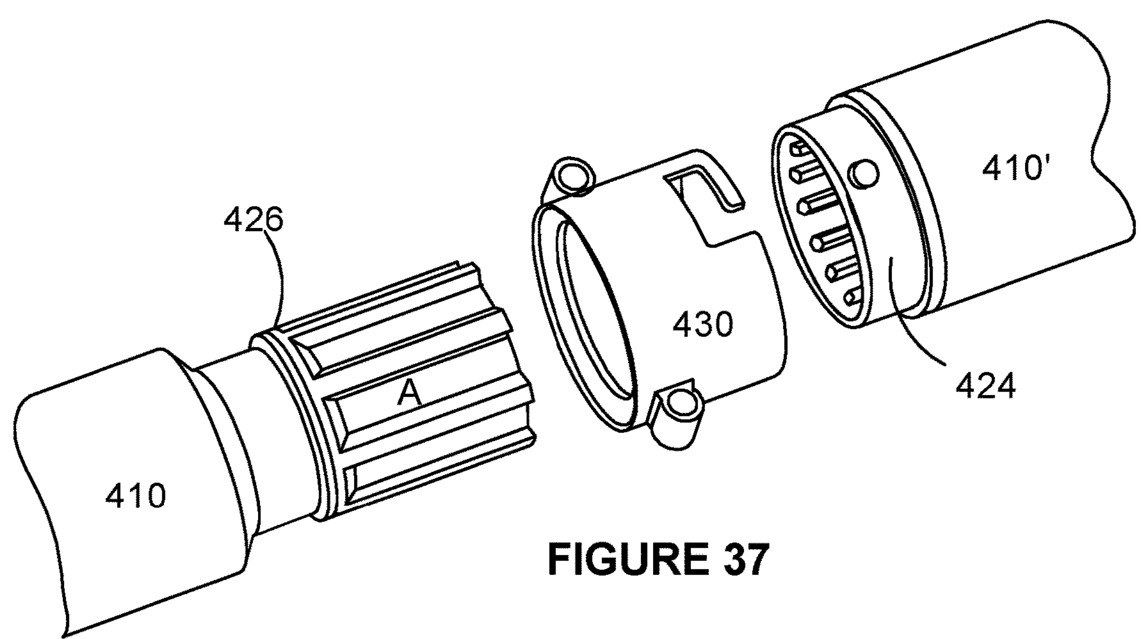
FIG. 37 is an embodiment of an in-line connector joining two frame elements.
Figure 38:
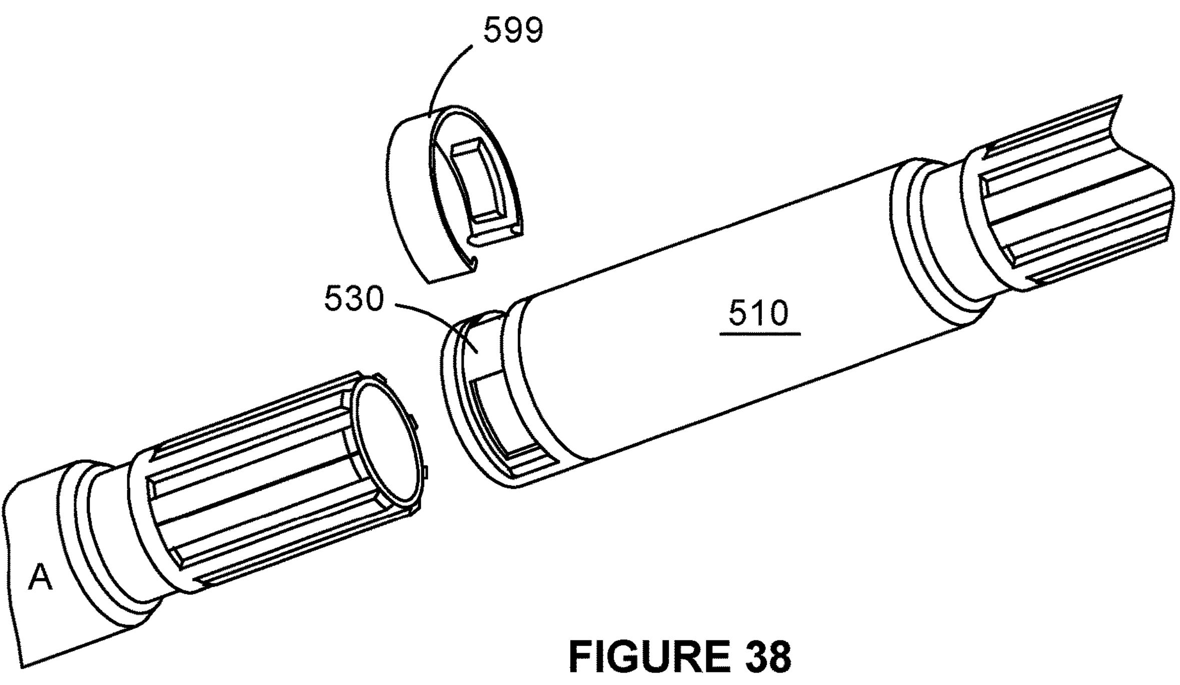
FIG. 38 is an alternative embodiment of an in-line connector joining two frame elements.

In another embodiment, insertion portion A is received in first connector 424 and then collar 430 is secured around the joined frame elements 410, 410' with protrusion 426 sandwiched between them. A turn of the second connector 430 will secured it in place (FIG. 37). In FIG. 38 there is shown another embodiment in which a clip 599 can be pressed over second connector 530 to secure it into place.

Figure 25:
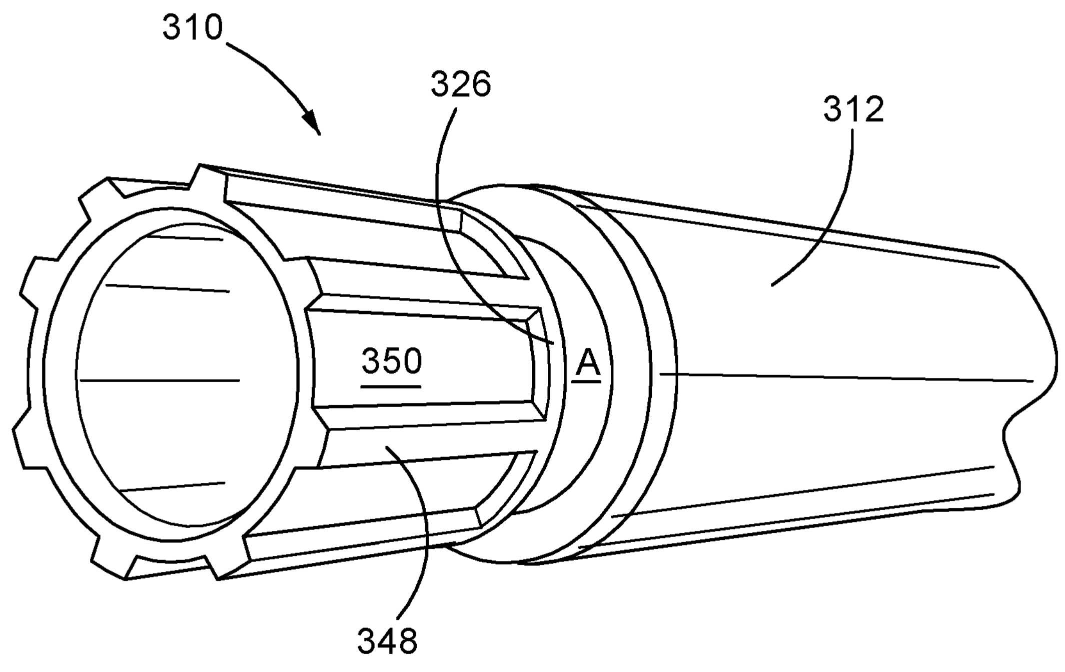
FIG. 25 is an embodiment of a frame element.

Turning now to FIG. 25, there is shown a frame element 310 with a body 312. The end of the frame element 310 that will join with the connector can have an insertion portion A. The insertion portion A is intended for insertion into the body of the first connector 324. The insertion portion A can be integral with the body 312. The insertion portion A can have a smaller diameter to the remainder of the elongate body 312 of the frame element. This can be useful where the insertion portion slides into the first connector member and is secured into position by a second connector member where the outside surfaces of the elongate body of the frame element and second connector member can be substantially flush with one another as shown in e.g. FIG. 36.

In FIG. 25, it can be seen that there is one circumferential protrusion 326. The protrusion 326 is accompanied by longitudinal splines 348 that extend along the longitudinal length of the insertion portion A. These splines 348 can assist with decreasing rotation of the frame element 310 once inserted into the first connector 324, if there are complementary ribs inside the channel 344 of the first connector 324.

An embodiment in which there are a plurality of longitudinal splines 448 around the outside periphery of the insertion portion A is shown in FIG. 39. Each spline 448 is shown formed in one single piece. The spline 448 is formed across about 85% of the distance of the insertion portion A with a land where the barrier wall 462 will eventually be located. Each spline 448 is shown having an elongate axis substantially aligned with the longitudinal axis of the frame element.

Also shown in FIG. 39 is that the end of insertion portion A can be capped with a capping button 427.

There are eight splines 448 provided around the periphery of the insertion portion A. Each spline has a first longitudinal side 448' and a second longitudinal side 448". Each spline has a forward end 436. When the insertion portion A of the frame element 410 is inserted into the first connector member 424 the spline 448 can slide into a channel formed in the inside surface of the first connector member 424. Each channel in the first connector member can be formed from longitudinal ribs 446. Each rib 446 can have a first side and a second side. The first side of the rib 446 can abut with the first longitudinal side of a spline 448 and the two are unable to pass over one another. This means that rotational forces applied to the frame element 410 are absorbed by the splines 448 and ribs 446 and the frame element 410 is prevented or substantially reduced from rotating inside the first connector member 424.

Turning back to FIG. 25, the diameter of the frame element is about 3.5 cm (measured from outside wall to outside wall). The diameter of the frame element (measured from outside edge of protrusion 326 to outside edge of protrusion 326) is increased to about 3.9 cm by the protrusions (about 10%).

Figure 26:
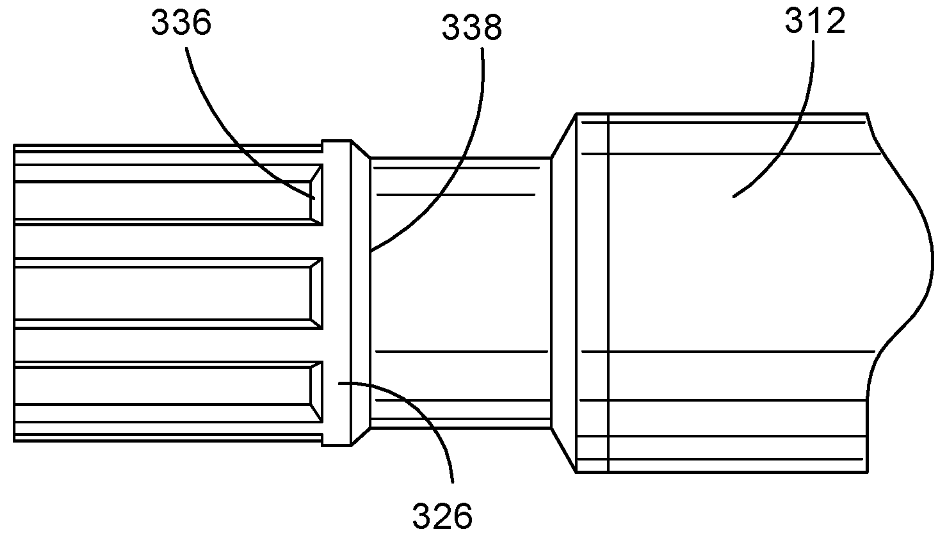
FIG. 26 is an alternative view of an embodiment of the frame element.

As shown in FIG. 26, the protrusion 326 comprises a first side 336 and a second opposing side 338. Upon insertion of the insertion portion A of the frame element 310 into the connector 324, the first side 336 of the protrusions 326 is facing forward towards the first connector 324. The second side 338 of the protrusions 326 is thus facing outwardly once the frame element 310 is engaged with the first connector 324.

The connector 320 of the present invention comprises a first connector member 324 operable with a second connector member 330. The first connector member 324 comprises an outside surface. The first connector member has an inside surface which is the wall defining the interior of a channel 344.

Figures 27, 28:
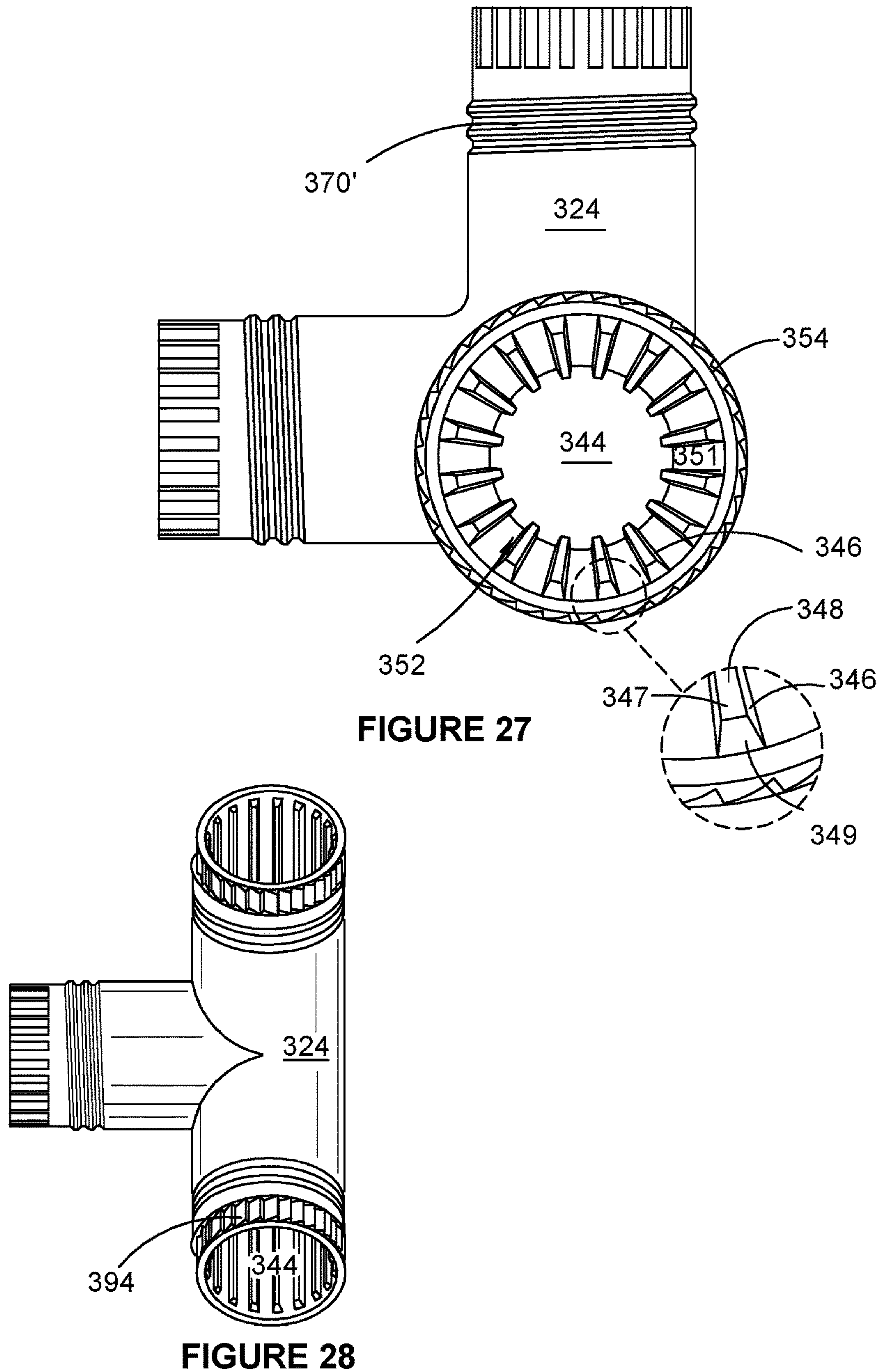
FIG. 27 is an embodiment of a first connector showing inside the channel of one of the first connector members. The inset is a close up of the rotation reducing portion on the inside surface of the channel.
FIG. 28 is an alternative view of the first connector of FIG. 27.

The channel 344 in the first connector 324 is configured to allow insertion of the insertion portion A of the frame element 310. The channel 344 can be slightly wider than the insertion portion A of the frame element 310 to ensure that it can fit therein. In a preferred embodiment, the channel 344 is about the same diameter as the frame element 310 so as to allow a tight interference fit. Once inserted into the channel 344, the frame element 310, may be able to rotate in the channel. In order to prevent or at least reduce any unwanted rotation, the inside surface of the channel 344 is modified with rotation reducing portions 346 to engage the frame element 310. As seen in FIG. 27, the rotation reducing portions 346 can be ribs 348 in the channel wall that are received into complementary recesses 350 provided on the frame element 310. The frame element 310 would thus be prevented from rotating in the channel 344 since the ribs 348 would not allow for rotational movement.

The rotation reducing portions 346, 348 on the inside wall of the channel 344 of the first connector 324 can each have a top surface 347, a rear end wall (not seen) near the back of the channel 344, and a forward end wall 349 near the opening 352 of the channel 344. The top surface 347 of the first connector rotation reducing portion 346 can be narrow as shown in FIG. 27. There are about sixteen first connector rotation reducing portions 346 in FIG. 27. The space between each first member rotation reducing portion (or between pairs of them) can be referred to as a channel 351.

Figure 29:
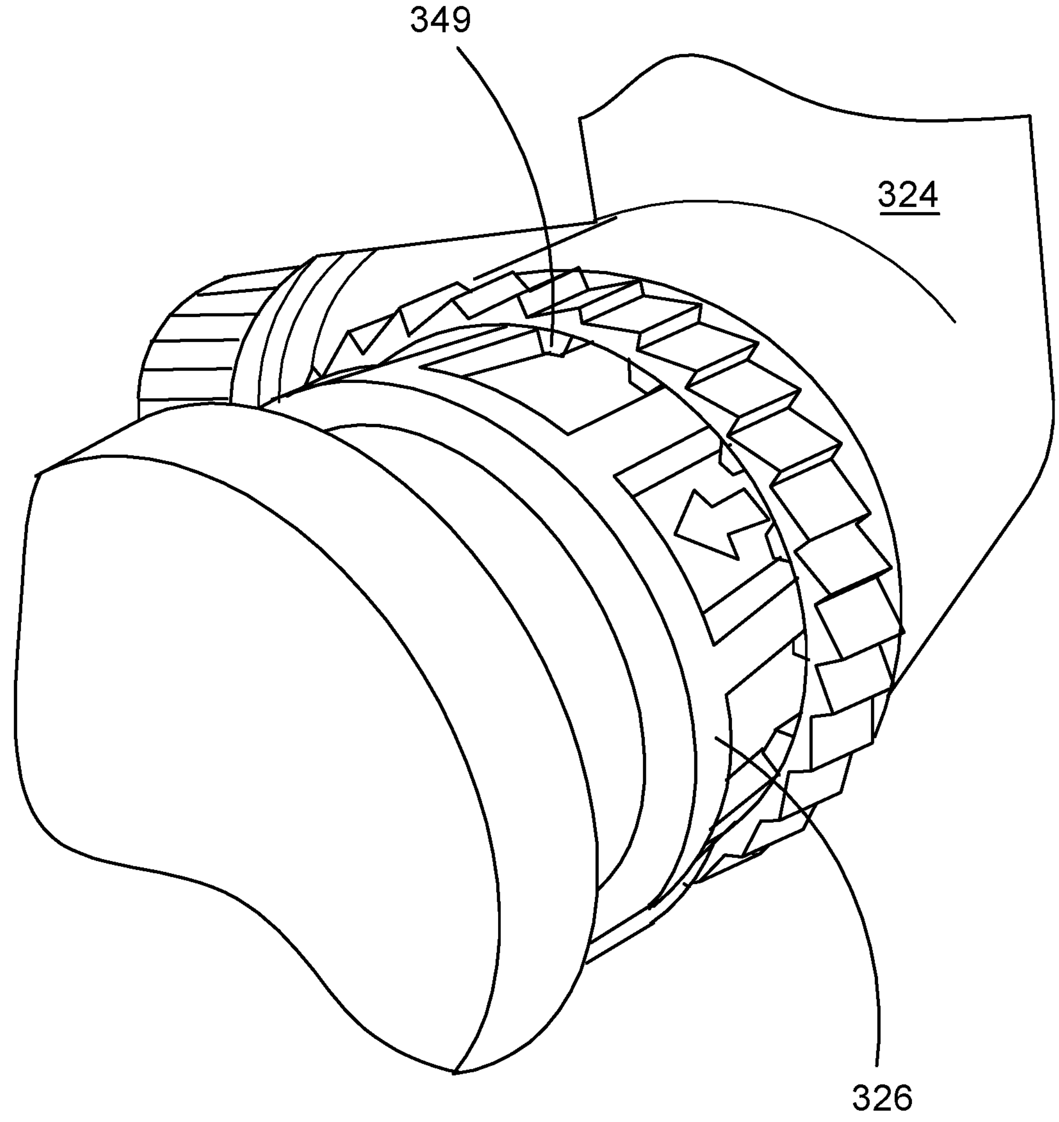
FIG. 29 is a close up view of the frame element of FIG. 25 sliding into the first connector member of FIG. 27.

The channel 344 has an opening 352 through which the insertion portion A of the frame element 310 is received. The opening 352 can be defined by a front wall 354 of the channel 344 which can be a rim 354 around the front of the first connector member 324. The front wall 354 at the forward part of the first connector 324 can have a smooth flat surface which in some embodiments can be for engagement with the first surface 336 of the protrusion 326. In some embodiments, the front wall 354 of the first connector 324 comprises the forward end walls 349 of any rotation reducing portions 346 provided in the channel 344. Therefore, the front wall 354 can be the rim 354 around the front of the first connector 324; the forward end walls 349 of any rotation reducing portions 346 provided in the channel 344; or both provided together 354, 349. Upon insertion of the frame element 310 into the opening 352, the protrusion 326 can abut against the forward walls 349 of the rotation reducing portions as shown in FIG. 29. The protrusion 326 thereby provides a natural stop for further insertion movement of the frame element 310 into the channel 344.

Figure 30:
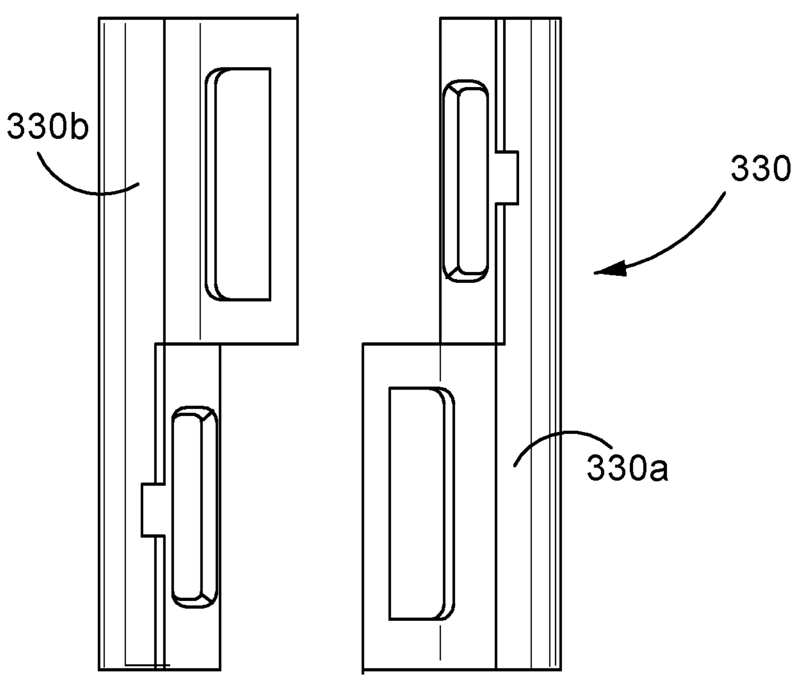
FIGS. 30 to 34 shown an embodiment of a second connector member provided in two half-parts. The second connector is disassembled in FIGS. 30 and 31 and assembled to form the second connector in FIGS. 32 to 24.
Figure 31:
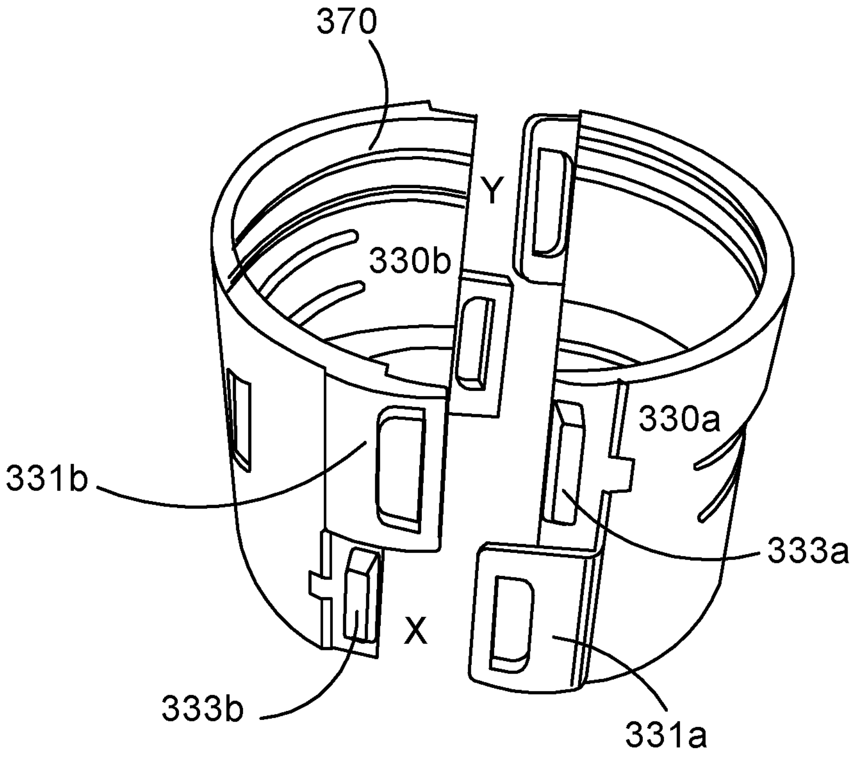

In order to complete the connector 320, the second connector member 330 is brought into contact with the first connector member 324. In an embodiment, the second connector member 330 is in two parts 330*a* and 330*b* and it is assembled around the first connector member 324. The second connector member 330 can be in parts that can be clamped around the first connector member 324 and then locked into position. The second connector member 324 can have an open position (FIGS. 30 and 31) which can receive the first connector member 324 and a closed, locked position (FIGS. 32, 33, 34) in which the second connector member 330 can be locked around the first connector member 324 (although in FIGS. 32-34 the second connector member 330 is shown separate to the first connector member 324).

As shown in the FIGS. 30-34, the second connector comprises two half-parts 330*a*, 330*b*. First half-part 330*a* and a second half-part 330*b* are identical to one another. Once the second half-part 330*b* is inverted with respect to the first part 330*a*, the two half-parts together provide the second connector member 330. Each half part 330*a*, 330*b*, can have first joining side X and a second joining side Y. A catch 331 can be provided on each half-part at the first joining side X, the catches 331*a* and 331*b* can provide a recess (shown as a rectangular hole in FIG. 31). A boss 333 can be provided on each half part at the second joining side Y, the bosses 333*a*, 333*b* can be locatable into the recesses of the respective catches 331*a*, 331*b*. When the two half-parts 330*a* 330*b* are brought together, the respective catches 331*a* 331*b* can locate the respective bosses 333*a* 333*b* and the two half parts 330*a* 330*b* are held securely together around the first connector member 324*b*. A tool may be required to separate the parts once connected. The tool can be used to prise up the catch 331 and remove it from the boss 333.

Figure 43:
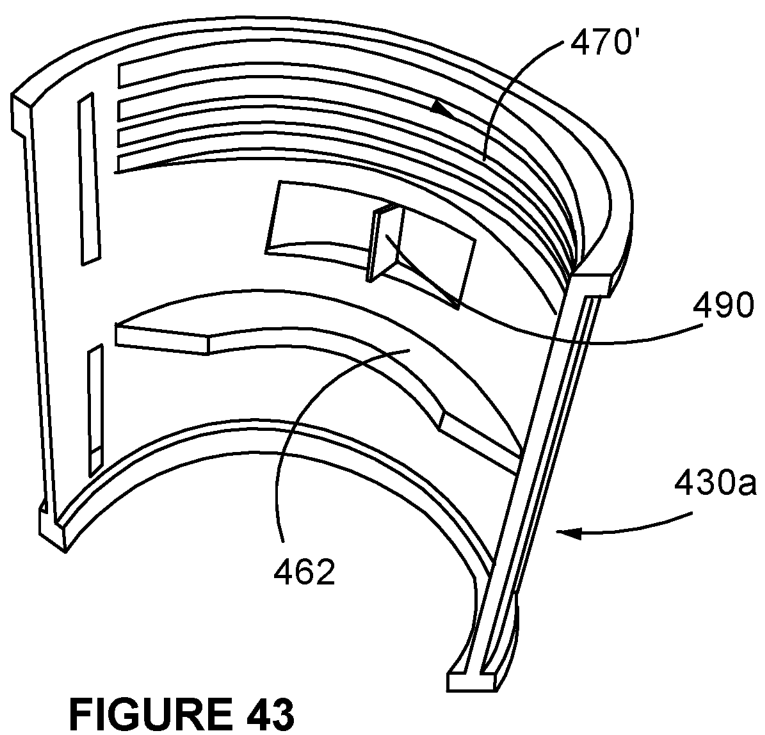
Figure 44:
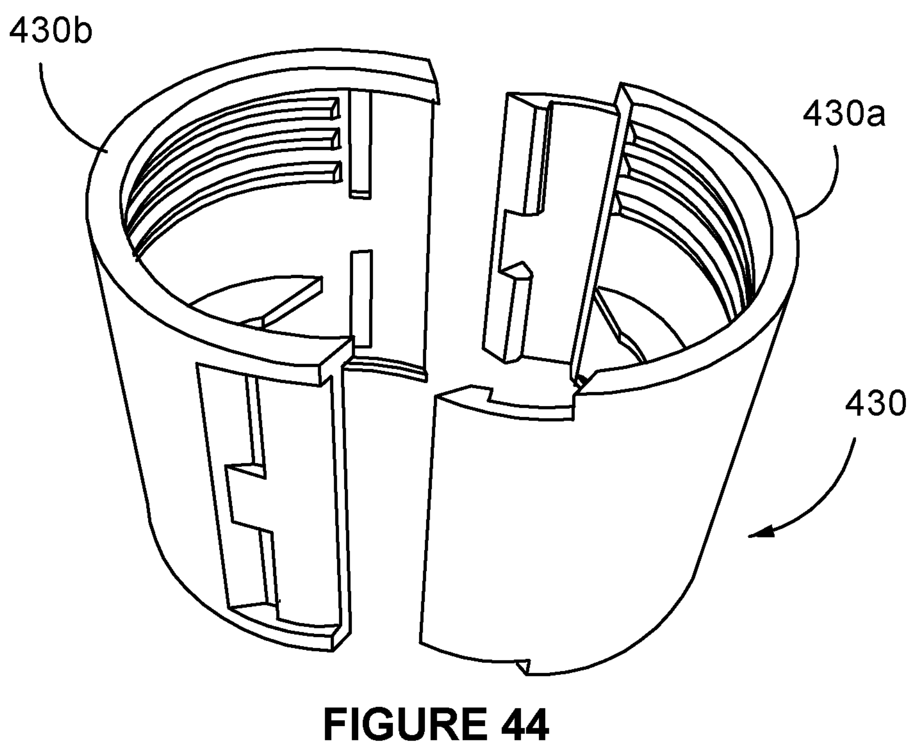
FIG. 44 is a cross sectional view of the connector of FIG. 41.

In an alternative embodiment, the two half parts 430*a*, 430*b* are not identical as shown in FIG. 44. This can be advantageous for making sure that the two half parts are connected in the correct way. As shown in the FIGS. 43 and 44, the second connector can comprise two half-parts 430*a*, 430*b*. First half-part 430*a* and a second half-part 430*b* are different to one another in that 430*a* has the bosses 433 and 430*b* has the catches 431*a*, 431*b*. When the two half-parts 430*a* 430*b* are brought together, the respective catches 431*a* 431*b* can locate the respective bosses 433*a* 433*b* and the two half parts 430*a* 430*b* are held securely together around the first connector member 424*b*. A tool may be required to separate the parts once connected. The tool can be used to prise up the catch 431 and remove it from the boss 433.

Figures 32, 33, 34:
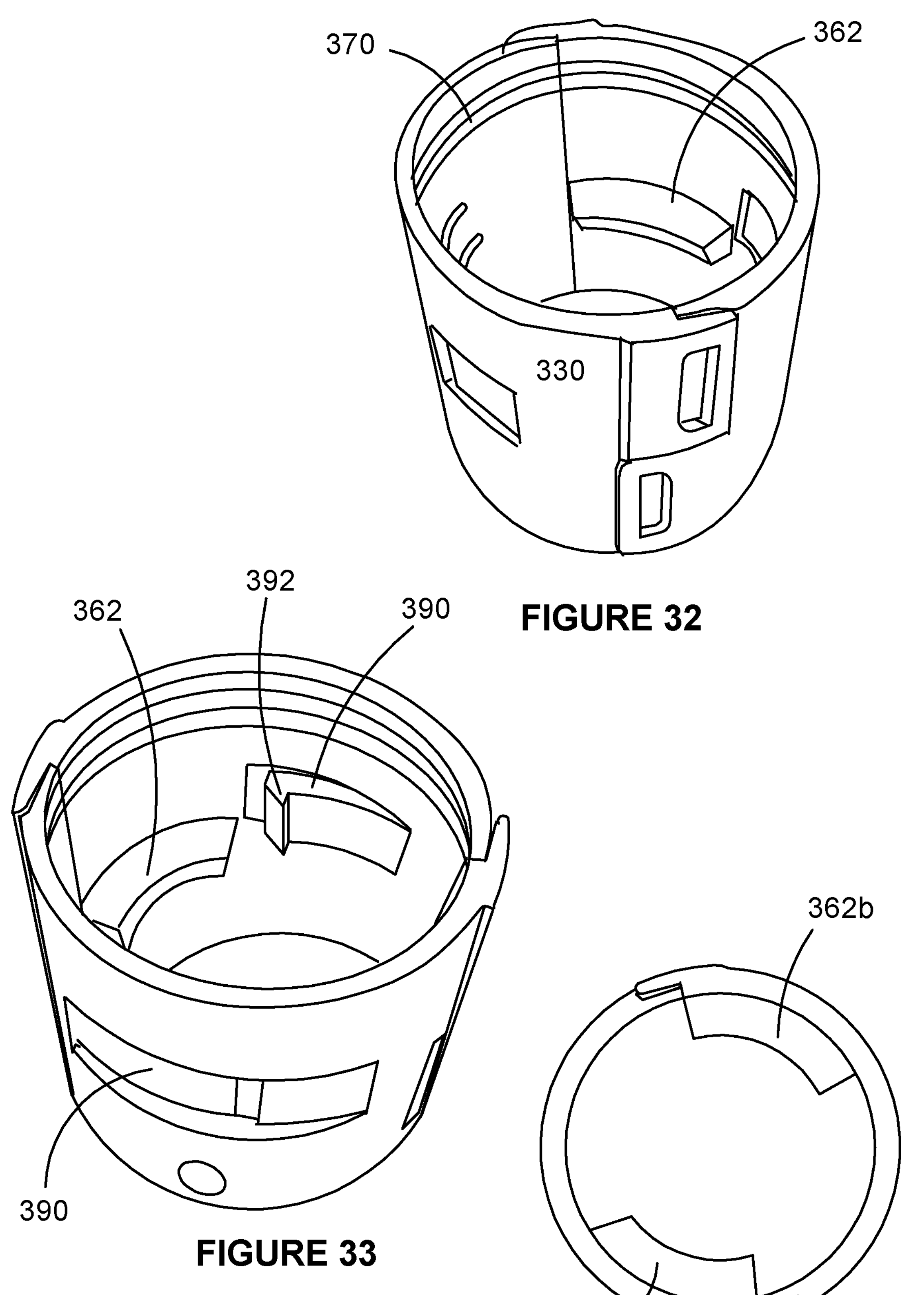

Once in place, in an embodiment, the second connector member 330 can provide a barrier wall 362 that abuts the second side 338 of the protrusion 326 of the insertion portion A. The barrier wall 362 thereby prevents any removing movement of the frame element 310 from the channel 344 of the first connector member 324. The barrier wall 362 is provided in separate wall parts 362*a* and 362*b* as seen in FIG. 34. A first barrier wall part 362*a* is on half-part 330*b* and a second barrier wall part 362*b* is on provided on half-part 330*b*. The barrier wall 462 is provided in separate wall parts 462*a* and 462*b* as seen in FIG. 44.

The second connector member 330 comprises a connection assembly 370. The connection assembly 370 is associated with the barrier wall in that it is integral with it. The connection assembly 370 is configured to engage the second connector member 330 to the first connector member 324. In an embodiment shown the connection assembly 370 comprises complementary ribs and recesses on the outside wall of the first connector member 324 and the inside wall of the second connector member 330 in the form of screw threads. There is a complementary screw thread on the first connector 324 (see FIG. 27). The function of the connection assembly is to prevent unintentional disengagement of the second connection member 330 from the first connection member 324. As the second connector member 330 is screwed onto the first connector member 324 in a first direction, the barrier wall 362 moves closer to the protrusion 326. When the barrier wall 362 abuts the second side 328 of the protrusion 326, the second connector member 330 can be given one last tightening turn and then it substantially remains in position. The second connector member 330 can be turned in a second direction that is opposite to the first direction to remove or disengage it from the first connector member 324. When the second connector member 330 is required to be removed from the first connector member 324, it can be turned in the second direction until the barrier wall 362 is moved away from the protrusion 326 and the threads disengage.

Figure 35:
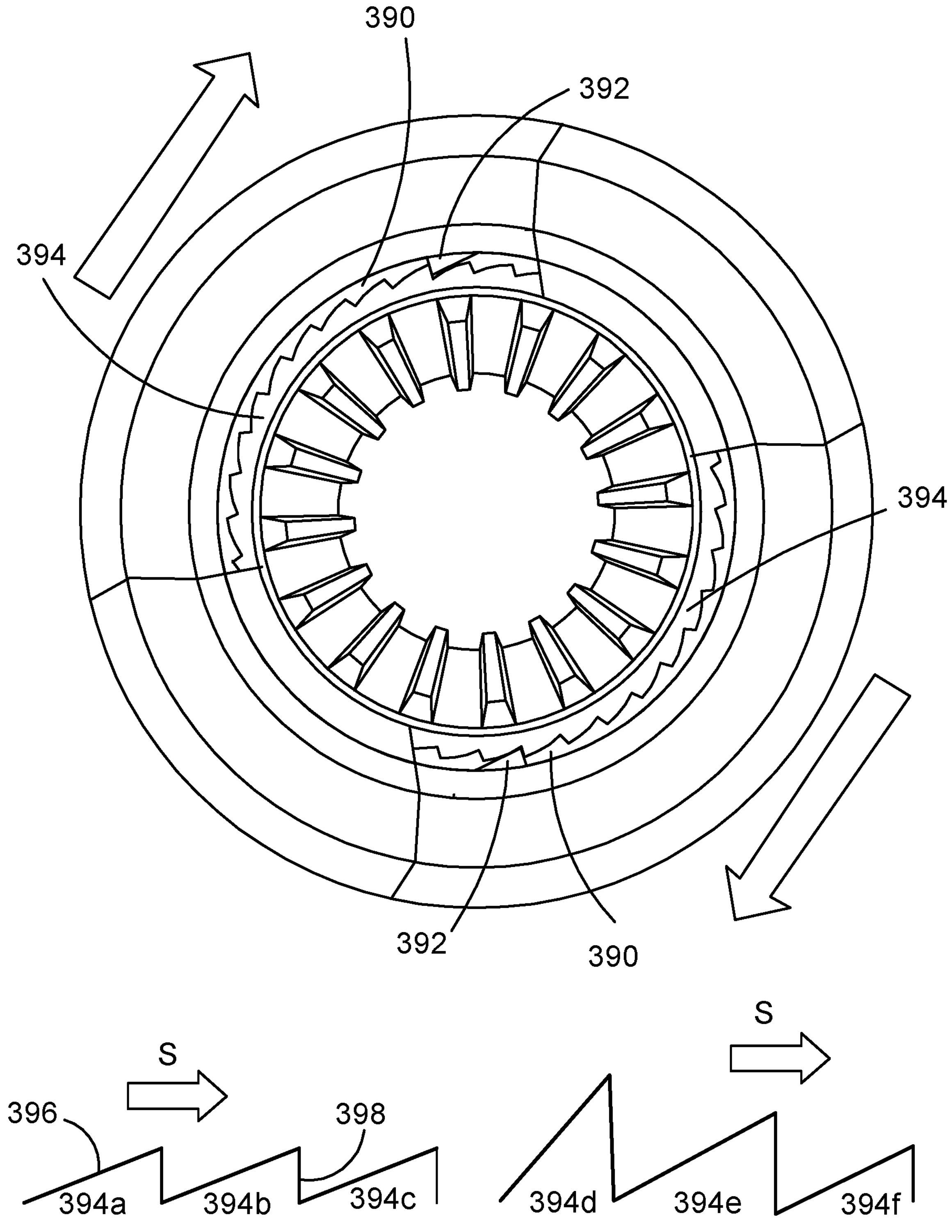
FIG. 35 is a top view of the second connector in place around the first connector (the frame element is removed for clarity). The inset shows a schematic cross-section of the teeth around the outside periphery of the first connector member.

In an embodiment, as the connection assembly 370 is formed by screwing the complementary screw threads 370, 370' to one another, there is an aural indicator (sound) of the joining process. This can be provided by at least one ratchet arm 390 provided in the second connector body 330. The flexible ratchet arm 390 is biased to a position flush with the second connector body wall 330, but the ratchet arm 390 can be lifted if a head part 392 of the ratchet arm 390 is forced outwardly from the wall of the second connector 330. A top view of the ratchet arm 390 and its head part 390 can be seen in FIG. 35. In FIG. 35 the insertion portion is removed from the channel 344 of first connector 324 so the inside of the mechanism can be seen more clearly. The ratchet arm 390 engages with teeth 394 arranged in formation around the forward peripheral edge of the outside wall of the first connector 324. The teeth can be seen in FIG. 35 and quite clearly in FIG. 28.

The ratchet arm 390 is located on the second connector member 330 body such that it engages with a tooth 394 of the first connector member 324 just prior to the threading process. As the second connector member 330 is screwed onto the first connector 324, the ratchet arm 390 rises over the tooth body 394 and then falls onto the next tooth 394 in series. Advantageously, in embodiments in which there is one row of teeth, the ratchet arm 390 is sized relative to the teeth 394 so that it engages with them over more than one turn. Alternatively, there can be more than one row of teeth in a spiral formation that complements the turning circle of the ratchet arm 390. Nevertheless, the sequential connection of the ratchet arm 390 with the teeth 394 in the series makes a sound each time the head part 392 of the ratchet arm 392 falls to another tooth 394. Over a few turns of the second connector 330 relative to the first connector 324 in the direction of the arrows shown in FIG. 35 there can be a loud and pleasing mechanical sound that allows the user to at once know that the first and second connectors are securely joined, and that the join is as tight as possible since the noise stops. An additional advantage of the ratchet arm 390 is that once the first connector 324 and the second connector 330 are joined, they are unable to come loose relative to one another because the head part 392 of the ratchet arm 390 prevents an unscrewing motion. The head part 392 of the ratchet arm 390 abuts the preceding tooth 394 and will not allow rotational movement in the direction opposite to the arrows shown in FIG. 35.

The number of the teeth 394*a*, 394*b*, 394*c* and the size of the head part 392 of the ratchet arm 390 will contribute to the loudness and frequency of the aural indicator. In an embodiment shown in which the diameter of the first connector 324 is about 3.5 cm there are about 32 teeth around the outside periphery of the opening. Each tooth 394 can have a slope portion 396 over which the head part 392 of the ratchet arm 390 moves in a forward screwing direction S. Each tooth 394 also has a stop portion 398. As the head 392 of the ratchet arm 390 falls off the end of the slope portion 396 of a first tooth 394*a*, the head part 392 of the ratchet arm 390 can fit into the gap defined by the slope portion 396 of a second tooth 394*b* and the stop portion 398 of the adjacent first tooth 394*b* (triangular shaped). The stop portion 398 of any one tooth 394 prevents rotational movement in the unscrewing direction (opposite to arrow S), since the head 392 of the ratchet arm 390 cannot move past the stop portion 398 in the unscrewing direction. In an embodiment, the slope portion 396 of each tooth 394 and the stop portion 398 of each tooth 394 is the same dimension as shown in FIG. 35. This means that each tooth 394 provides for the same tone of sound as an aural indicator. In an alternative embodiment, the slope portion 396 and the stop portions 398 of each tooth 394 are different angles, lengths and or heights, which makes a different sound for each tooth as the ratchet head 392 moves over each different tooth 294*d*, 394*e*, 394*f*. By varying the teeth and therefore by changing the corresponding sound emitted a tune can be created. The three teeth shown in FIG. 35 will make only three decreasing notes, but it should be understood that with 20 or 30+ teeth over 1, 2 or 3 turning circles a whole melody could be created.

Figure 36:
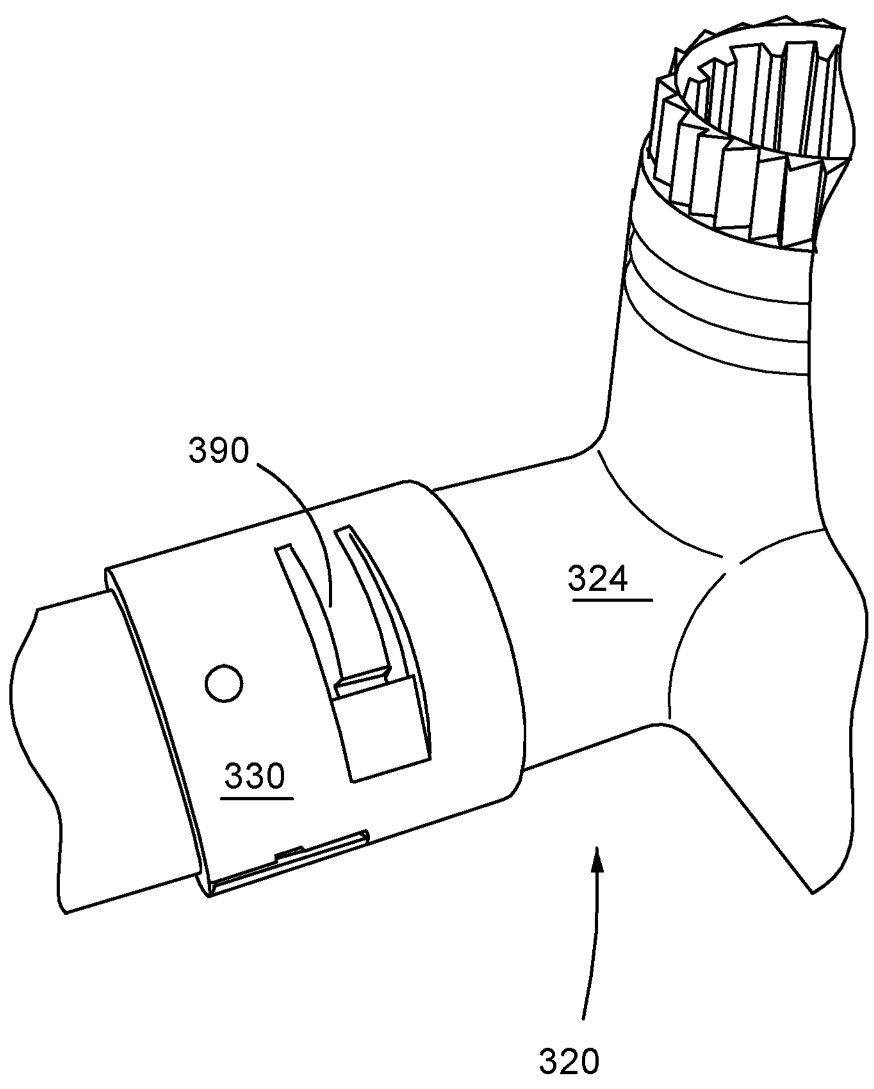
FIG. 36 shows the connector according to an embodiment.

FIG. 36 shows the second connector 330 in place with the first connector 324 with the protrusion (not seen) sandwiched between. Frame element 310 cannot be removed from the connector 320.

Figure 40:
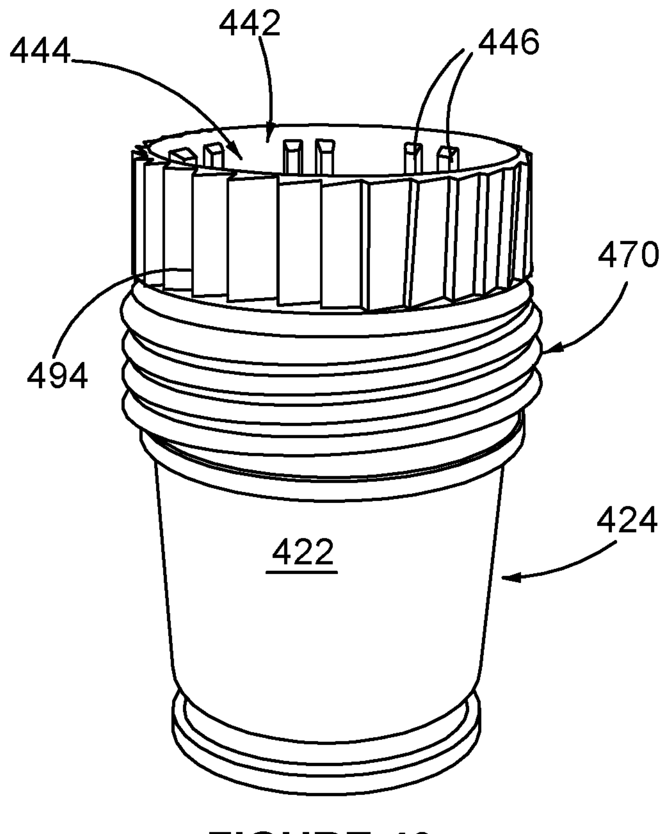
FIG. 40 is an alternative embodiment of a first connector member.

The second connector member 430 also comprises a connection assembly 470. In an embodiment, the connection assembly 470 is formed by screw threads 470 and 470'. To join the first connector 424 to the second connector 430, the user can screw the complementary screw threads 474, 476 to one another, there is an aural indicator (sound) of the joining process. This can be provided by at least one ratchet arm in the form of a thin fin 490 provided in the second connector body half parts 430*a* and 430*b*. The ratchet arm 490 engages with teeth 494 arranged in formation around the forward peripheral edge of the outside wall of the first connector 424. The teeth 494 can be seen in FIGS. 40 and 41.

Figure 45:
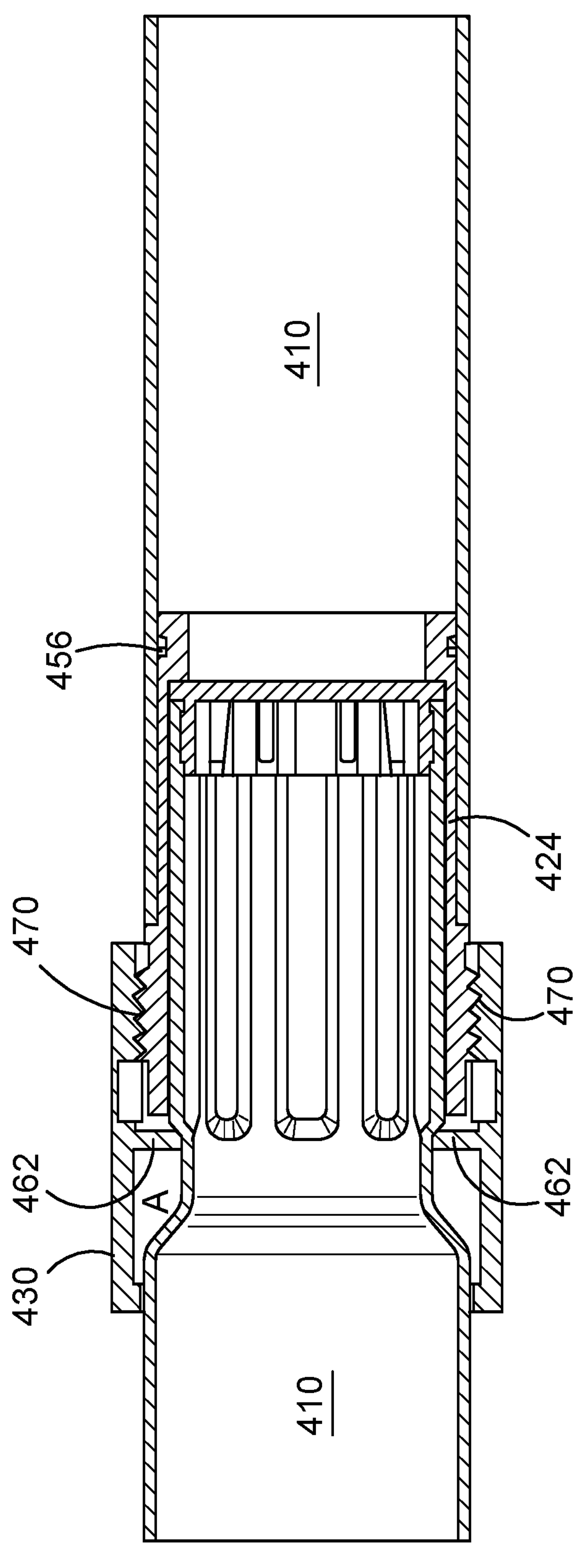
FIG. 45 is an embodiment of a connector showing how the second connector can dovetail with the body of the first connector.

FIG. 45 is a cross-sectional view of the connector once assembled. Upon insertion of the insertion portion A of the frame element A into the first connector member 424, and mating of the first connector member 424 with the second connector member 430, the frame element 410 cannot be removed from the first connector member 424 due to the protrusion 426 of the frame element 410 engaging with the second connector member 430; and the frame element 410 is substantially unable to rotate in the first connector member 424 due to the rotation reducing portions 448 engaging with the channel 44 of the first connector member 424.

Experimental Testing

Embodiments of the invention will now be described with reference to the following none limiting examples.

The connector of embodiments of the present invention provides more rigidity than prior connectors. In order to quantify "rigidity", the following experiment was undertaken.

Construct a testing frame capable of fixing a connector and/or frame element with join Insert test frame element, fixed length at 1000 mm, and secure into first connector as intended.

Apply force (n), force to be determined, along the XY plane in direction A.

Apply force (n), force to be determined, along the XY plane in direction B

Measure total deflection (d). Deflection (d)=Rigidity

Results

Experiment: Cast Steel Joiner Rigidity (Comparative Testing with Existing Metal Connector)

Test Environment Set Up:

Fixed cast steel joiner housed in testing apparatus 48.3 mm×2.0 mm steel tube inserted into joiner 100 newton force applied to end of length (l)

500 newton force applied to end of length (l)

Figure 51:
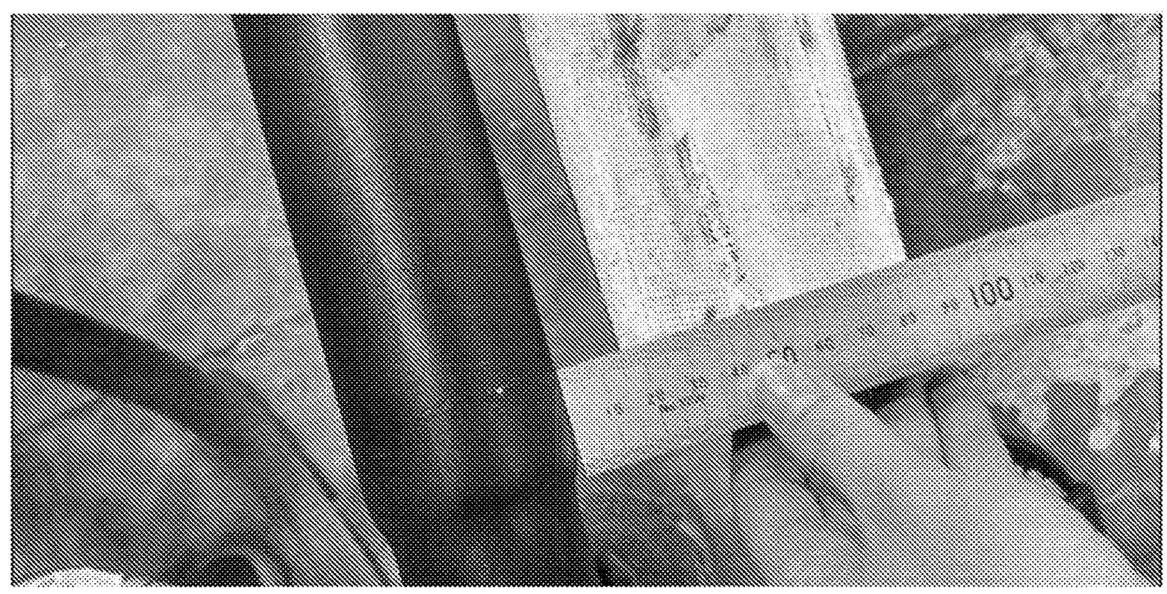
FIGS. 51 to 53 show the results of rigidity testing on an existing steel connector.
Figure 52:
Figure 53:
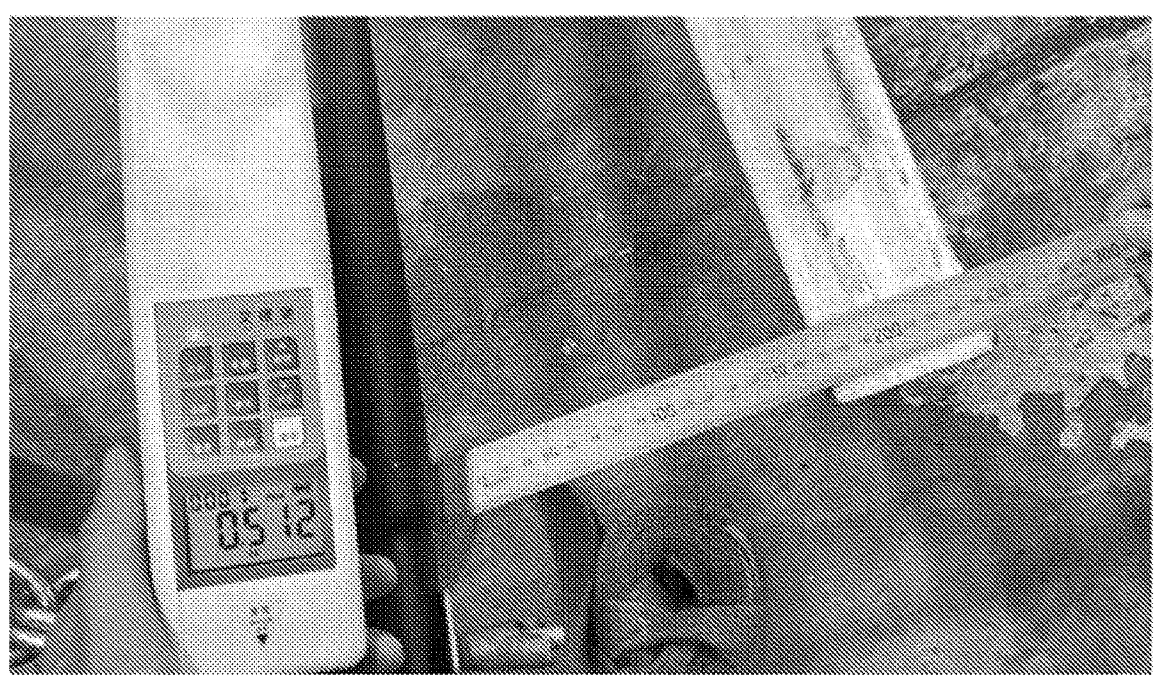

At resting state in the testing apparatus, the steel tube measured 15 mm from the straight edge (FIG. 51). With 100 newtons of force applied along the XY plane, the steel tube shows 42 mm of deflection from the straight edge (FIG. 52). With 500 newtons of force applied along the XY plane, the steel tube shows 170 mm of deflection from the straight edge (FIG. 53). In conclusion, it is evident that the current cast steel joiner that secures the tube using a grub screw shows a significant amount of deflection from its resting position when both a force of 100 newtons and 500 newtons is applied.

Experiment: Present Connector Simulation

It is prophesised that the present connector will have increased rigidity to the existing metal connector. It is hypothesised that the amount of deflection will be substantially less under the same test circumstances.

Figure 54:
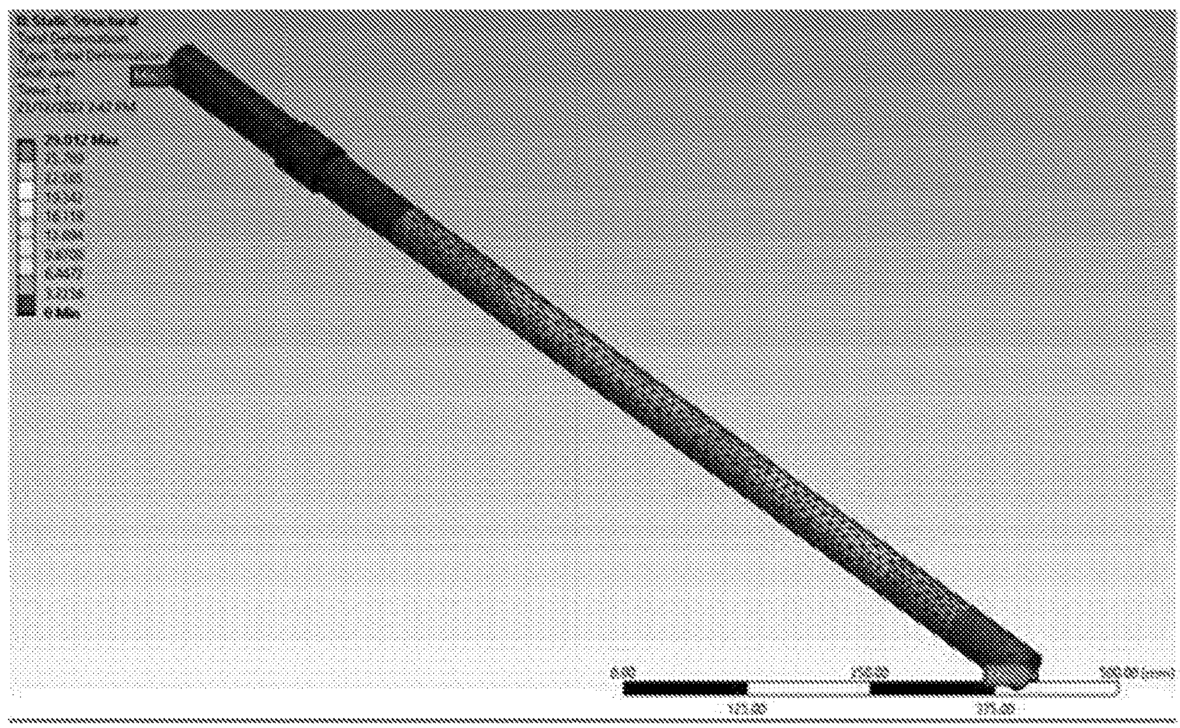
FIGS. 54 and 54 are simulated results of a frame element to frame element join.
Figure 55:
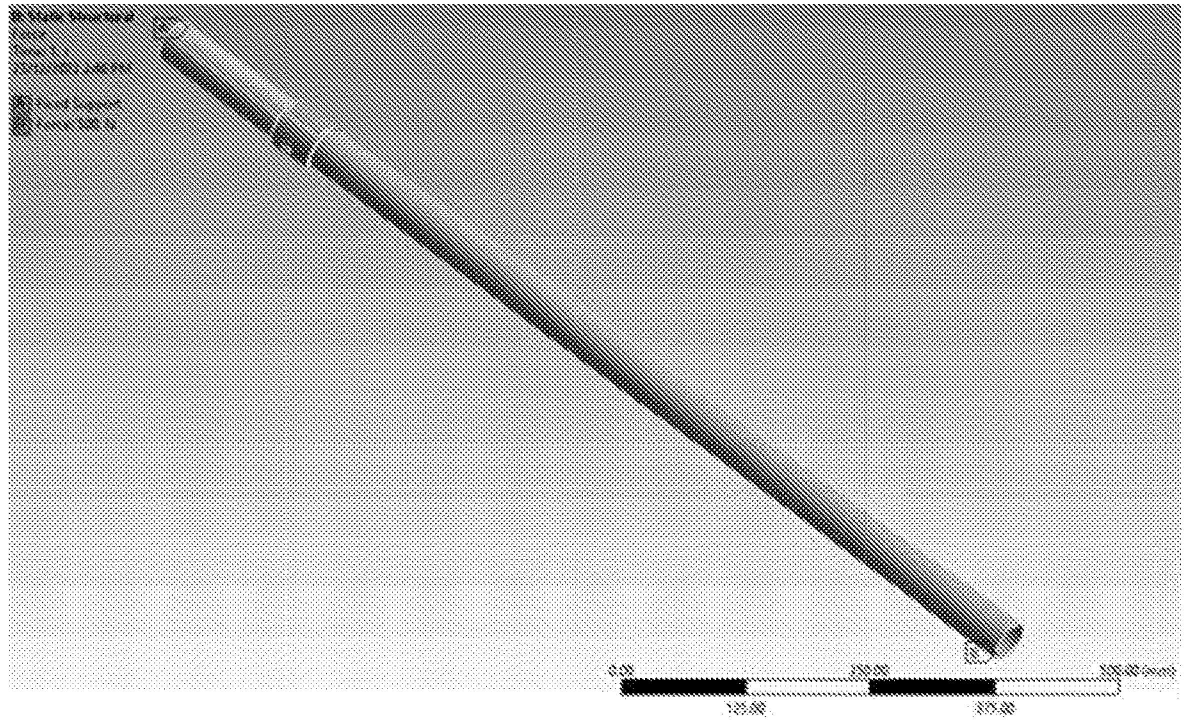

Simulated results on the frame element to frame element connection (with the connector joining two frame elements as shown in FIGS. 54 and 55) show that with a force of 500N (50 kg) applied on the XY plane, a predicted deflection of 29 mm from its original state.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Any promises made in the present description should be understood to relate to some embodiments of the invention and are not intended to be promises made about the invention as a whole. Where there are promises that are deemed to apply to all embodiments of the invention, the applicant/patentee reserves the right to later delete them from the description and does not rely on these promises for the acceptance or subsequent grant of a patent in any country.

The invention claimed is:

1. A frame having a connector system, said frame configured for an apparatus intended to be walked on, swung on or jumped on in use, the connector system comprising a plurality of frame elements, each frame element comprising an insertion portion, at least one protrusion, and frame element rotation reducing portions;

a plurality of first connector members, each first connector member configured to receive the insertion portion of at least one frame element into a channel of each first connector member;

a plurality of second connector members, each second connector member configured to mate with one first connector member;

whereupon insertion of the insertion portion of at least one frame element into a first connector channel of the one first connector member, and mating of the one first connector member with one second connector member, the at least one frame element cannot be removed from the one first connector member due to the at least one protrusion of each frame element engaging with the one second connector member; and the at least one frame element is substantially unable to rotate in the one first connector member due to the frame element rotation reducing portions engaging with the first connector channel of the one first connector member.

2. The frame having the connector system of claim 1, wherein each frame element has a longitudinal axis, and the frame element rotation reducing portions comprise longitudinal splines, each longitudinal spline having a longitudinal axis substantially aligned with the longitudinal axis of each frame element, and wherein each longitudinal spline has a front wall and a rear wall, and the front wall of each longitudinal spline forms a series of protrusions thereby providing the at least one protrusion.

3. The frame having the connector system of claim 2, wherein there are at least 8 longitudinal splines.

4. The frame having the connector system of claim 1, wherein the at least one protrusion is a circumferential protrusion.

5. The frame having the connector system of claim 1, wherein the at least one protrusion is integral with the insertion portion of each frame element.

6. The frame having the connector system of claim 1, wherein an inside wall of the first connector channel of each first connector comprises first connector rotation reducing portions, wherein the first connector rotation reducing portions and the frame element rotation reducing portions engage with one another and are unable to pass over one another and thereby substantially prevent rotation.

7. The frame having the connector system of claim 1, wherein each second connector member mates with each first connector member by complementary screw threads on an outside wall of each first connector member and an inside wall of cach second connector member.

8. The frame having the connector system of claim 7, configured to generate an aural indicator as each second connector member is screwed onto each first connector member.

9. The frame having the connector system of claim 8, wherein each first connector member comprises a series of teeth arranged around the periphery of an outside surface of the channel of each first connector member, and each second connector member comprises at least one ratchet arm, engageable with teeth during connection of each second connector member to each first connector member.

10. The frame having the connector system of claim 9, wherein the teeth are each sized and shaped to make a different pitch of sound as the ratchet arm moves over the teeth.

11. The frame having the connector system of claim 9, wherein the ratchet arm comprises a head that substantially prevents rotational movement of each second connector member in one direction once in place on each first connector member.

12. The frame having the connector system of claim 1, wherein each second connector member is provided in two half-parts which come together to form each second connector member.

13. The frame having the connector system of claim 12, wherein each half part of the each second connector comprises a part of a barrier wall which sandwiches the at least one protrusion between each first connector member and each second connector member.

14. The frame having the connector system of claim 1, wherein each frame element is substantially circular in cross-section and each first connector member and each second connector member are each configured to receive frame elements being substantially circular in cross-section.

15. The frame having the connector system of claim 1, wherein the frame is rigid in an XY plane under application of 500 Newtons of force.

16. The frame having the connector system of claim 1, wherein each frame element is held about its entire outer periphery with substantially equal forces.

17. The frame having the connector system of claim 1, wherein each first and second connector member is formed from a plastic polymer and each frame element is metal.

18. An apparatus supported by a frame having frame elements connected by the connector system of claim 1.

19. A first connector member for use in the connector system of claim 1.

20. A kit for building a playground apparatus, the kit comprising the following components, a plurality of frame elements according to claim 1;

a plurality of first connector members according to claim 1;

a plurality of second connector members according to claim 1;

the components of the kit being provided with instructions on how to use the components in the connector system according to claim 1.

* * * * *